United States Patent
DuPlessie

(10) Patent No.: US 11,935,171 B2
(45) Date of Patent: Mar. 19, 2024

(54) SYSTEMS AND METHODS FOR CONFIGURING AVATARS IN INTERACTIVE PHYSICAL ENVIRONMENTS

(71) Applicant: Open World Entertainment LLC, Natick, MA (US)

(72) Inventor: Matthew DuPlessie, Foxboro, MA (US)

(73) Assignee: Open World Entertainment LLC, Natick, MA (US)

( * ) Notice: Subject to any disclaimer, the term of this patent is extended or adjusted under 35 U.S.C. 154(b) by 84 days.

(21) Appl. No.: 17/837,972

(22) Filed: Jun. 10, 2022

(65) Prior Publication Data
US 2022/0398799 A1 Dec. 15, 2022

Related U.S. Application Data

(60) Provisional application No. 63/209,957, filed on Jun. 11, 2021.

(51) Int. Cl.
*G06T 13/40* (2011.01)
*A63F 13/217* (2014.01)
(Continued)

(52) U.S. Cl.
CPC ............ *G06T 13/40* (2013.01); *A63F 13/217* (2014.09); *A63F 13/235* (2014.09); *A63F 13/79* (2014.09);
(Continued)

(58) Field of Classification Search
None
See application file for complete search history.

(56) References Cited

U.S. PATENT DOCUMENTS

| 7,749,089 B1 | 7/2010 | Briggs et al. |
| 11,161,050 B2 | 11/2021 | Schmidt |

(Continued)

FOREIGN PATENT DOCUMENTS

| CA | 3064047 A1 | 11/2020 |
| CA | 3064047 C | 11/2020 |

(Continued)

OTHER PUBLICATIONS

Non-Final Office Action on U.S. Appl. No. 17/838,141 dated Aug. 26, 2022.

(Continued)

*Primary Examiner* — Yingchun He
(74) *Attorney, Agent, or Firm* — Foley Hoag LLP; John Lanza; Jialan Zhang

(57) ABSTRACT

An interactive physical environment providing entertainment to a patron includes a scanner, a sensor within the room, and a control system. The scanner is associated with a room provided by the interactive physical environment. The scanner identifies a patron of the interactive physical environment and transmits patron identification information. The sensor determines patron game performance data and transmits the patron performance data. The control system receives patron identification information from the scanner and patron performance data from the sensor. The control system, responsive to the received patron identification information and patron performance data, modifying an avatar associated with the patron.

23 Claims, 41 Drawing Sheets

(51) Int. Cl.
  *A63F 13/235* (2014.01)
  *A63F 13/79* (2014.01)
  *A63F 13/80* (2014.01)
  *A63G 31/00* (2006.01)
  *E04H 3/10* (2006.01)
  *G06K 7/14* (2006.01)
  *G06Q 20/40* (2012.01)
  *G07F 17/32* (2006.01)

(52) U.S. Cl.
  CPC .............. *A63F 13/80* (2014.09); *A63G 31/00* (2013.01); *E04H 3/10* (2013.01); *G06K 7/1417* (2013.01); *G06Q 20/40145* (2013.01); *G07F 17/3262* (2013.01); *G07F 17/3274* (2013.01)

(56) References Cited

U.S. PATENT DOCUMENTS

| | | | |
|---|---|---|---|
| 11,452,944 | B2 | 9/2022 | Schmidt |
| 11,524,244 | B1 | 12/2022 | DuPlessie |
| 2013/0179779 | A1 | 7/2013 | Sandler et al. |
| 2016/0086500 | A1* | 3/2016 | Kaleal, III ............... A61B 5/45 434/257 |
| 2017/0189815 | A1* | 7/2017 | Tweedale ................ A63F 13/79 |
| 2019/0220634 | A1 | 7/2019 | Cossairt et al. |
| 2020/0360826 | A1 | 11/2020 | Schmidt |
| 2021/0016185 | A1 | 1/2021 | Linguanti et al. |
| 2021/0042762 | A1* | 2/2021 | Budano ................ G06K 7/1413 |
| 2021/0220688 | A1 | 7/2021 | Schmidt |
| 2021/0220714 | A1 | 7/2021 | Schmidt |
| 2021/0220725 | A1 | 7/2021 | Schmidt |
| 2021/0335072 | A1 | 10/2021 | Caldwell et al. |
| 2021/0339123 | A1 | 11/2021 | Boudville |
| 2022/0105436 | A1 | 4/2022 | Schmidt |

FOREIGN PATENT DOCUMENTS

| | | |
|---|---|---|
| CA | 3068840 A1 | 7/2021 |
| CA | 3068847 A1 | 7/2021 |
| CA | 3068860 A1 | 7/2021 |

OTHER PUBLICATIONS

Andrew H. Rolter and Donna Abbott-Vlahos, "Dragonslaying as a Teambuilding Exercise: Inside Crossgates' New Live-Action Entertainment Center", Albany Business Review, Dec. 5, 2016.
Andrew H. Rolter and Donna Abbott-Vlahos, Photo-Lobby, "Dragonslaying as a Teambuilding Exercise: Inside Crossgates' New Live-Action Entertainment Center", Albany Business Review, Dec. 5, 2016.
Anonymous, "A grandparent's cheat sheet: Local places for fun with the grandkids", www.townonline.com, retrieved on Oct. 17, 2006.
Anonymous, "At museum, die another day", Washington Times, Aug. 3, 2007.
Anonymous, "AV Stumpfl Show Control Helps the Pharaoh Find His TOMB!", AV Stumpfl USA Corp Application Note.
Anonymous, "AV Stumpfl Show Control Helps the Pharaoh Find His TOMB!", www.stumpfl.com, retrieved Feb. 2, 2005.
Anonymous, "Boston Tomb", Spirit-Southwest Airlines, Feb. 2008.
Anonymous, "Five Questions with Matthew DuPlessie" Saratogian Business, Feb. 7, 2017.
Anonymous, "Now Playing—Uptown & Downtown", Post-Gazette, Jun. 2, 2006.
Anonymous, The Boston Parents' Paper 2005 Family Favorite Award—Favorite Adventure Place—Editor's Pick: 5Wits Tomb Adventure.
Anonymous, "The Future of Entertainment", www.knowyourboston.com, retrieved on Feb. 10, 2005.
Anonymous, "The Future of Entertainment", www.knowyourboston.com, retrieved on Feb. 10, 2005, Cover.
Anonymous, "The Games People Play", Stuff@night, Nov. 19, 2007.
Anonymous, www.magazineblu.com.
Arthur Levine, "TOMB at 5WITS", www.themeparks.about.com, retrieved Feb. 2, 2005.
Arthur Levine, "Tomb Much Fun", www.themeparks.about.com, Oct. 25, 2004.
Ay-Leen the Peacemaker, "Puzzle Your Way Out of Nemo's Submarine in 5 Wits's"20,000 Leagues" Interactive Adventure", www.tor.com, Sep. 7, 2011.
Camille Dodero, "Battling the Pharaoh in the Fenway", The Boston Phoenix, Feb. 2, 2005.
Channel 5 News Broadcast, Patriot Place WCVB, Jan. 19, 2011.
Channing Gray, "Patriot Games", Journal Express, An edition of The Providence Journal, Feb. 14, 2013.
Channing Gray, "Patriot Games", Providence Journal, Jan. 10, 2013.
Chikage Windler, "Great Escape: Unlock the Secrets of Egypt", WHDH Channel 7 News Transcript, Mar. 10, 2005.
Christin Steding, "Checking out 5 Wits at Crossgates, and other Capital Region escape rooms", All Over Albany, Sep. 21, 2017.
Christina Couch, "License to Thrill", www.airtranmagazine.com, Jul. 2007.
Chronicle, Channel 5 News Broadcast, Nov. 6, 2007.
David A. Kelly, "Fun if by Land and Fun if by Sea in Boston", The New York Times, Aug. 21, 2005.
David L. Ryan, "Best of the New: Entertainment", www.boston.com, retrieved on Mar. 16, 2005.
Elizabeth Papp, AAA Horizons Press Release, Jan. 24, 2013.
Esther Fung, "Shopping Malls' New Product: Fun", The Wall Street Journal, Aug. 30, 2016.
Ethan Gilsdorf, "At this attraction, you're not just along for the ride", The Christian Science Monitor, Apr. 21, 2006.
Ethan Gilsdorf, "Spy Guy", The Boston Globe Magazine, Apr. 2, 2006, JPG.
Ethan Gilsdorf, "Spy Guy", The Boston Globe Magazine, Apr. 2, 2006, PDF.
Heather Crowell, "PREIT Introduces New Experiential Concepts as Part of Ongoing Evolution at Plymouth Meeting Mall", PREIT, Nov. 6, 2017.
Jenn Romatelli, "Tomb: A Review", The Larper, retrieved Feb. 2, 2005.
Jinnie Lee, "Use Your Wits", Panorama, Jun. 19, 2006.
Jody Feinberg, "Tomb raiders: Interactive game takes you on a sensory adventure", The Patriot Ledger, Feb. 2, 2005.
Joe O'Shea, "You'll Need Your Wits About You in Boston's Tomb Experience", AAA Horizons Southern New England, Oct. 2007.
Johnny Monsarat, 5-Wits is New England's Best Escape Room (5 stars), bostoneventsinsider.com, Feb. 23, 2018.
Johnny Monsarrat, "5-Wits at Patriot Place is a Room Escape Challenge at Movie Set Quality", Events Insider, Apr. 2017.
Josh Young, "5 Wits Brings New Puzzle Solving Adventures to Themed Entertainment", Theme Park University, Jun. 13, 2013.
Josh Young, "5 Wits Entertainment Center Carves Out Unique Niche in the Themed Entertainment", Theme Park University, Aug. 17, 2017.
Julie Sloan, "Sales From the Crypt", Fortune Small Business, Dec. 2005.
Julie Sloan, "Sales From the Crypt", www.fortune.com, Dec. 2005.
Kassmin Williams, "Haunted Sub", GO—The Sun Chronicle, Oct. 24, 2013.
Kathy Ceceri, "Visit a TOMB in Boston", www.wired.com, Jul. 16, 2009.
Kayte Deioma, "Rainy Day in Boston", www.rainydaytraveler.com, retrieved Aug. 2, 2005.
Kayte Deloma, "Boston Interactive", www.rainydaytraveler.com. retrieved on Aug. 2, 2005.
Kevin Tampone, "5 Wits sneak peek: Get ready for adventure at Destiny USA (video)", www.syracuse.com, Feb. 20, 2014.
Kevin Tampone, "Dive Into A Video Game", Syracuse Post Standard, Feb. 23, 2014.

(56) References Cited

OTHER PUBLICATIONS

Kim Foley MacKinnon, "TOMB will show you the mummy", Boston Herald, Jun. 15, 2006, JPG.
Kim Foley MacKinnon, "TOMB will show you the mummy", Boston Herald, Jun. 15, 2006, PDF.
Kim Knox Beckius, "Tomb: Boston Attraction Will Test Your Wits", www.GoNewEngland.com, retrieved Feb. 2, 2005.
Larry Claflin, Jr., "Test your family's wits at TOMB", Sunday Eagle-Tribune, Nov. 26, 2006.
Lisa Neal, "Five Questions . . . For Matt DuPlessie", eLearn Magazine, Feb. 28, 2008.
Liza Weisstuch, "Tomb at 5WITs", The Boston Globe, Oct. 20, 2004.
Matt Albany, Photo of Grand Opening with Guides Standing in Front of One of Several Game Rooms.
Meredith Tibbetts, "Jules Verne meets Patriot Place", www.thesunchronicle.com, Mar. 9, 2014.
Paul D. Lehrman, "Ancient Tomb Reveals Low-Cost Audio of Tomorrow!", Insider Audio, Oct. 2004.
Peter Demarco, "Mummy Complex", Globe Newspaper Company, Sep. 22, 2004.
Peter Demarco, "Mummy Complex", The Boston Globe, Sep. 22, 2004, JPG.
Peter Demarco, "Mummy Complex", The Boston Globe, Sep. 22, 2004, PDF.
Peter Demarco, "Mummy Complex", www.boston.com, Sep. 22, 2004.
Regina Velazquez, 5 Wits before Wits' End, www.GraylockGlass.com, Jul. 2019.
Richard Pastore, "The New Pocket-Sized Theme Park Concept", www.cio.com, Feb. 1, 2005, JPG.
Richard Pastore, "The New Pocket-Sized Theme Park Concept", www.cio.com, Feb. 1, 2005, PDF.
Robert Perkin, "Your Chance to Fill Indiana Jones' Shoes", www.gamevortex.com, retrieved on Jul. 24, 2006.
Sandra Giardi, "Kid Tested, Parent Approved", Where, The Complete Guide to Go, www.wheretraveler.com, Jul. 2008.
Stephanie Ebbert, "Game for A Life-Size Puzzle?", The Boston Globe, Mar. 2, 2013.
Stephanie Ebbert, Spy Kids Infiltrate Life-Size Video Game, The Boston Globe, Mar. 1, 2013.
Tenley Woodman, "Tomb opens doors to Indy-style adventures", www.theedge.bostonherald.com, Sep. 22, 2004.
Teresa Mendez, "At some museums, you're now Exhibit A", The Christian Science Monitor, Oct. 19, 2007.
Teresa Mendez, "At some museums, you're now Exhibit A", The Christian Science Monitor, www.csmonitor.com, Oct. 19, 2007.
Various, Notable Quotations from Recent TOMB Press, 5WITS, May 2008.
Various, Recent Press Praising TOMB, now showing at 5WITS Boston, 5WITS, Jul. 2009.

\* cited by examiner

SYSTEMS AND METHODS FOR CONFIGURING AVATARS IN INTERACTIVE PHYSICAL ENVIRONMENTS

CROSS-REFERENCE TO RELATED PATENT APPLICATIONS

This application claims the benefit of and priority to U.S. Provisional Patent Application No. 63/209,957, filed Jun. 11, 2021, which is incorporated herein by reference in its entirety.

BACKGROUND

The described technology relates generally to the field of interactive physical environments and, in particular, interactive physical environments that provide entertainment to patrons.

SUMMARY

In one aspect, the described technology relates to an interactive physical environment providing entertainment to a patron. The interactive physical environment includes a room formed by modular walls coupled to one another. The room presents a game to a patron that has game components positionable in a first game configuration and a second game configuration. The first game configuration presents a first challenge to a patron of the room and the second game configuration presents a second challenge to the patron. The second game configuration representing a solution to the first challenge. A radio frequency identification (RFID) tag is associated with the patron, and a control system receives patron identification information from the RFID tag. The control system selectively modifies the game presented by the room responsive to the received patron identification information.

In some embodiments, the room includes a door and the control system can operate the door to control ingress to the room. In other embodiments, the room includes a screen displaying patron status information received from the control system. In some of these other embodiments, the screen displays an avatar associated with the patron that is received from the control system. In others of these embodiments, the screen displays a hint for the game that is received from the control system.

In other embodiments, the control system monitors patron performance while playing the game. In still other embodiments, the control system modifies an avatar associated with the patron responsive to the patron performance. In yet other embodiments, the control system awards a reward point to the patron responsive to the completion of the game by the patron. The interactive physical environment may also include a registration kiosk to receive information from the patron that is used to associate the RFID tag with the patron.

In another aspect, the described technology relates to a method for providing entertainment to a patron in a physical environment. Modular walls are coupled to one another to form a room. A game is presented to a patron, in the formed room. The game has components positionable in a first game configuration and a second game configuration. The first game configuration presents a first challenge to a patron and the second game configuration presenting a second challenge to the patron. The second game configuration representing a solution to the first challenge. A radio frequency identification (RFID) tag is associated with the patron. Patron identification information from the RFID tag associated with the patron is received by a control system. The control system uses the received patron identification information to selectively modify the game presented by the room.

In some embodiments, a door is provided to control ingress to the room. In other embodiments, patron status information is received from the control system and displayed on a screen. In still other embodiments, an avatar associated with the patron is received from the control system and displayed on a screen. In some of these still other embodiments the control system modifies the avatar associated with the patron responsive to the patron performance.

In some other embodiments, a hint for the game is received from the control system and displayed on a screen. In yet other embodiments the control system monitors patron performance. In other embodiments, the control system awards a reward point to the patron responsive to the completion of the game by the patron. Information from the patron can be received at a registration kiosk and used to associate the RFID tag with the patron.

In another aspect, the described technology relates to an interactive physical environment providing entertainment to a patron. A scanner identifies a patron of the interactive physical environment and transmits patron identification information. A sensor determines and transmits patron game performance data. A control system receives patron identification information from the scanner and patron game performance data from the sensor and, responsive to the received patron identification information and patron game performance data, modifies an avatar associated with the patron.

In some embodiments, the scanner is a radio-frequency identification (RFID) tag scanner. In other embodiments, the scanner is a QR code scanner, bar code scanner or biometric characteristic scanner. The scanner may transmit data via a wireless network. In some embodiments, the control system determines that a length of time taken by the patron to complete a game has exceeded a predetermined limit while in other embodiments the control system determines whether an objective of the game has been achieved by the patron. In further embodiments, the control system configures an avatar associated with the patron by: retrieving, from a data storage element, a data structure representing an avatar associated with the patron via the patron identifying information; updating the data structure responsive to the received game performance data; and storing the updated data structure in the data storage element.

In another aspect, the described technology relates to a method for providing entertainment to a patron via an interactive physical environment. A scanner identifies a patron of the interactive physical environment and transmits patron identification information. A sensor determines and transmits patron game performance data. A control system receives the transmitted patron identification information and patron game performance data and modifies an avatar associated with the patron.

In some embodiments, the scanner identifies the patron by scanning a radio-frequency identification (RFID) tag scanner associated with the patron. In other embodiments, the scanner identifies the patron by scanning a QR code, bar code, or biometric characteristic associated with the patron. In further embodiments, the scanner transmits patron identification information via a wireless network. In still further embodiments, the sensor transmits patron game performance data via a wireless network. In some embodiments, the control system determines that a length of time taken by the patron to complete a game exceeds a predetermined threshold while in other embodiments the control system determines whether an objective of the game has been achieved by the patron. In yet further embodiments, modifying the avatar includes retrieving, from a data storage element, a data structure representing an avatar associated with the patron via the patron identifying information, updating the data structure responsive to the received patron game performance data, and storing the updated data structure in the data storage element. In some of these yet further embodiments the data structure is updated to include a reward amount based on the patron game performance data.

In another aspect, the described technology relates to a self-resetting game provided by an interactive physical environment that minimizes the need for physical intervention to set the game up for subsequent patrons. A plurality of game components are repositionable within a game room provided by the interactive physical environment. In a first game configuration, the game components present a first challenge, which requires reconfiguration of the game components into a first solution configuration. In a second game configuration, the game components present a second challenge requiring reconfiguration of the plurality of game components into a second solution configuration, the second game configuration is different from the second solution configuration. The first game configuration may be different from the first solution configuration. In some embodiments, the second presentation of the plurality of game components is the first solution configuration. In other embodiments the first presentation of the plurality of game components is the second solution configuration.

In another aspect, the described technology relates to a method for providing a self-resetting game in a game room provided by an interactive physical environment. A plurality of game components are provided that are repositionable within a game room provided by the interactive physical environment. A control system determines that the plurality of game components are in a first configuration presenting a first challenge, the first challenge requiring reconfiguration of the plurality of game components into a first solution configuration. A control system allows a first patron into the game room. The control system detects that the first patron has completed the game and that, after completion by the first patron, the plurality of game components are in second configuration presenting a second challenge, the second challenge requiring reconfiguration of the plurality of game components into a second solution configuration, the second game configuration different from the second solution configuration.

In some embodiments, the control system determines that the first game configuration is different from the first solution configuration. In other embodiments, the control system determines that the second presentation of the plurality of game components is the first solution configuration. In still other embodiments, the control system determines that the first presentation of the plurality of game components is the second solution configuration. In still other embodiments, a second patron is allowed into the game room and the control system determines, after completion by the second patron, that the game components are in a third presentation of the plurality of game components presenting the first challenge. In further embodiments, the control system determines a completion of the game by the first patron by detecting the expiration of a predetermined time period or by detecting that the plurality of game components comprise the first solution configuration.

This summary is illustrative only and is not intended to be in any way limiting. Other aspects, inventive features, and advantages of the devices or processes described herein will become apparent in the detailed description set forth herein, taking in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
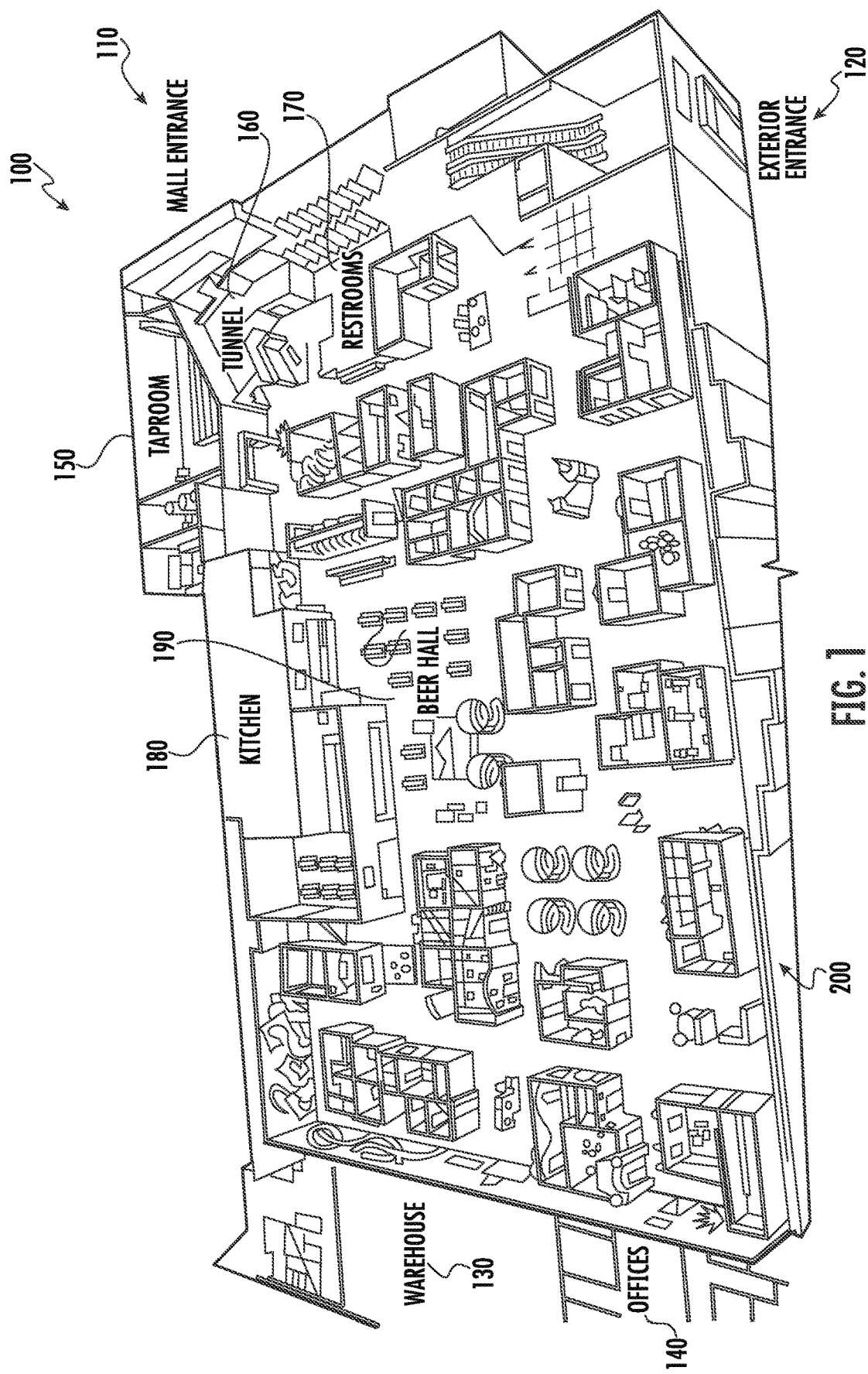
FIG. 1 is a perspective view of an interactive physical environment, according to an example embodiment.

Referring now to FIG. 1, and in overview, an interactive physical environment 100 is shown that includes a warehouse 130, offices 140, a taproom 150, a tunnel 160, restrooms 170, a kitchen 180, beer hall 190 and one or more modular game rooms 200. In other embodiments, the interactive physical environment includes a subset of the elements depicted in FIG. 1. For example, in one embodiment, the interactive physical environment includes a warehouse 130, restrooms 170 and one or more modular game rooms 200. Although a specific orientation of rooms (e.g., entrances 110, 120, warehouse 130, offices 140, taproom 150, tunnel 160, restrooms 170, kitchen 180, beer hall 190, and modular game rooms 200) are depicted in FIG. 1, it should be appreciated that the rooms can take on any configuration that would be suitable to provide a user experience.

Still referring to FIG. 1, and in greater detail, the interactive physical environment 100 may be configured as an entertainment environment. The interactive physical environment 100 may be defined, or otherwise positioned, within a building environment. In some embodiments, the interactive physical environment 100 may be defined within a stand-alone building, mall, or the like. In other embodiments, the interactive physical environment 100 may be a virtual room including one or more virtual environments. The interactive physical environment 100 may be configured to provide at least one of a gaming, food, or drink experiences to a user or patron.

The interactive physical environment 100 may include one or more entrances, shown as first entrance 110 and second entrance 120. The first entrance 110 and the second entrance 120 may be substantially similar to one another. In other embodiments, the first entrance 110 may be substantially different to the second entrance 120. The entrances 110, 120 may provide the user entry into the interactive physical environment 100. As shown in FIG. 1, the first entrance 110 may direct the user through a tunnel 160. The tunnel 160 may provide a barrier, boundary, or the like about the user when the user is traveling through the tunnel 160. In some embodiments, the tunnel 160 includes one or more stations at which the user may register themselves, such as by associating a user profile with a token. Accordingly, the second entrance 120 may permit the user access into the interactive physical environment 100, without traveling through any tunnel. In some embodiments, the second entrance 120 may also include a tunnel 160. Although only two entrances 110, 120 are described above, the interactive physical environment 100 may include more than two entrances. The entrances 110, 120 may include one or more doors that selectively open and close to permit the user access to the interactive physical environment 100. The doors may be automatic doors, manual doors, or a combination thereof.

The interactive physical environment 100 may further include a warehouse 130. The warehouse 130 may be positioned opposite the first entrance 110, as depicted in FIG. 1. In some embodiments, the warehouse 130 may be positioned adjacent the first entrance 110. The warehouse 130 may store and/or house components for use in the interactive physical environment 100. For example, the warehouse 130 may include spare components for a modular game room 200. In another example, the warehouse 130 may store a control system for the modular game rooms 200 present in the interactive physical environment 100. The interactive physical environment 100 may include offices 140. In some embodiments, the offices 140 may be positioned adjacent the warehouse 130. The offices 140 may include one or more desks and/or office space where employees of the interactive physical environment 100 may have a desired space or choose a space to work and/or relax.

The interactive physical environment 100 may further include a taproom 150. The taproom 150 may be a room positioned adjacent the first entrance 110, where a patron may go to for a beverage and/or to relax. In other embodiments, the taproom 150 may be positioned distal the first entrance 110. Additionally or alternatively, the taproom 150 may include one or more tables, where a patron can sit and relax.

The interactive physical environment 100 may include a restrooms 170. The restroom 170 may include one or more restrooms for the patrons. The restroom 170 may be positioned adjacent the first entrance 110, between the first entrance 110 and the second entrance 120. The interactive physical environment 100 may include more than one restroom 170. For example, the interactive physical environment 100 may include a first restroom 170 designated for patron and/or employee use and a second restroom 170 designated for employee use.

The interactive physical environment 100 may include a kitchen 180. The kitchen 180 may be positioned adjacent the taproom 150. In other embodiments, the kitchen 180 may be positioned distal the taproom 150. In still other embodiments, the interactive physical environment 100 may include additional kitchens 180. The kitchen 180 may be a room where patrons can order and/or eat food. According to one example embodiment, the kitchen 180 may include a menu where the patron can place a food/drink order off of the menu. Additionally or alternatively, the kitchen 180 may include a pre-made section where the patron can order food/drinks that are pre-made. The interactive physical environment 100 may include a beer hall 190. The beer hall 190 may be positioned adjacent the kitchen 180. Additionally or alternatively, the beer hall 190 may be positioned centrally within the interactive physical environment 100. The patron may be able to order and/or drink a beverage (e.g., beer, etc.) within the beer hall 190. The patron may otherwise order a beverage at the taproom 150 and enjoy the beverage at the beer hall 190.

The interactive physical environment 100 may include one or more modular game rooms 200, where the patron can interact with games provided in the modular game rooms 200 to achieve challenges and receive a patron experience. As will be discussed in greater detail herein, a control system may control, track, or otherwise determine a game status within the modular game rooms 200. The interactive physical environment 100 may include any number of modular game rooms 200. In some embodiments, the interactive physical environment 100 includes more than 10 modular game rooms 200. In other embodiments, the interactive physical environment 100 includes more than 25 modular game rooms 200. In still other embodiments, the interactive physical environment 100 includes between 40 and 50 modular game rooms 200. In still further embodiments, the interactive physical environment 100 includes more than 50 modular game rooms 200. In further embodiments, the interactive physical environment 100 includes more than 100 modular game rooms 200. The modular game rooms 200 may each include different games or challenges different from the other modular game rooms 200 present in the interactive physical environment. In other embodiments, certain ones of the modular game rooms 200 may provide similar games or challenges. In some of these embodiments, game rooms 200 may be grouped together based on theme, e.g., a cluster of rooms may provide outer space themed games. The different games may be a combination of physical and mental challenges, although other game types may be contemplated. The different challenges may require patrons to exercise a combination of strength, agility, skill, logic, memory, and communication, although other challenges may be contemplated.

Figure 2:
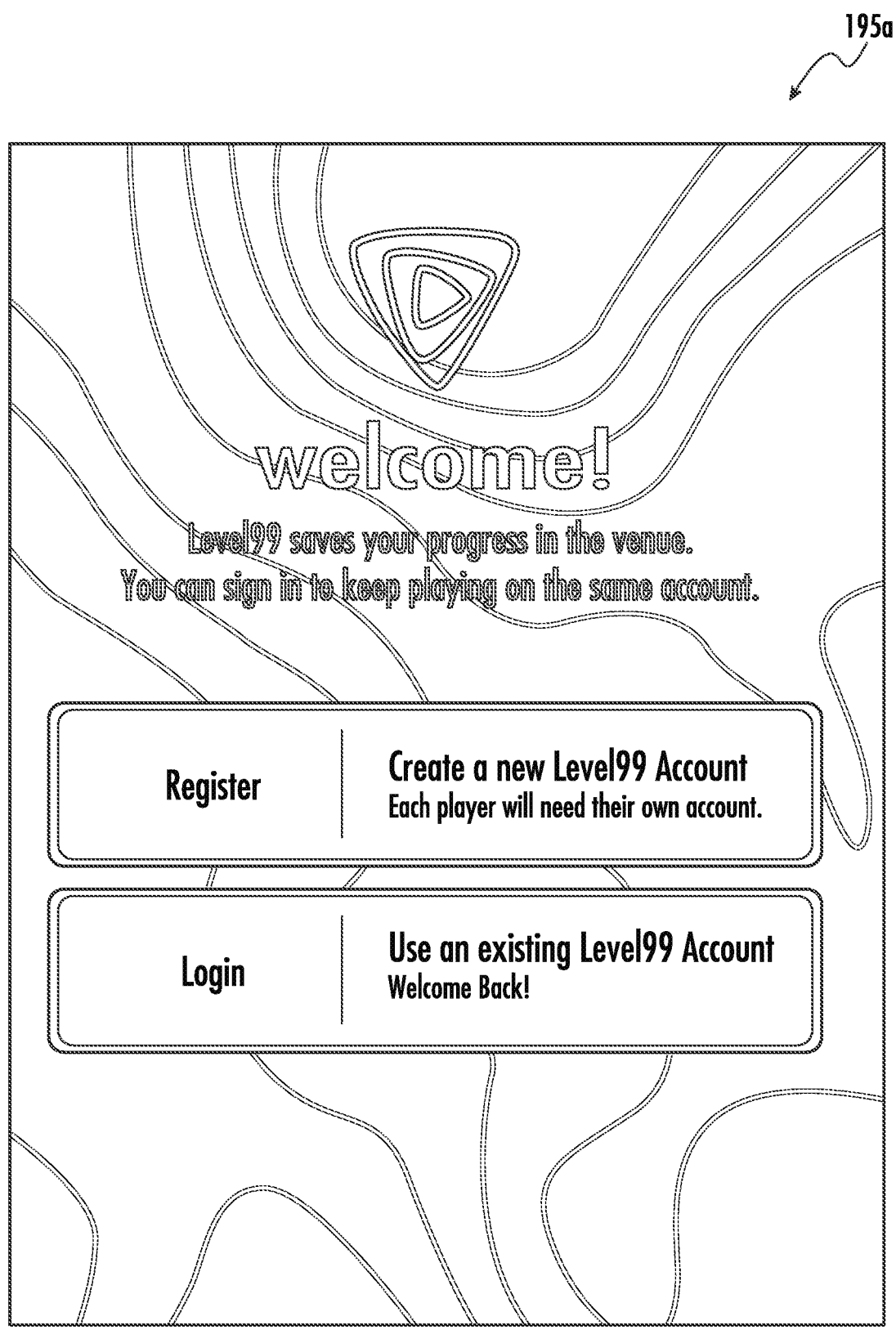
FIGS. 2-6 are various views of a check-in screen for a check-in process of a patron entering the interactive physical environment of FIG. 1, according to example embodiments.
Figure 3:
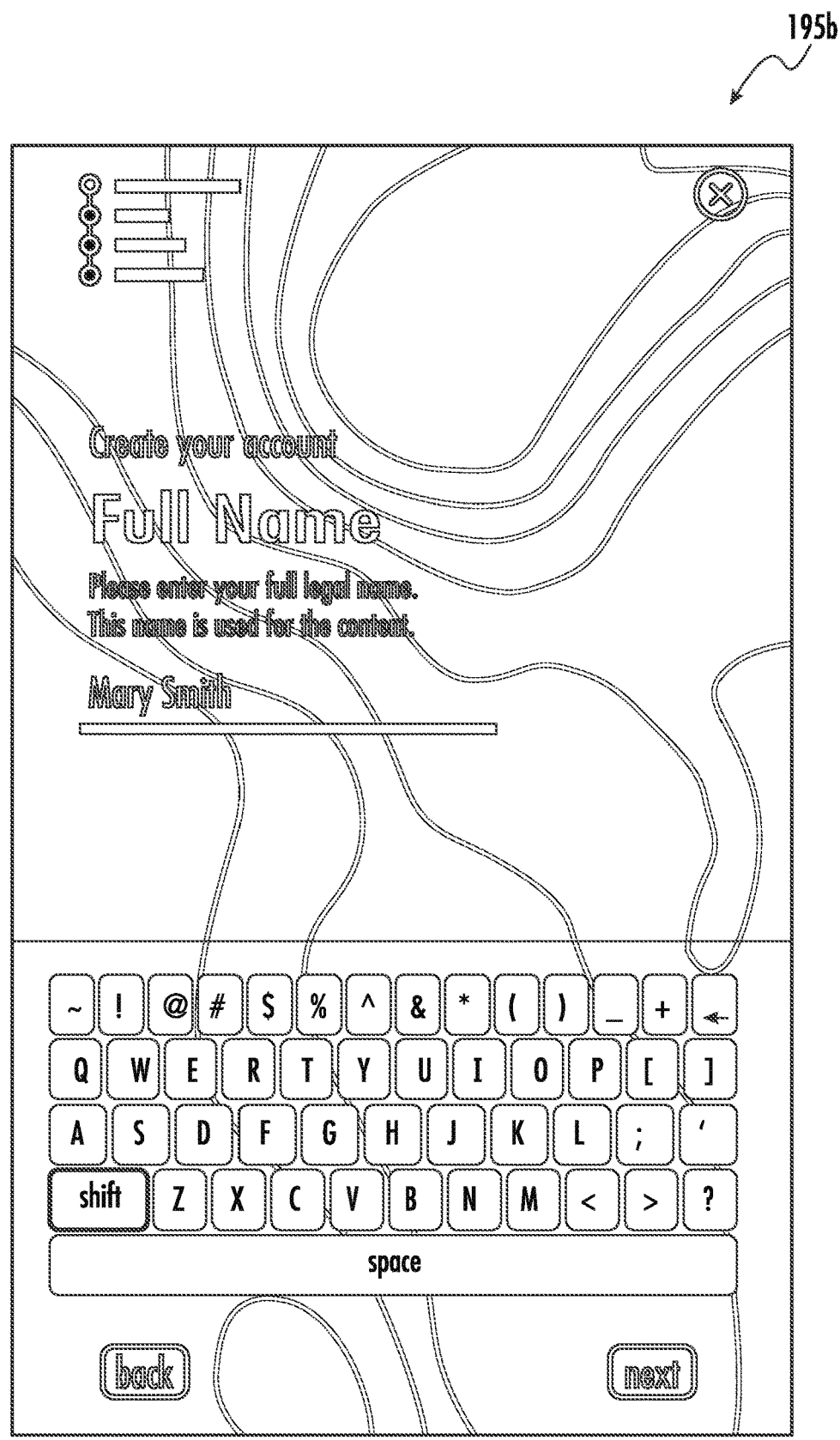
Figure 4:
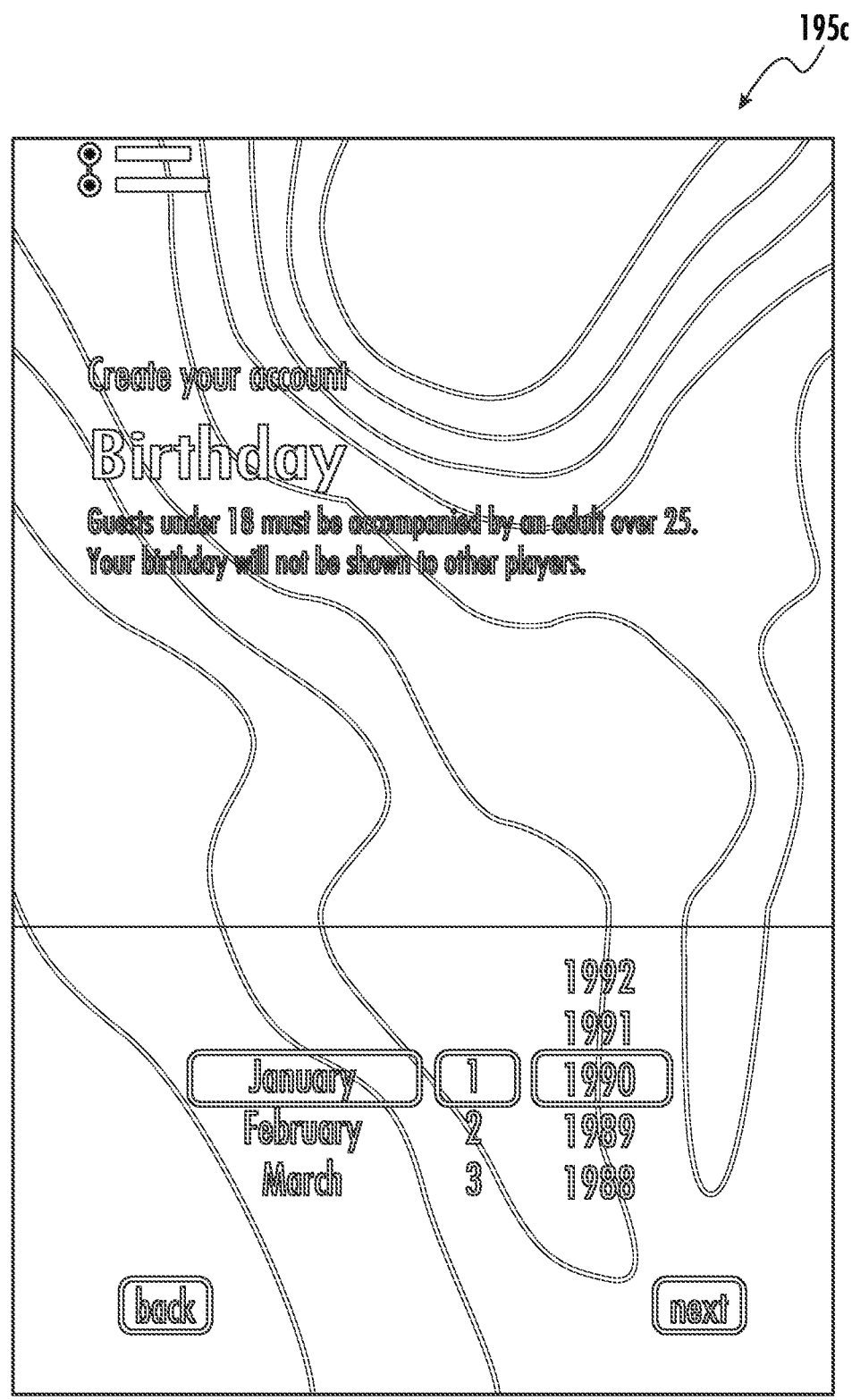
Figure 5:
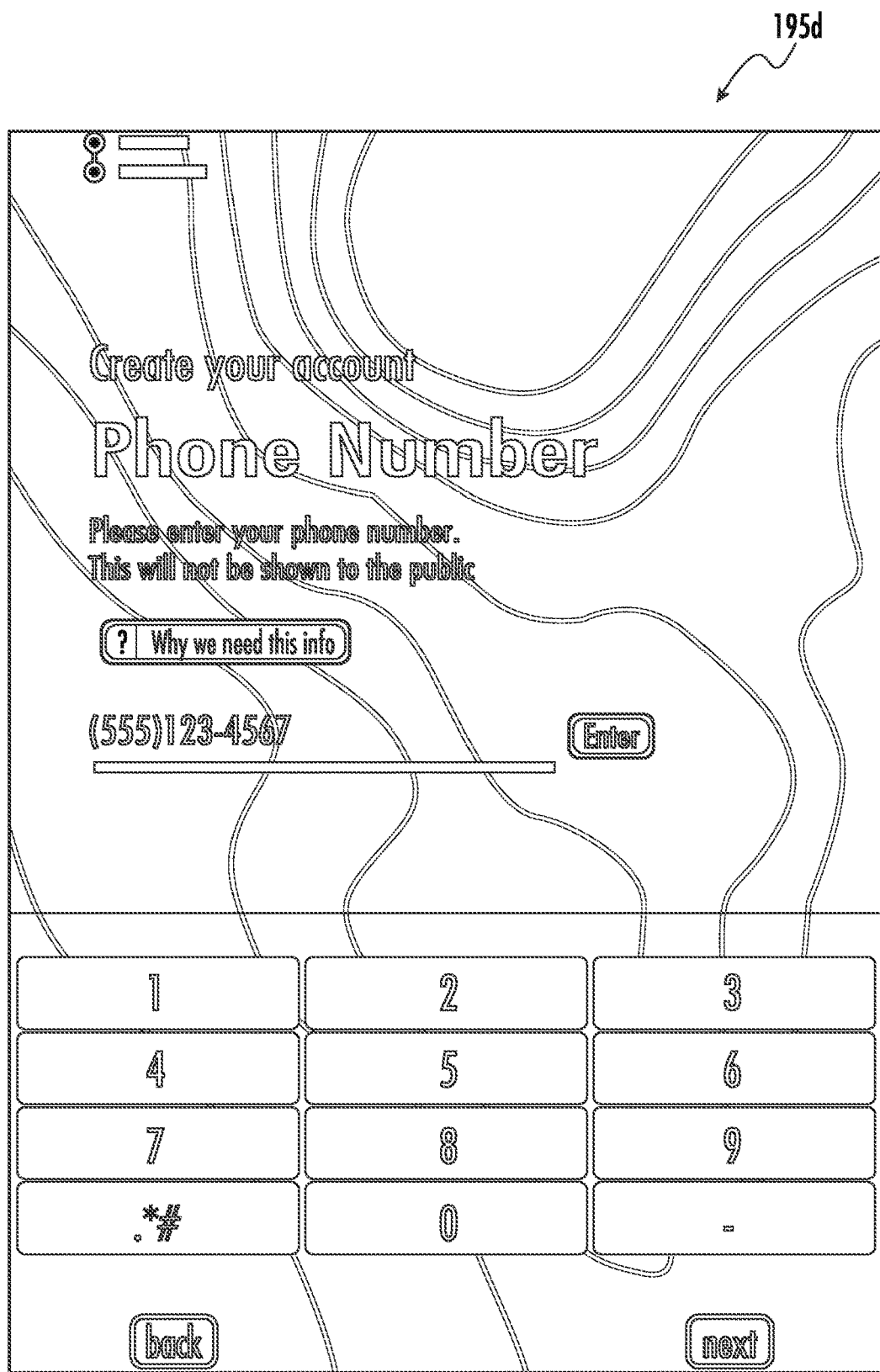
Figure 6:
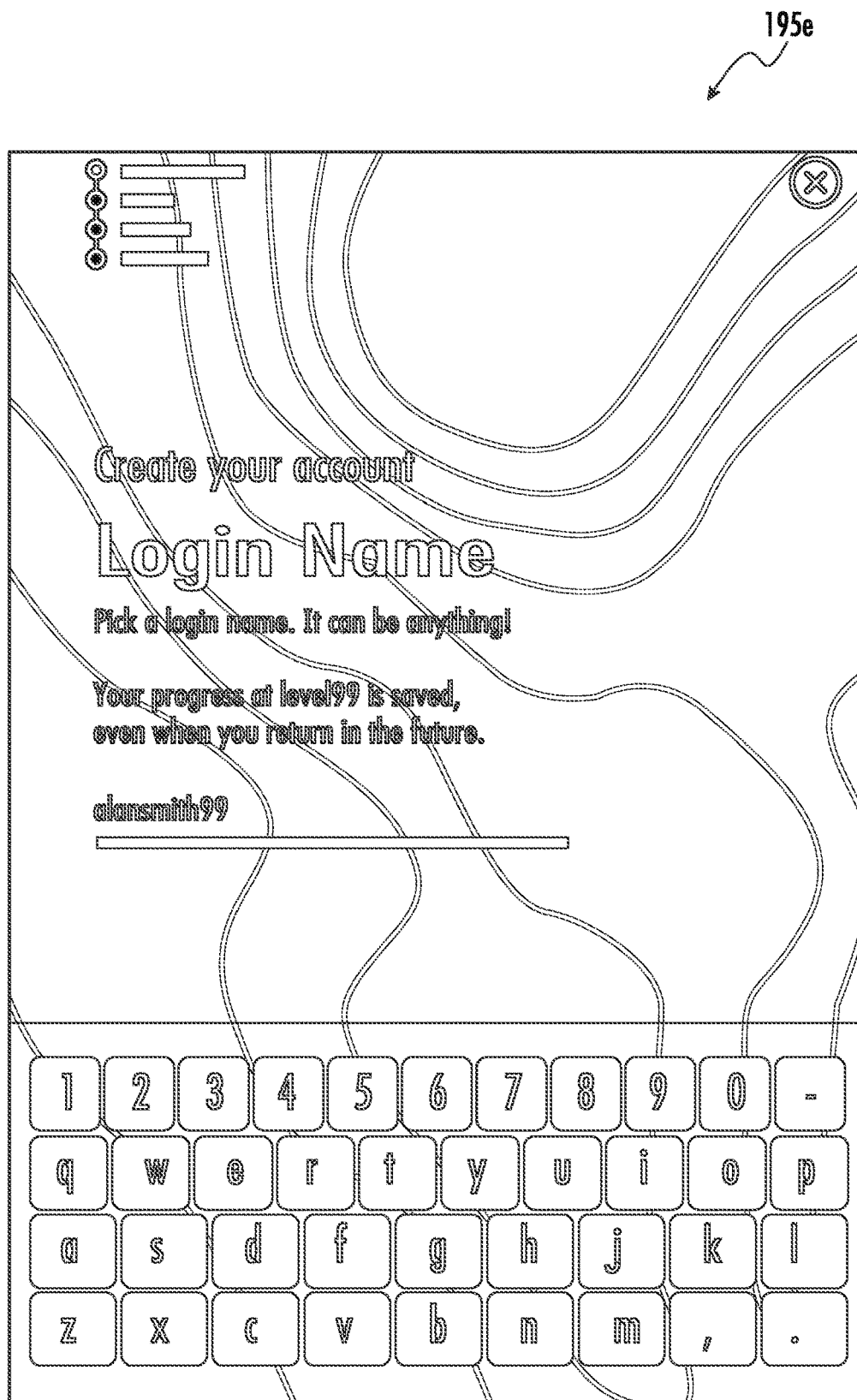

Upon entering the interactive physical environment 100, the patron may need to check in. The check in may be a first time check in for a new patron, or an existing check-in for an existing patron. A new patron is required to create a new profile. One embodiment of a process for creating the new profile is shown in FIGS. 2-6. As shown in FIG. 2, upon entrance into the interactive physical environment 100, the patron selects between registering an account or logging in to an existing account 195a. When the patron selects to register a new account, the patron is asked to identify a name for the account 195b, as shown in FIG. 3. As shown in FIG. 4, the patron may then input their birthday 195c. After the birthday is entered, the patron may then enter in a phone number 195d, as shown in FIG. 5. As shown in FIG. 6, the patron may then input a desired login name 195e. Existing patrons may login using existing login credentials to access their profile. The kiosk allows a user profile to be associated with an RFID tag, QR code or bar code associated with the patron. Alternatively, the kiosk may be used to collect biometric characteristics for identifying the patron. In other embodiments, a patron's login at the kiosk may activate an applet on their mobile phone to be used to identify the patron in the environment 100. Although a specific order of steps has been described for registering the patron, it can be appreciated that the steps may happen in any order and, in some embodiments, certain steps may be omitted. For example, in some embodiments, the patron my not be required to enter their birthday or phone number.

Figure 7:
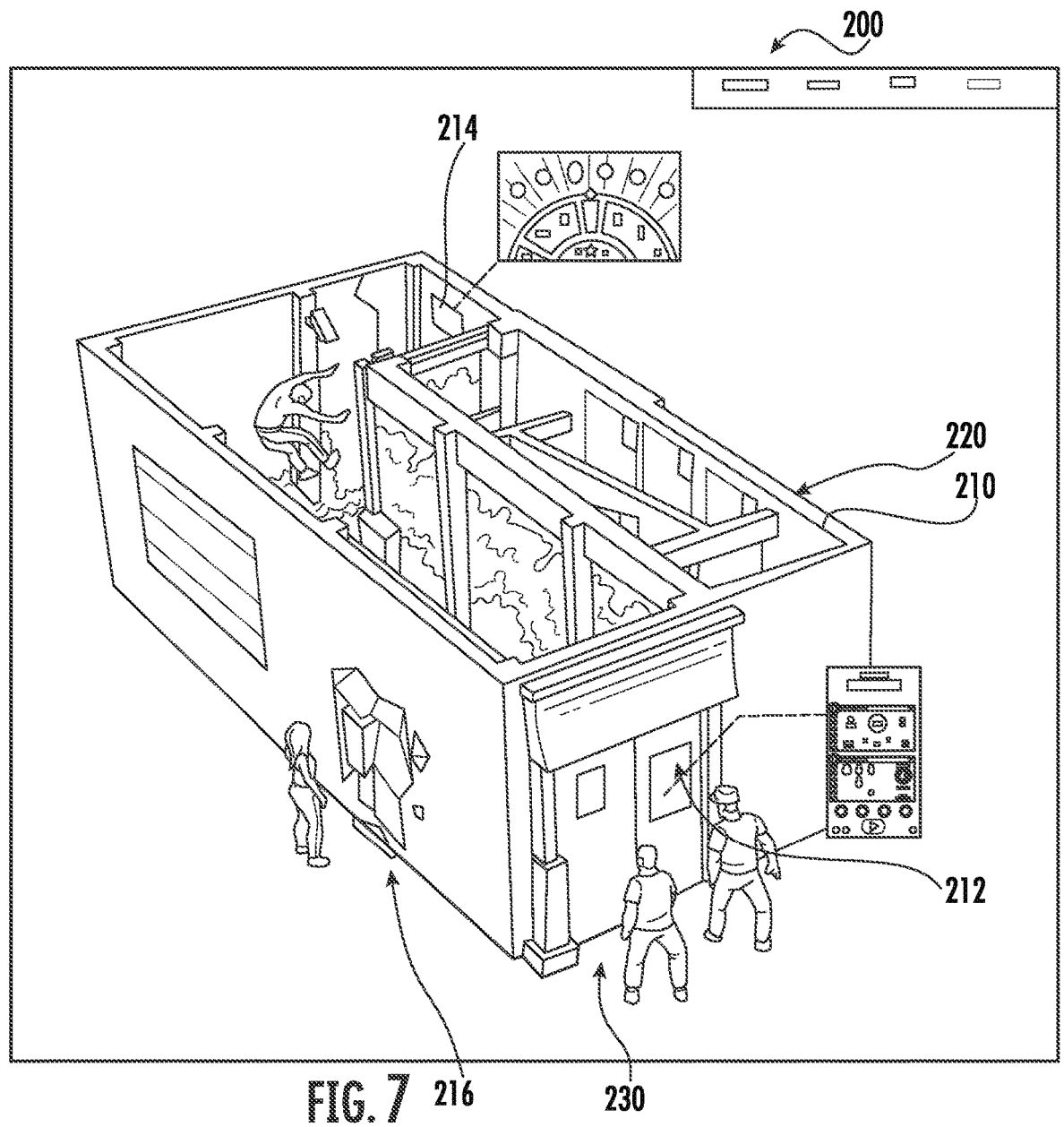
FIG. 7 is a perspective view of a modular room of the interactive physical environment of FIG. 1, according to an example embodiment.
Figure 8:
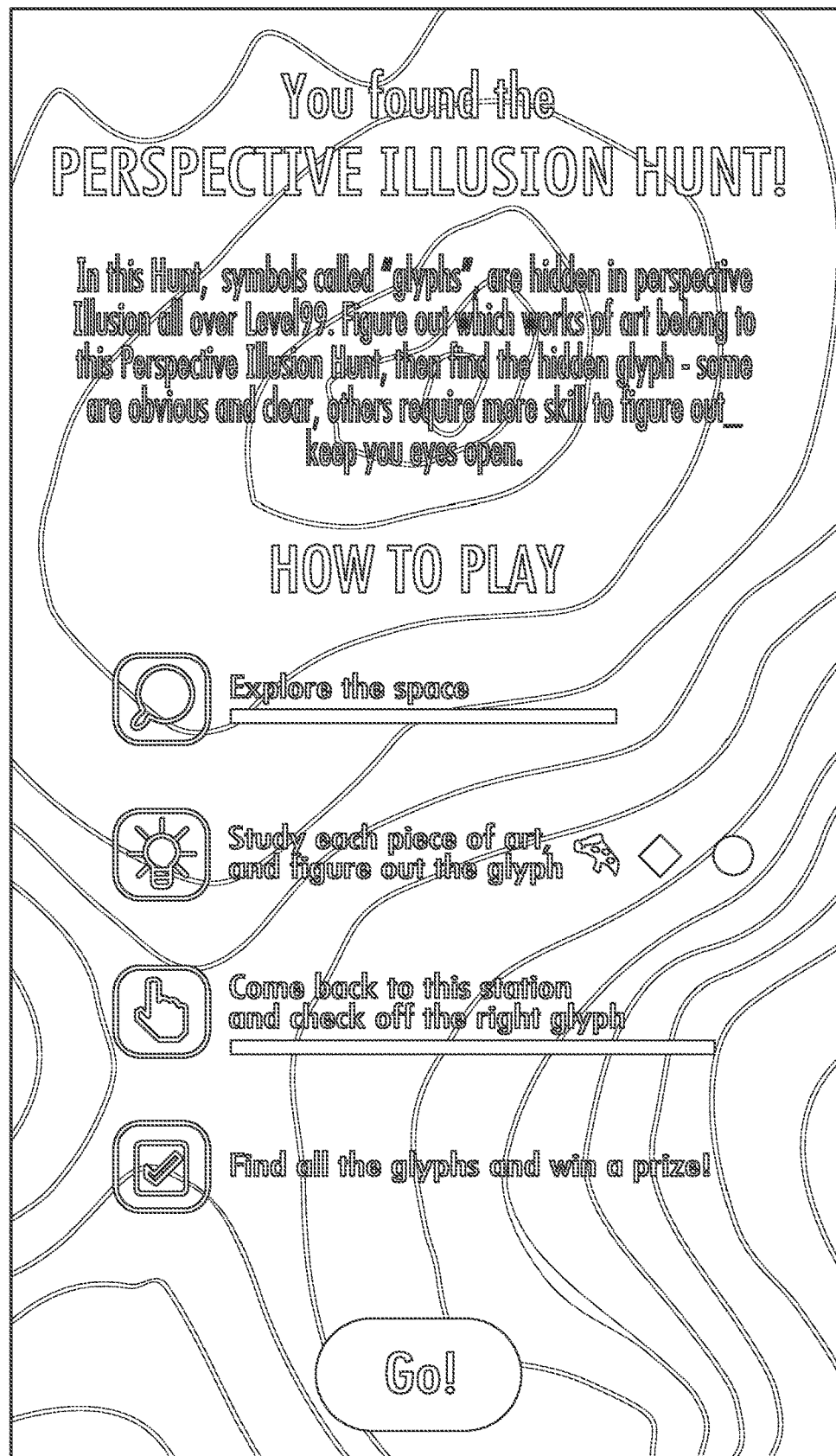
FIG. 8 is a view of a display screen of a hunt kiosk of the interactive physical environment of FIG. 1, according to an example embodiment.

Referring now to FIGS. 7 and 8, the modular game rooms 200 may include walls 210 and other physical structures. The walls 210 may create a physical boundary for a patron to be positioned within. According to one embodiment, a modular game room 200 may not include a ceiling, such that the patrons positioned within the modular game room 200 may see outside of the modular game room 200. The walls 210 may form interior rooms 220 within the modular game room 200. The modular game rooms 200 may include interior rooms 220 for games having multiple steps and/or challenges. The interior rooms 220 may define any dimensions or configurations for the desired game. For example, the modular room 200 may include two interior rooms 220 for games having two steps and/or challenges. In another example, the modular room 200 may not include any interior rooms 220 for games having one step and/or challenge. According to one example embodiment, the modular game rooms 200 may be defined in open areas. In such an embodiment, the modular game rooms 200 may not include any walls 210, where the modular game rooms 200 may instead be open world concepts.

A patron may enter the modular room 200 through one or more entrances, shown as room entrance 230. The room entrance 230 may permit the patron access within the modular game rooms 200. By way of example, patrons may enter into the modular game rooms 200 via the room entrance 230 and additionally exit the modular game rooms 200 via the room entrance 230. In other embodiments, the modular room 200 may include additional entrances, where the patrons can enter into the modular room 200 via the room entrance 230 and exit the modular room 200 via the additional entrance. The modular room 200 may be configured to a group size between two and six patrons. In other embodiments, the modular room 200 may be configured for group sizes exceeding six patrons. According to one example embodiment, the modular room 200 may include a game time of between 1 and 10 minutes. More specifically, the game time may be within 2 and 4 minutes. In other embodiments, the game time may exceed 10 minutes.

The modular game rooms 200 may include a patron kiosk 212. In some embodiments, the patron kiosk provides information to a patron regarding the game provided by the game room 200. A patron may also use the patron kiosk 212 to access, edit, and/or otherwise manage a patron card. As will be discussed in greater detail herein, the patron card may be a unique patron card designated and customized for a specific patron. The patron card may be accessible and managed by the patron associated with a specific patron card. The patron may access the patron card via the patron kiosk 212 before or after the patron plays the game. In other embodiments, the patron may access the patron card during the game. The patron may access the patron card before entering the modular room 200 to see profile details, such as currency currently earned, level, achievement, currency needed to achieve a new level or purchase in-game or real-world elements, remaining time, a map of the space, or the like. In one embodiment, the patron may scan a radio-frequency identification (RFID) tag via the patron kiosk 212 to open and/or access the desired patron card. In other embodiments, the patron kiosk may accept alternate forms of identification to allow the patron to access the patron card (e.g., bar code, QR code, a Bluetooth device, retinal identification, facial identification, fingerprint, etc.).

The modular game room 200 may include an exit monitor 214. The exit monitor 214 may be positioned within the modular game room 200, where patrons within the modular room 200 may see and/or access the exit monitor 214. In some embodiments, the exit monitor 214 displays instructions or information to patrons in the room 200. In other embodiments, the exit monitor 214 may display a status of the game, including a status level identifying the game status or level of award achieved. For example, the exit monitor 214 may display three stars, where each star resembles a level of award achieved (e.g., three stars being the highest award, etc.). The patrons may achieve additional challenges within the game to be awarded additional stars. Additionally or alternatively, the exit monitor 214 may display a random element, such as a prize wheel. The random element may be used after completion of the game to award additional prizes to the patron. For example, in one embodiment the random element is a wheel, and additional prizes may be awarded upon a successful spin of the wheel. The prizes may include in-game currency or reward points such as coins, keys, reward multiplier, power-ups, special abilities, upgrades to player avatar, etc., or real-world prizes such as apparel, merchandise, food, beverage, etc. In other embodiments, the prizes may be redeemable tokens or passes for additional play time. In some embodiments, the random element may only be used upon successful completion of the game. In other embodiments, the random element may be used following every game, regardless of whether the patrons were successful or not.

The modular room 200 may include external games, shown in FIG. 7 as game hunts 216. Game hunts 216 may include an additional patron interface, referred to herein as hunt kiosk, coupled to an exterior of the modular game rooms 200. The hunt kiosk may be substantially similar to the patron kiosk 212. The patrons not playing the game within the modular room 200 may play the game hunts 216. Additionally or alternatively, the hunt kiosk may not be coupled to the exterior of the modular game rooms 200 but may, instead, be freestanding or coupled to a wall of the environment 100. The game hunts 216 may provide an additional patron experience other than the games within the modular game rooms 200. The game hunts 216 may be games requiring the patrons to find and/or locate particular components (e.g., artifacts, art, technology, shapes, symbols, etc.). The game hunts 216 may include different systems other than the systems for the modular game room 200 such that the patrons may have more time or different awards for the game hunts 216. In other embodiments, the game hunts 216 may include a substantially similar system to the system for the modular game room 200.

Figure 9:
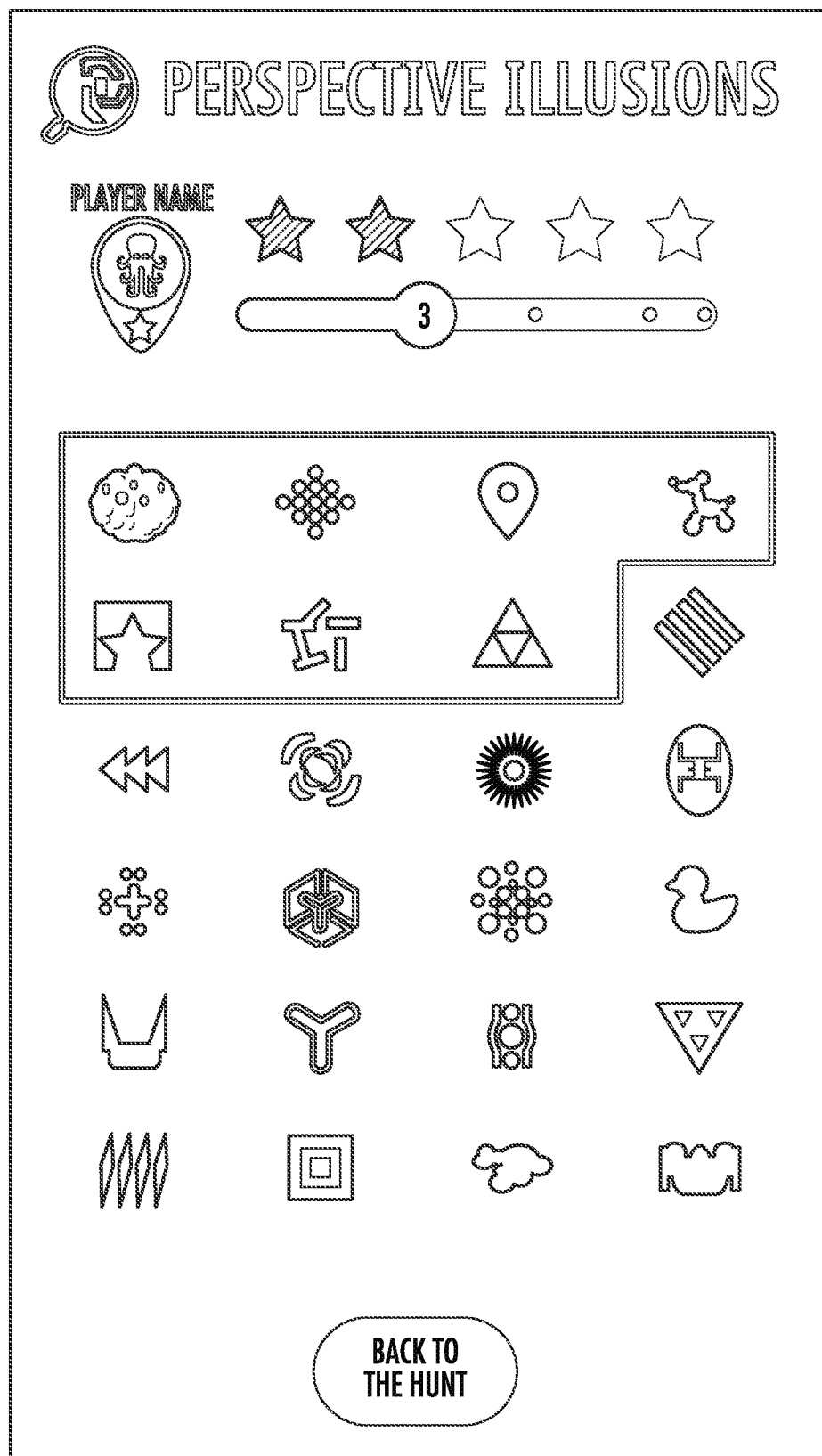
FIGS. 9 and 10 are example views of components for use in a game hunt of the interactive physical environment of FIG. 1, according to an example embodiment.
Figure 10:
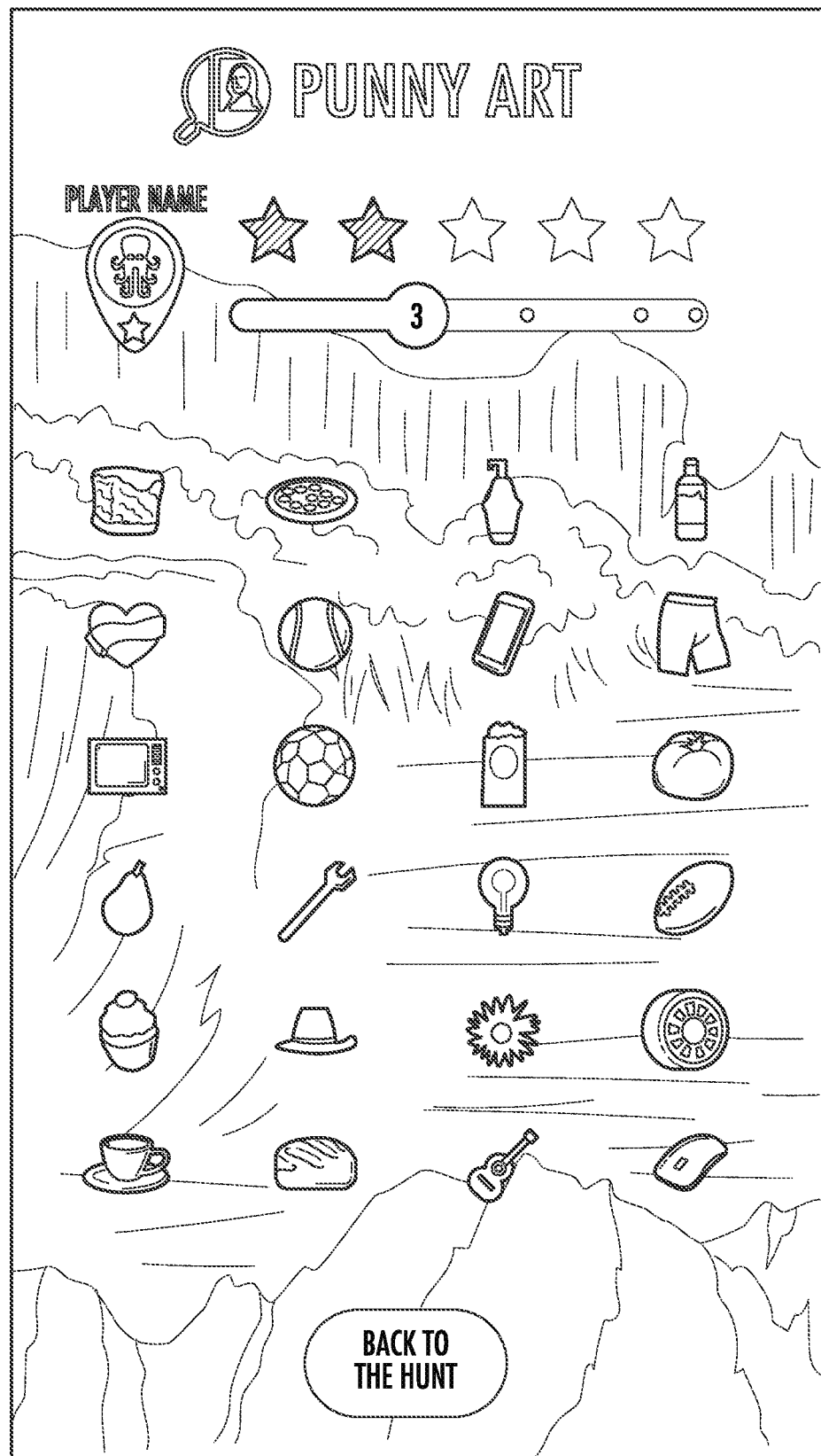
Figure 11:
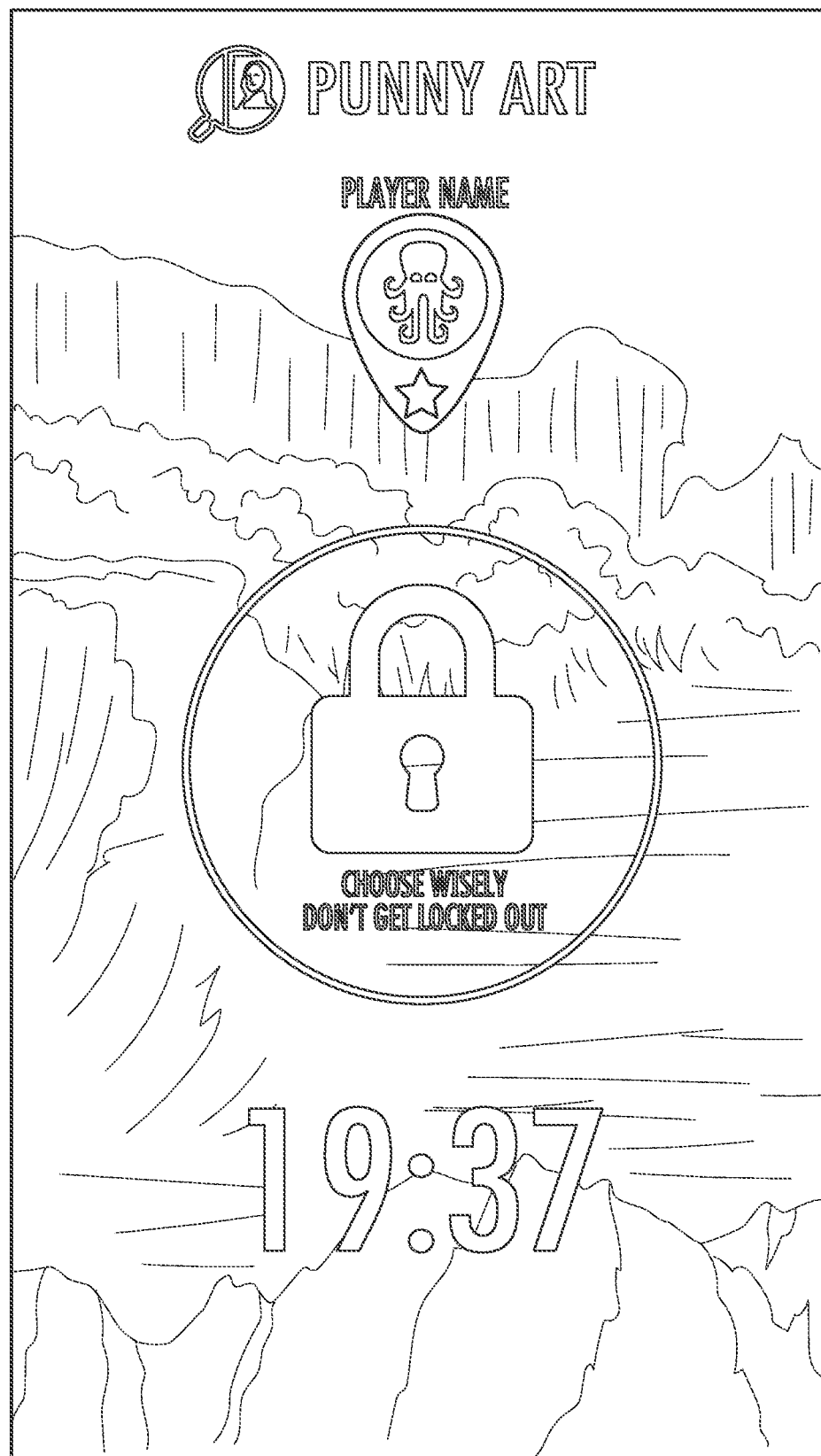
FIG. 11 is another view of a display screen of a hunt kiosk of the interactive physical environment of FIG. 1, showing a locked screen, according to an example embodiment.
Figure 12:
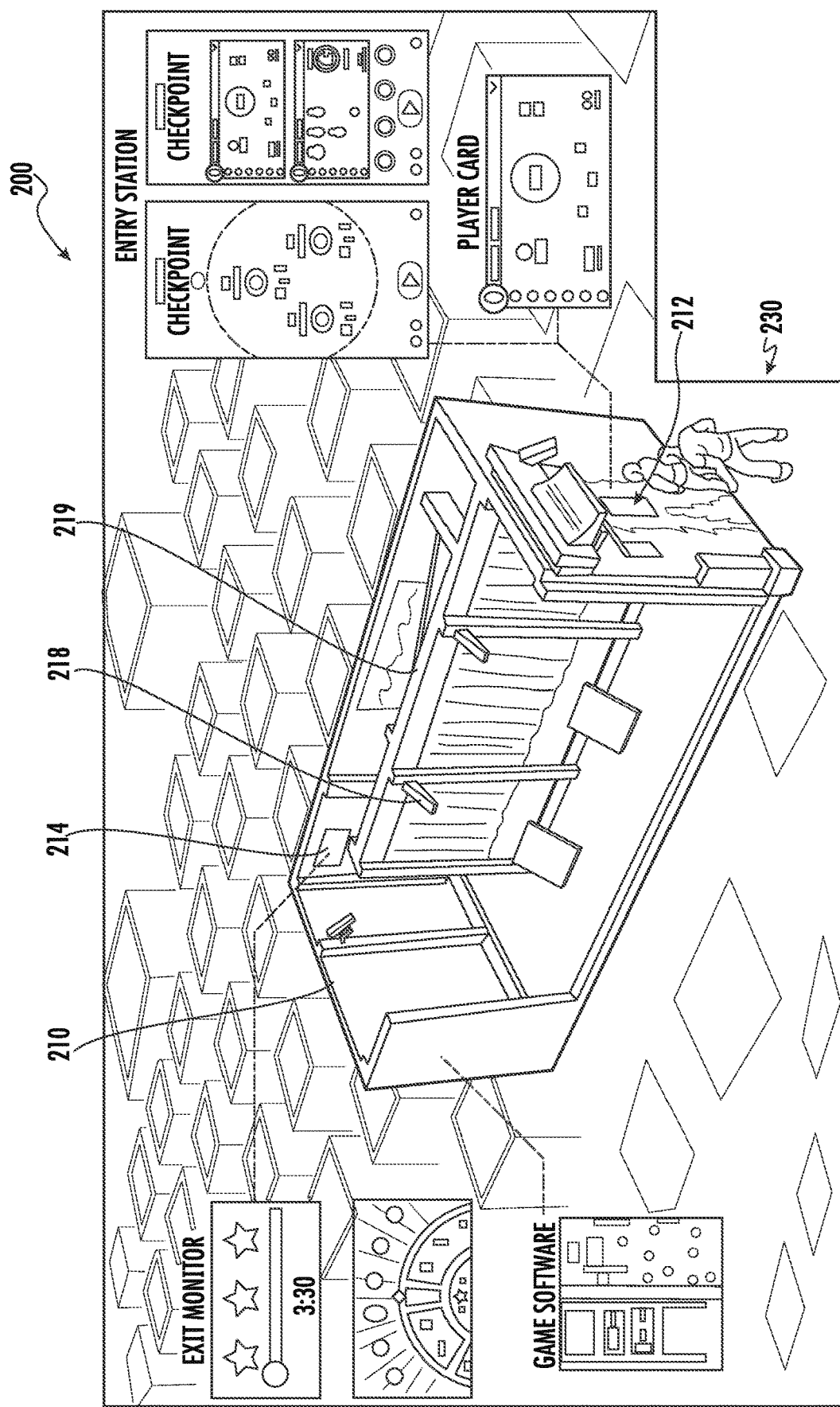
FIG. 12 is another perspective view of the modular room of interactive physical environment of FIG. 1, according to an example embodiment.
Figure 13:
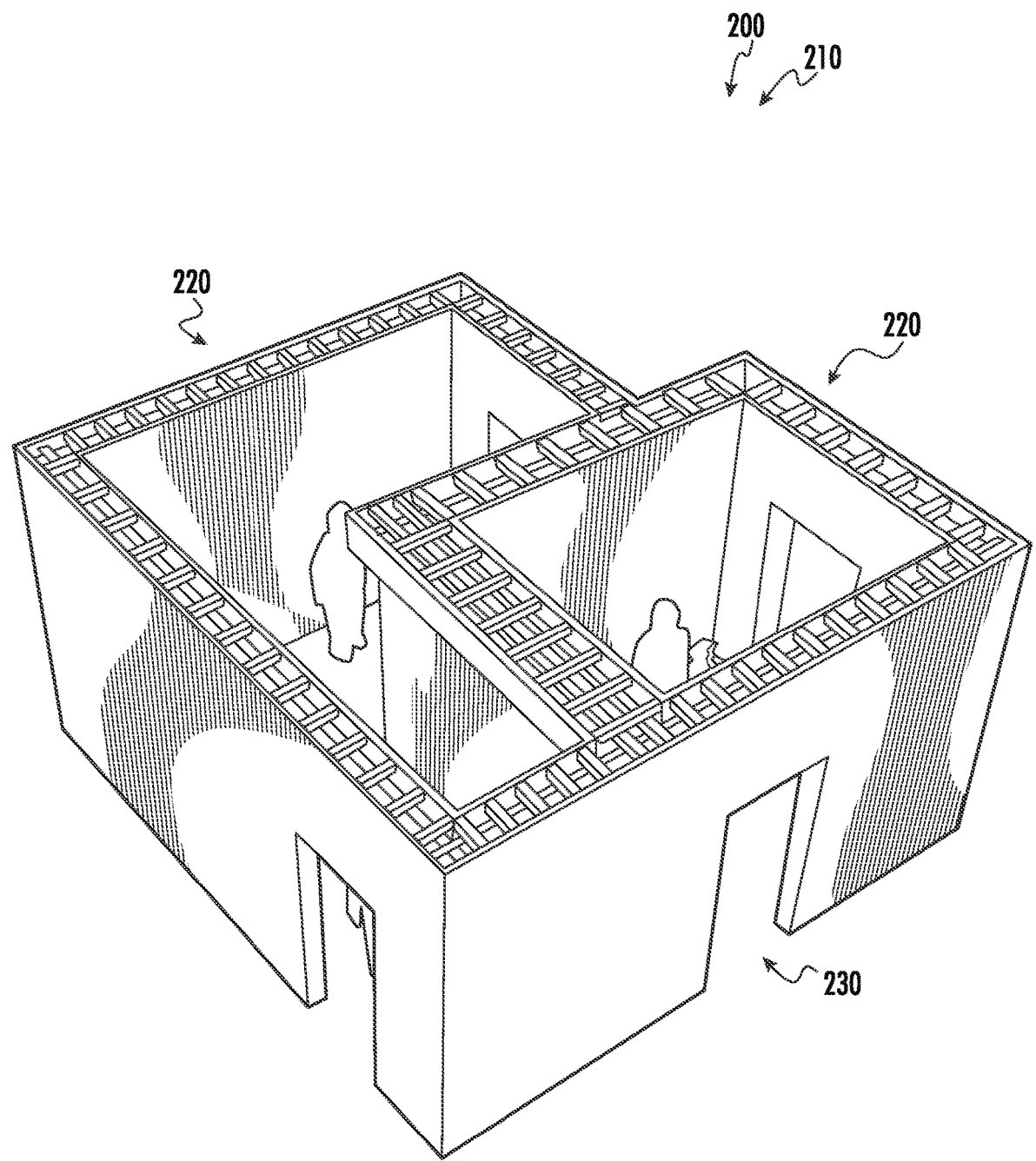
FIG. 13 is perspective view of a modular room of the interactive physical environment of FIG. 1, showing an example wall configuration, according to an example embodiment.

To check-in to the hunt kiosk, the patron may scan their associated RFID tag via the hunt kiosk. In other embodiments, the patron kiosk may accept alternate forms of identification to allow the patron to access the patron card (e.g., bar code, QR code, a Bluetooth device, retinal identification, facial identification, fingerprint, etc.). The game hunt 216 may define a game time within a maximum time of 20 minutes. The hunt kiosk may display a first screen, as shown in FIG. 8. The first screen may display the instructions and how to achieve the objective. In other embodiments, the game time may exceed 20 minutes. The game hunt 216 may include one or more correct components and one or more incorrect components. Examples of components are shown in FIGS. 9 and 10. The components may include, but not be limited to, glyphs (e.g., punny art, magic eye art, low poly art, overhead art, string art, shadow art, mural art, perspective illusions, etc.). The patron may identify the correct components to earn digital prizes or reward points (e.g., stars, rooms, apparel, merchandise, reward multipliers, gems, keys, etc.). Accordingly, identification of incorrect components may penalize the patron. For example, if the patron selects the incorrect component, the patron be locked out from the hunt kiosk for a period of time, as shown in FIG. 11. In one example, the patron may be locked out for 15 seconds. In another example, the time of which the patron is locked out increases with the number of incorrect component selections.

The modular game room 200 may include one or more sensory effects, shown as lighting modules 218 and audio modules 219. The lighting modules 218 may be configured to provide light to within the modular room 200. As can be appreciated, the lighting modules 218 may be positioned anywhere within the room 200, such as at a ceiling, or proximate the ceiling, of the modular room 200, where the lighting modules 218 provides area lighting or effect lighting within. The lighting modules 218 may output lights having varying color, brightness, shape, pulse, etc. as such to enhance a patron experience. The lighting modules 218 may be controlled by the control system, and may be influenced by, or provide visual feedback on, the patron's performance or status in the room. In one example, the lighting modules 218 may provide light to game components within the modular room 200. In other examples, the lighting modules 218 may provide light onto boundaries or structures within the modular room 200. The modular room 200 may further include additional lighting modules 218 positioned proximate a floor of the modular room such to provide light to the floor. The audio modules 219 may be positioned proximate the lighting modules 218, where the audio modules 219 provide audio to the modular room 200. The audio modules 219 may be controlled by the control system. The audio may be one of music, sound effects, or status audio (e.g., vocal hint, time remaining, completion status, etc.). For example, the audio modules 219 may provide a time remaining status to the patrons to inform them of an amount of time remaining in the game. In another example, the audio modules 219 may provide a game status to the patrons to inform them that the patrons have correctly or incorrectly performed a specific action. In another example, the audio modules 219 may be associated with a command speaker, where the audio modules 219 output a general statement outputted via an employee (e.g., closing soon, interactive physical environment 100 status, etc.).

Referring generally to FIGS. 13-32, the modular game room 200 may be defined by the walls 210 and/or other physical structures. In some embodiments, the physical structures may be game components, objects, obstacles, etc. The walls 210 further define the rooms 220. As discussed above, the modular game room 200 may include any number of internal rooms 220 such to make up the game and/or challenge, where the internal rooms 220 are accessible by the patrons through the room entrance 230. The internal rooms 220 may include any number of room entrances 230 (e.g., one room entrance 230, two room entrances 230, three room entrances 240, etc.). The internal rooms 220 may have any dimensions (e.g., length, width, height, etc.) to permit the patrons accessibility and mobility within the rooms 220 to complete the challenge. In one example, the rooms 220 may define a room length within a range of 3 to 20 feet and a room width within a range of 3 to 20 feet. In another example, the room length and the room width may exceed 20 feet.

Figure 14:
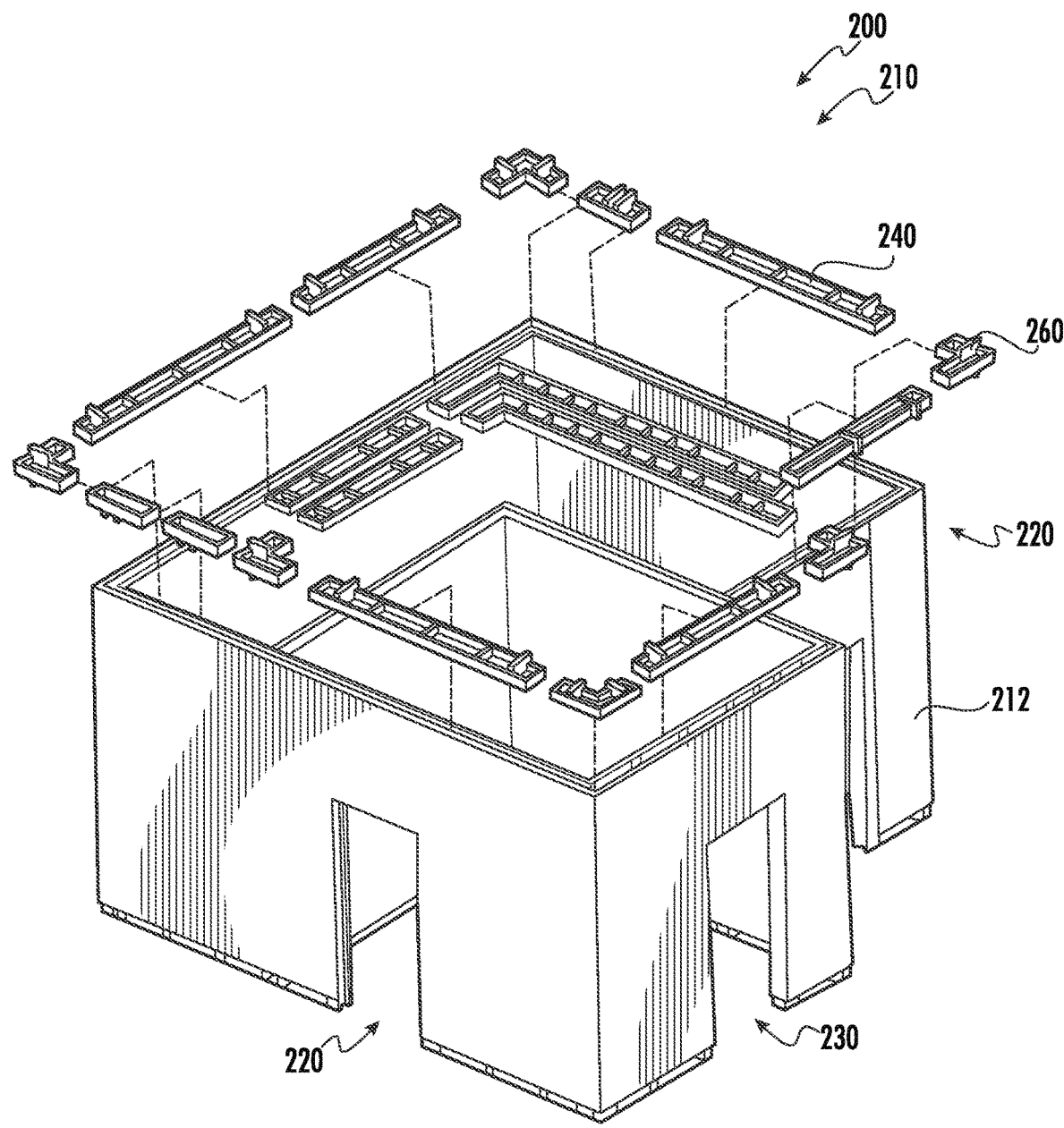
FIG. 14 is a detailed view of the modular room of FIG. 13, showing the linkage assemblies, according to an example embodiment.
Figure 19:
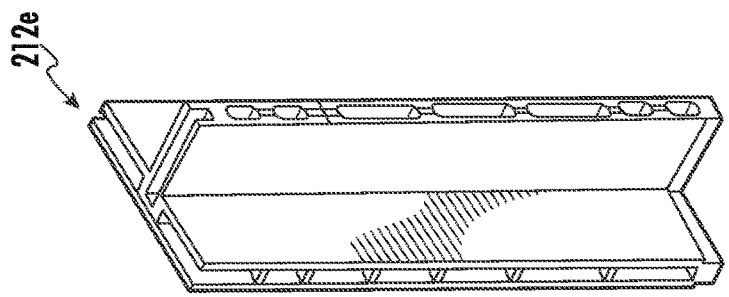
FIGS. 15-19 are various perspective views of wall configurations for assembly into the modular room of FIG. 13, according to example embodiments.
Figure 18:
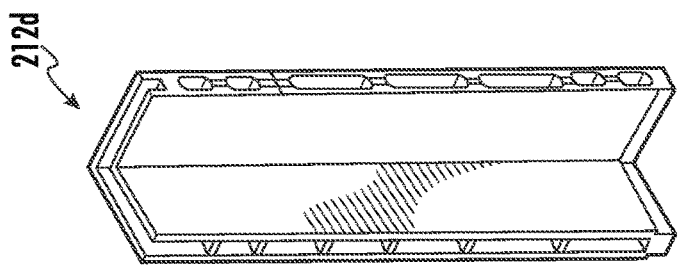
Figure 17:
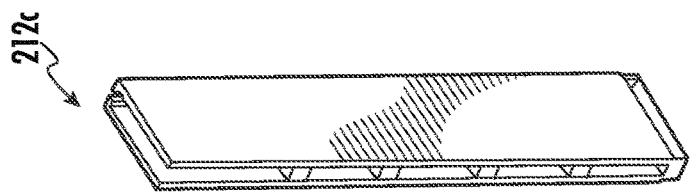
Figure 16:
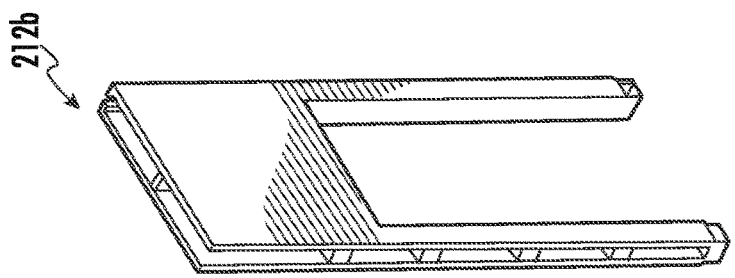
Figure 15:
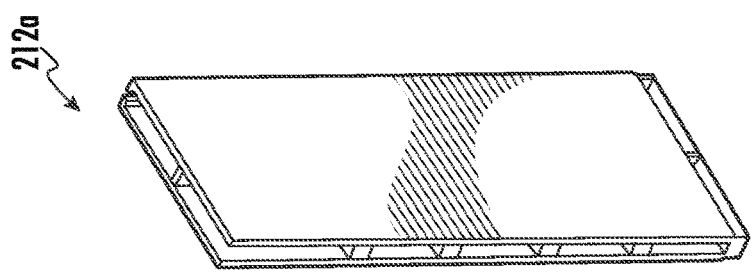
Figures 20, 21:
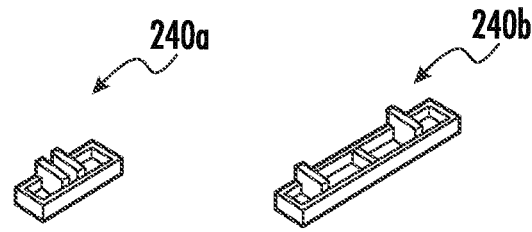
FIGS. 20-25 are various perspective views of linkage assemblies for assembly into the modular room of FIG. 13, according to example embodiments.
Figures 22, 23:
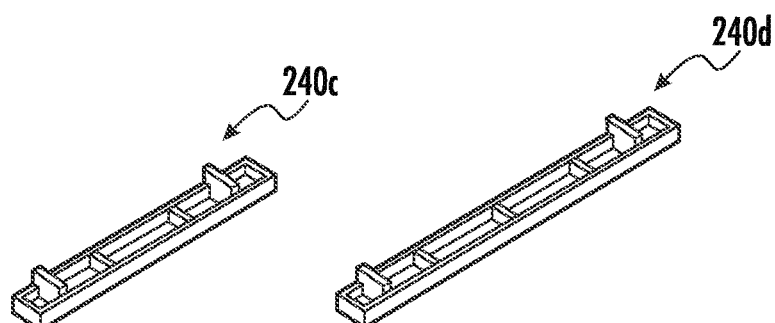
Figures 24, 25:
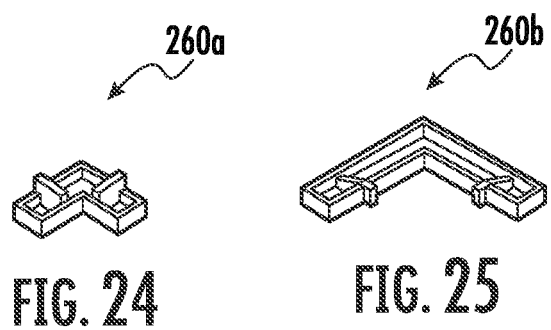

As shown in FIG. 14, the walls 210 may include one or more linkage assemblies, shown as linear linkage assembly 240 and angular linkage assembly 260. The linkage assemblies 240, 260 may be positioned along one or more top surfaces of the walls 210. In some embodiments, the linkage assemblies 240, 260 may be positioned along one or more bottom surfaces of the walls 210. In other embodiments, the linkage assemblies 240, 260 may be integrated into the walls 210 (e.g., joints, fasteners, interlocking mechanisms, etc.). By way of example, the linkage assemblies 240, 260 may be coupled to, and extend from, the top surface of the walls 210 to define an enclosed space. Additionally or alternatively, the linkage assemblies 240, 260 may include room hardware (e.g., lighting, speaker, wiring, etc.). As will be discussed in greater detail herein, the linkage assemblies 240, 260 may be include one or more receiver interfaces 380 that permit a quick connect and disconnect of the linkage assemblies 240, 260 to the walls 210.

The walls 210 may include a covering, panel, or the like, shown as wall panels 212. The wall panels 212 may be flat panels coupled to at least one of an exterior or interior of the walls 210. In some embodiments, the wall panels 212 are not flat panels and instead include a protruding or curved structure. According to one embodiment, the wall panels 212 are coupled to both the exterior and the interior of the walls 210. The wall panels 212 may be coupled to one or more structures (e.g., top wall support 270, bottom wall support 280, side wall support 290, middle support 300, and horizontal support 310 of FIG. 21) via one or more fasteners (e.g., locating pin, bolt, bracket, adhesive, etc.). In some embodiments, the wall panels 212 may be fixedly coupled to the structures, where the wall panels 212 may not be removed from the structures. The wall panels 212 may define a panel height. The panel height may not extend along an entire height of the walls 210. Instead, the wall panels 212 may abut a top portion of the walls 210 and include a gap proximate a bottom of the walls 210. In other embodiments, the wall panel 212 may extend along the entire height of the walls 210. The structure of wall panels 212 allow them to easily set up and removed, which allows the rooms 200 within the physical environment 100 to be changed easily and regularly to avoid patron boredom.

As shown in FIGS. 15-19, various wall configurations are depicted. The wall configurations may be at least one of a first linear wall 212a (e.g., shown in FIG. 15), a door wall 212b (e.g., shown in FIG. 16), a second linear wall 212c (e.g., shown in FIG. 17), a corner wall 212d (e.g., shown in FIG. 18), and a T-wall 212e (shown in FIG. 19). The liner walls 212a, 212c may be linear walls including flat wall panels 212. The first linear wall 212a may be substantially similar to the second linear wall 212b, except for a wall length. According to one embodiment the first linear wall 212a may define a wall length of four feet, and the second linear wall 212c may define a wall length of 2 feet. In other embodiments, the linear walls 212a, 212c may include any wall length that will create the room 220 (e.g., one foot, two feet, three feet, four feet, five feet, six feet, seven feet, eight feet, etc.). The door wall 212b may be substantially similar to the first linear wall 212a (e.g., similar wall length, etc.), although the door wall 212b may further include a passage for the room entrance 230. The passage for the room entrance 230 may define a substantially similar geometry to the room entrance 230. In other embodiments, the door wall 212b may have a different wall length compared to the first linear wall 212a to permit various sizes of room entrances 230.

The corner wall 212d may define an angular wall section (e.g., 15 degrees, 30 degrees, 45 degrees, 60 degrees, 75 degrees, 90 degrees, 105 degrees, 120 degrees, 135 degrees, 150 degrees, 165 degrees, etc.). The corner wall 212d may be positioned where the room 220 has a bend or otherwise changes from a linear direction. For example, the corner wall 212d may be positioned at a corner of the room 220 to join two linear walls 212a, 212c. In another example, the corner wall 212d may be coupled to the T-wall 212e to form a small room construction. The T-wall 212e may define a structure having two linear portions, where the linear portions are positioned perpendicular to one another. In other embodiments, the T-wall 212e may be have a first linear portion angularly provided in relation to a second linear portion. Although the wall configurations 212a, 212b, 212c, 212d, 212e have been described individually, it should be understood that the wall configurations may be coupled to, or otherwise used in any combination with, one another to form the room 220.

Figure 26:
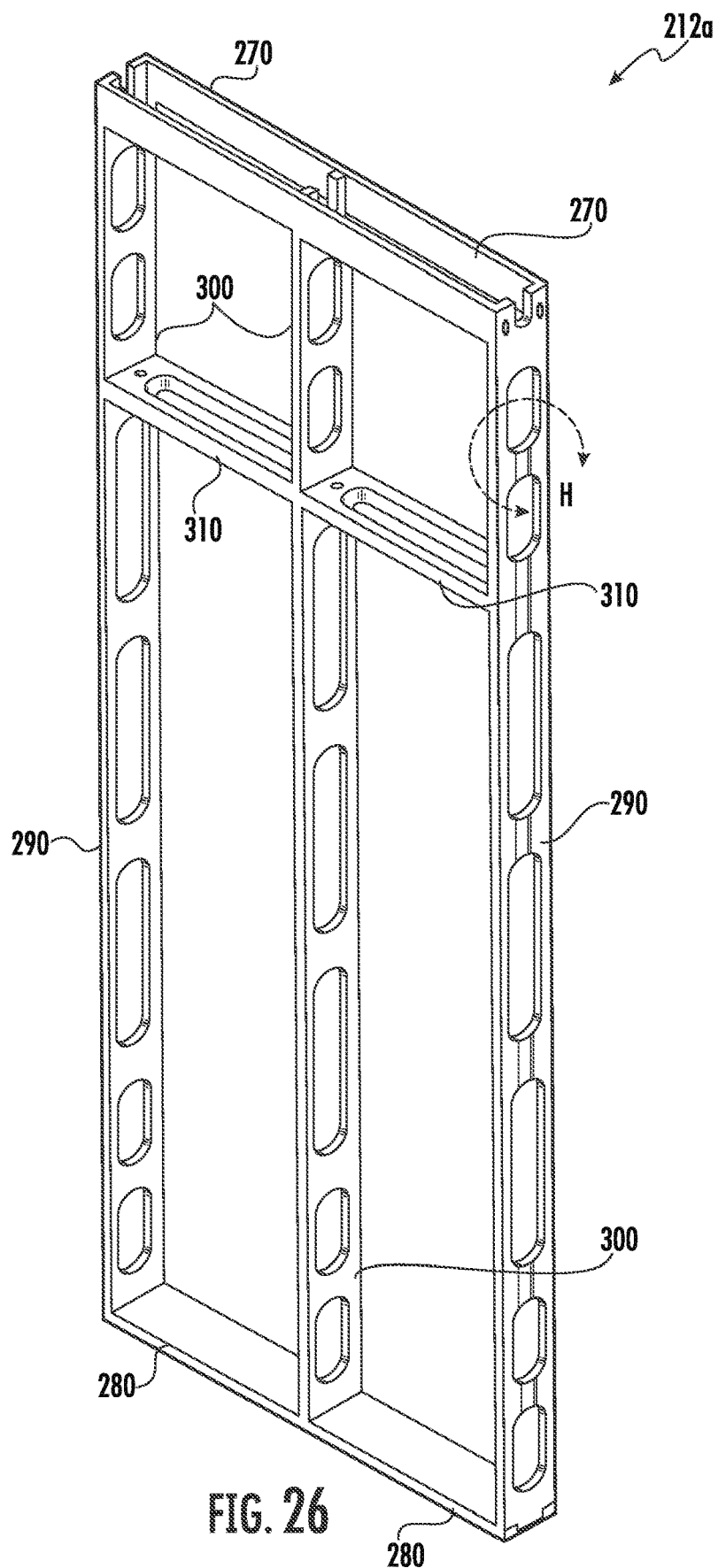
FIG. 26 is a perspective view of the wall configuration of FIG. 15, according to an example embodiment.
Figure 27:
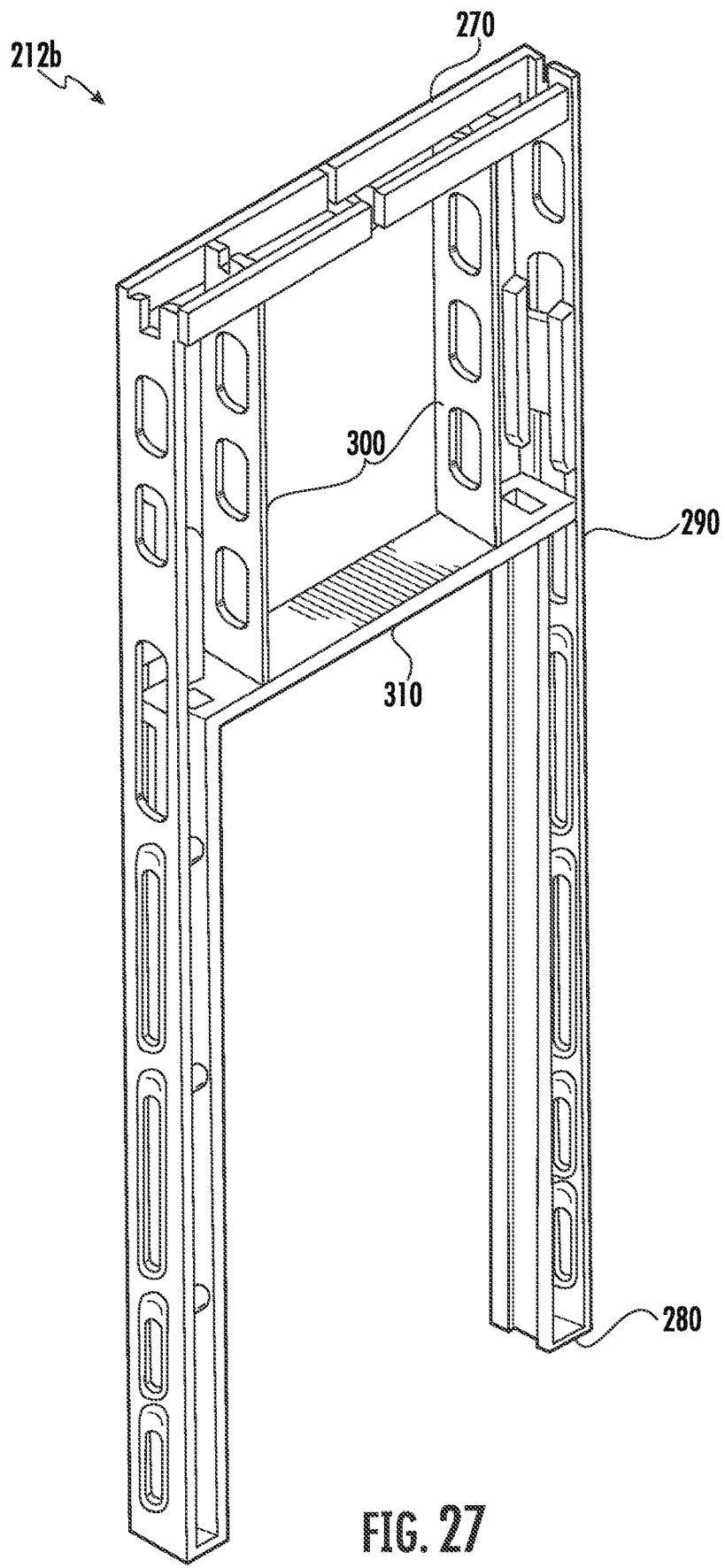
FIG. 27 is a perspective view of the wall configuration of FIG. 16, according to an example embodiment.
Figure 28:
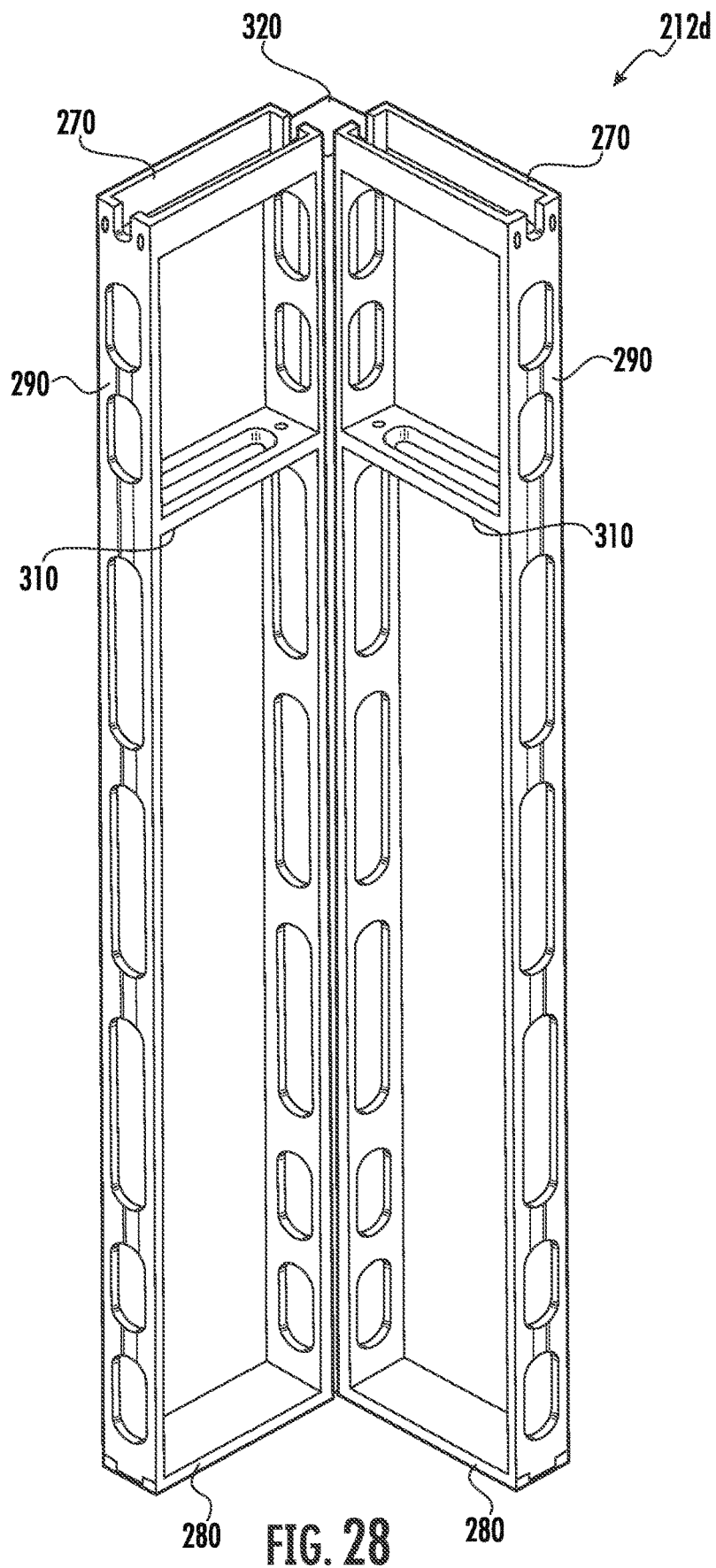
FIG. 28 is a perspective view of the wall configuration of FIG. 18, according to an example embodiment.

Referring now to FIGS. 26-28, various views of the wall configurations 212a, 212b, 212d are depicted. The wall configurations may include respective top and bottom members, shown as top wall support 270 and bottom wall support 280. The top wall support 270 may be positioned proximate a top of the wall 210, where the top wall support 270 extends horizontally along the wall 210. Accordingly, the bottom wall support 270 may be positioned proximate a bottom of the wall 210, where the bottom wall support 270 extends horizontally along the wall 210. According to one embodiment, the top and bottom wall supports 270, 280 may extend along an entire length of the wall 210. In other embodiments, the top and bottom wall supports 270, 280 may extend along a portion of a length of the wall 210. The wall configurations may include one or more vertical extending members, shown as side wall supports 290 and middle support 300. The side wall supports 290 may extend vertically from ends of the top and bottom wall supports 270, 280. The middle support 300 may be provided between each side wall support 290 and further extend vertically between the top wall support 270 and the bottom wall support 280. The middle support 300 may be provided substantially parallel to the side wall supports 290. The middle support 300 may extend vertically from a midpoint of the wall configuration. In other embodiments, the middle support 300 may extend vertically from a location offset the midpoint of the wall configuration. In still other embodiments, the middle support 300 may be angularly provided between the side wall supports 290. In some examples, the wall configuration may not need any middle support 300.

The wall configuration may further include one or more horizontal supports 310. The horizontal supports 310 may extend between the middle support 300 and the respective side wall supports 290. In other embodiments, the horizontal supports 310 may extend between middle supports 300. As can be appreciated, the horizontal supports 310 may rigidly hold the wall configuration and prevent side sway. The wall configuration may include any number of horizontal supports 310 that prevent side sway (e.g., two horizontal supports 310, four horizontal supports 310, six horizontal supports 310, etc.).

Referring specifically to FIG. 26, a wall configuration for the first linear wall 212a is shown. As shown, the wall configuration defines a substantially rectangular construction, having two side wall supports 290 defined between a top wall support 270 and a bottom wall support 280. The wall configuration further includes a middle support 300 extending vertically between the side wall supports 290. The wall configuration is rigidly held together via horizontal supports 310 positioned proximate the top wall support 270. In other embodiments, the horizontal supports 310 may be positioned proximate the bottom wall support 280.

Referring specifically to FIG. 27, a wall configuration for the door wall 212b is shown. As shown, the wall configuration defines a substantially rectangular construction having an open section for the room entrance 230. The wall configuration includes two side wall supports 290 defined between a top wall support 270 and two bottom wall supports 280. The wall configuration further includes two middle portions 300 extending vertically between the side wall supports 290 and offset from a midpoint of the wall configuration. The wall configuration is rigidly held together via a single horizontal support 310 positioned underneath the middle supports 310 and extending between the side wall supports 290. In other embodiments, the wall configuration may include multiple horizontal supports 310.

Referring specifically to FIG. 28, a wall configuration for the corner wall 212*d* is shown. As shown, the wall configuration includes two linear wall configurations coupled together by a corner support 320. Each linear wall configuration includes two side wall supports 290 extending between a top wall support 270 and a bottom wall support 280. The linear wall configurations may further be rigidly held together via a single horizontal support 310 positioned proximate the top wall support 270. In some embodiments, the horizontal support 310 may be positioned proximate the bottom wall support 280. In other embodiments, the linear wall configuration may include multiple horizontal supports 310.

As shown in FIGS. 20-25, various linkage assemblies are depicted. The linkage assemblies may be at least one of a first header linkage 240*a* (e.g., shown in FIG. 20), a second header linkage 240*b* (e.g., shown in FIG. 21), a third header linkage 240*c* (e.g., shown in FIG. 22), a fourth header linkage 240*d* (e.g., shown in FIG. 23), an inside corner linkage 260*a* (e.g., shown in FIG. 24), and an outside corner linkage 260*b* (e.g., shown in FIG. 25). The header linkages 240*a*-240*d* may be linear linkages. The header linkages 240*a*-240*d* may be positioned along linear wall configurations or linear portions thereof. The header linkages 240*a*-240*d* may be substantially similar to one another but define varying lengths. For example, in one embodiment, the first header linkage 240*a* may be 2 feet long, the second header linkage 240*b* may be four feet long, the third header linkage 240*c* may be six feet long, and the fourth header linkage 240*d* may be eight feet long. In another example, the header linkages 240*a*-240*d* may define different lengths than described herein. The corner linkages 260*a*, 260*b* may be positioned along corners or angular wall configurations. The corner linkages 260*a*, 260*b* may couple walls that may be angularly provided from one another. Additionally or alternatively, the corner linkages 260*a*, 260*b* are utilized for corners defined by the corner wall 240*d* and the T-wall 240*e*. By way of example, the inside corner linkage 260*a* may be positioned along an inside of the walls 210 and the outside corner linkage 260*b* may be positioned along an outside of the walls 210. The walls 210 may utilize both the inside corner linkage 260*a* and the outside corner linkage 260*b* when simultaneously. In other embodiments, the walls 210 may only utilize one of the inside corner linkage 260*a* and the outside corner linkage 260*b*.

Figure 29:
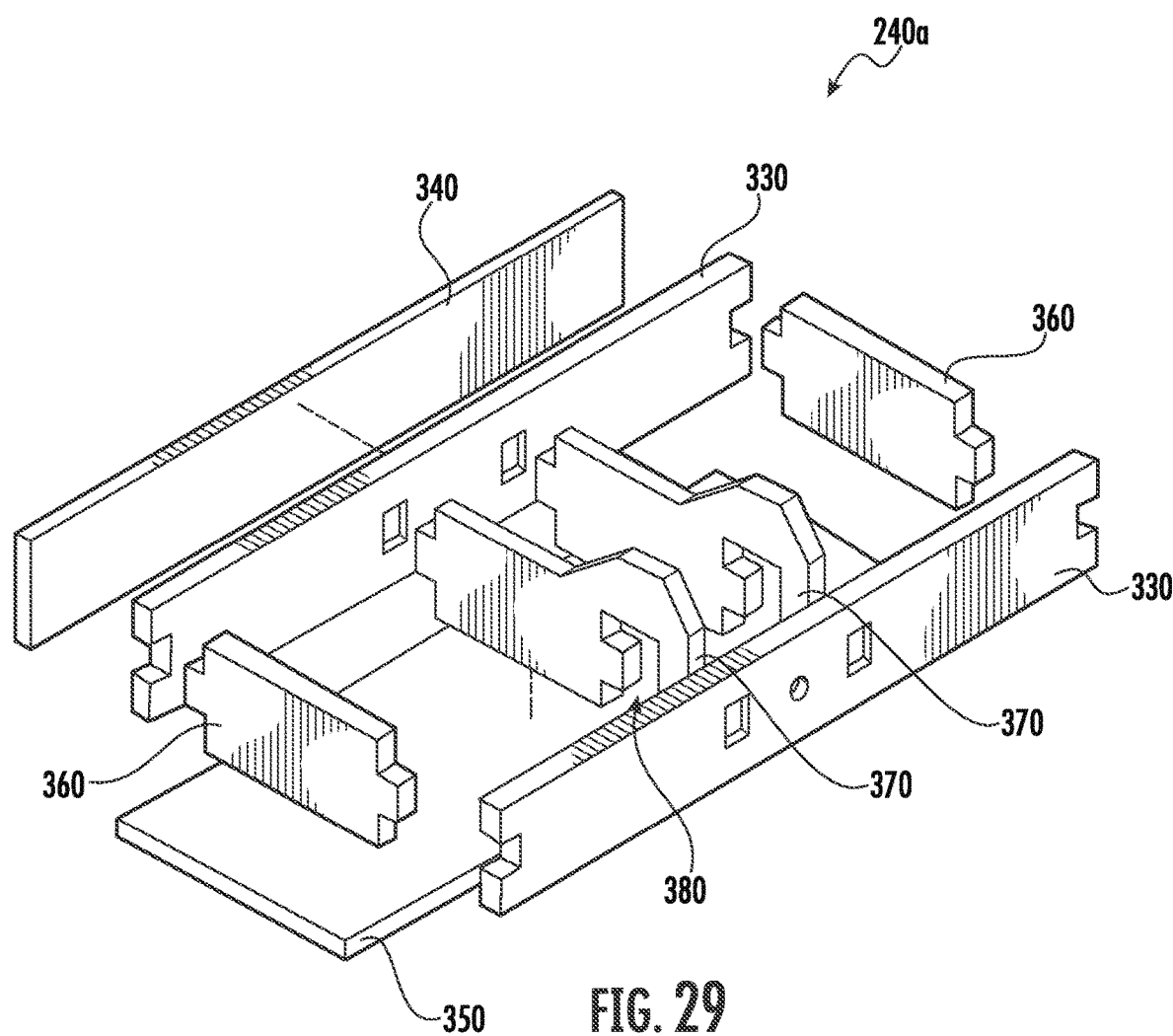
FIG. 29 is a detailed view of the linkage assembly of FIG. 16, according to an example embodiment.
Figure 30:
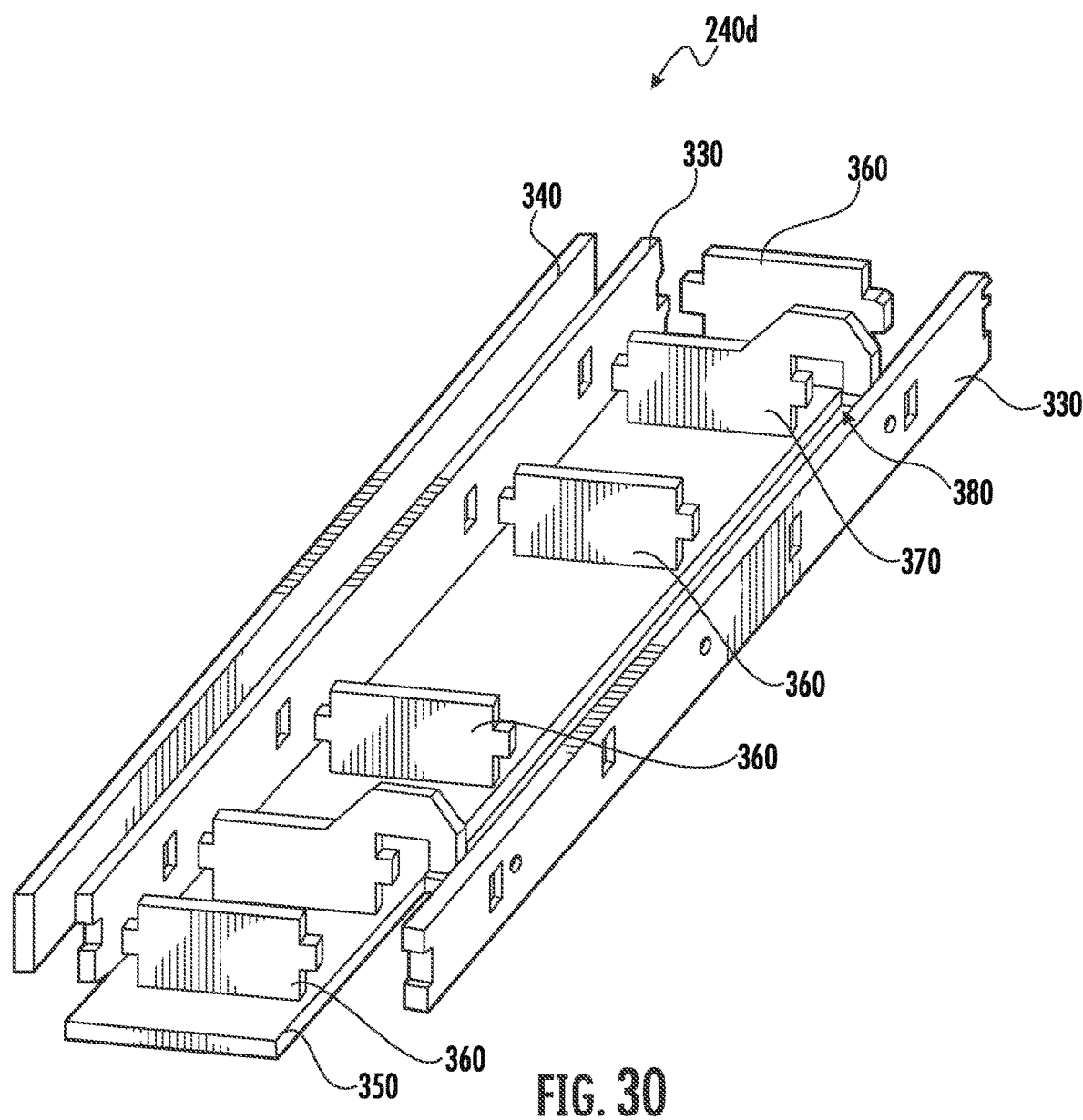
FIG. 30 is a detailed view of the linkage assembly of FIG. 17, according to an example embodiment.
Figure 31:
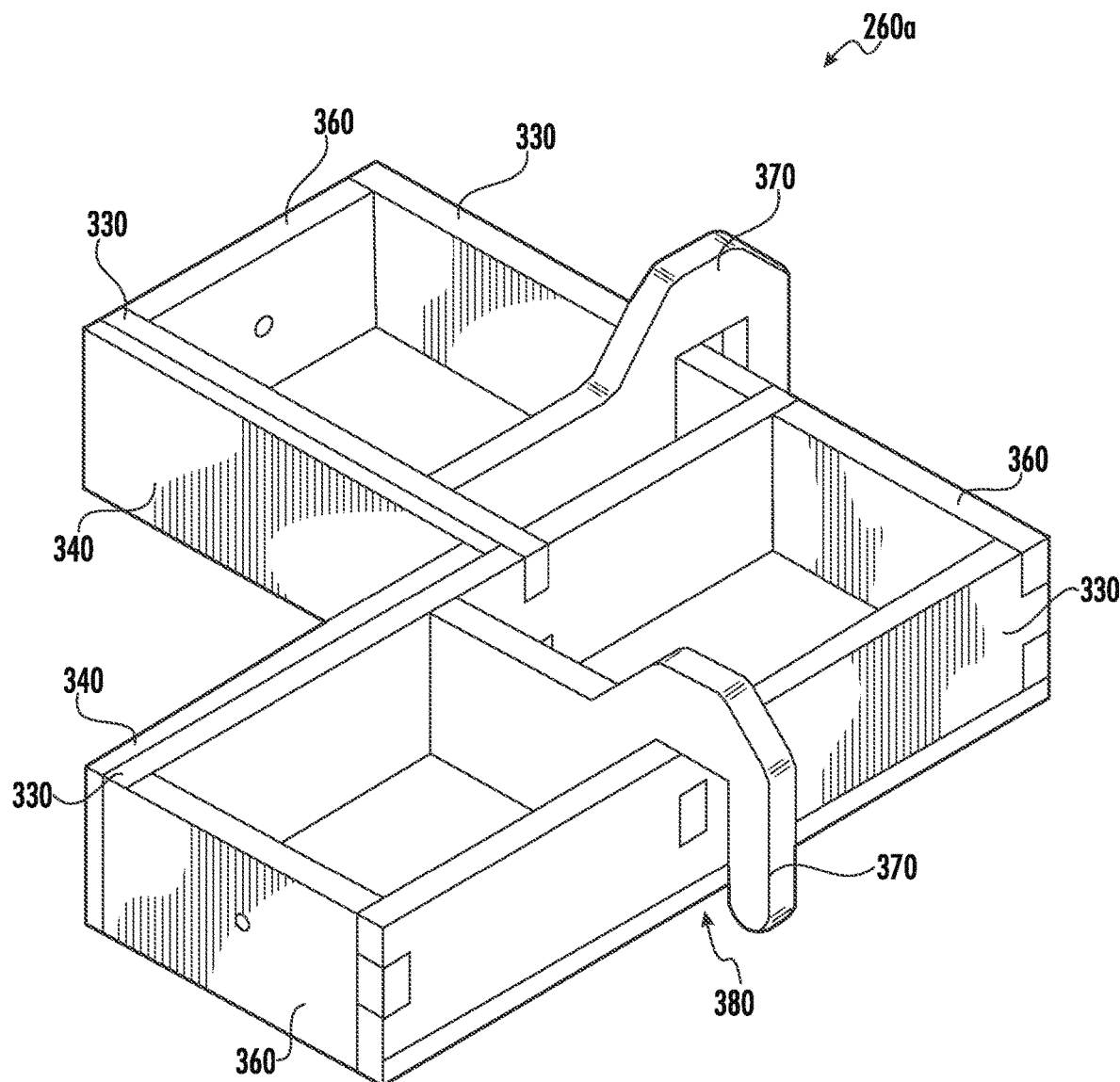
FIG. 31 is a detailed view of the linkage assembly of FIG. 19, according to an example embodiment.
Figure 32:
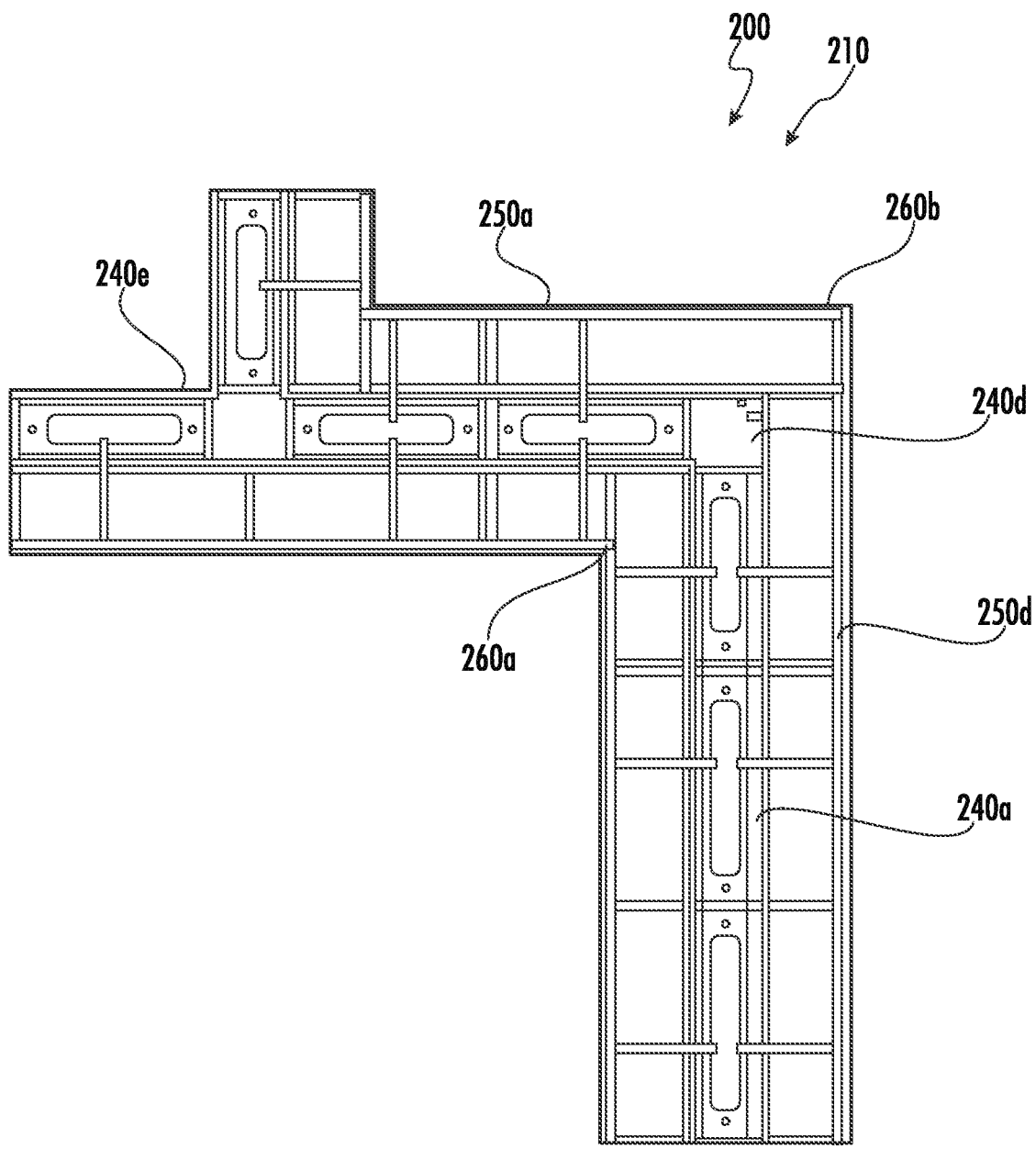
FIG. 32 is a top view of the modular room of FIG. 13, showing the coupling between the wall configuration and the linkage assembly, according to an example embodiment.

Referring now to FIGS. 29-31, various views of the linkage assemblies 240*a*, 240*d*, 260*a* are depicted. The linkage assemblies may include side linkages, shown as first side linkage 330 and second side linkage 360. The side linkages 330, 360 may define an outermost structure of the linkage assembly, where the side linkages 330, 360 are coupled together. The linkage assemblies may include second side linkages 360 positioned at ends of the linkage assemblies. Additionally or alternatively, multiple second side linkages 360 may be positioned internal the linkage assemblies. In such an embodiment, the internal second side linkages 360 may be configured to support the first side linkages 330. The linkage assemblies may include one or more linkage side panels 340. The linkage side panels 340 may be coupled to one of the first side linkages 330. In other embodiments, the linkage side panels 340 may be coupled to the second linkage 360. The linkage side panels 340 may be positioned proximate an end of the walls 210, where the linkage side panels 340 create a smooth outer surface of the linkage assemblies. Similarly to the linkage side panels 340, the linage assemblies may further include one or more linkage bottom panels 350. The linkage bottom panels 350 may be positioned proximate a top or a bottom of the linkage assemblies, where the linkage bottom panels 350 create a smooth outer surface of the linkage assemblies.

The linkage assemblies may be coupled to the walls via one or more connecting linkages 370. The connecting linkages 370 may be positioned internal the side linkages 330, 360 where the connecting linkages 370 protrude outward from the first side linkage 330. More specifically the connecting linkages 370 may include a receiver interface 380. The receiver interface 380 may extend outward past the first side linkage 330. In other embodiments, the receiver interface 380 may not extend past the first side linkage 330. The receiver interface 380 may be a slot configured to receive a top of the top wall support 270, such that the linkage assembly extends outward from walls. In other embodiments, the linkage assemblies may be positioned over top of the top wall support 270. According to one embodiment, the receiver interface 380 may define a quick connect/disconnect for the linkage assembly to the wall configuration. In such an embodiment, the receiver interface 380 hooks onto the wall configuration to rigidly secure the linkage assembly to the wall. In other embodiments, the linkage assembly may be fastened to the wall configuration (e.g., bracket, bolt, adhesive, etc.). The linkage assembly permits a relatively quick construction and/or deconstruction of the walls 210. As can be appreciated, when changing game types and/or traveling, the walls 210 may be quickly assembled or disassembled for the needs. Additionally or alternatively, the employees may be able to quickly reassemble new wall configurations for a new game type to provide an enhanced patron experience.

Figure 33:
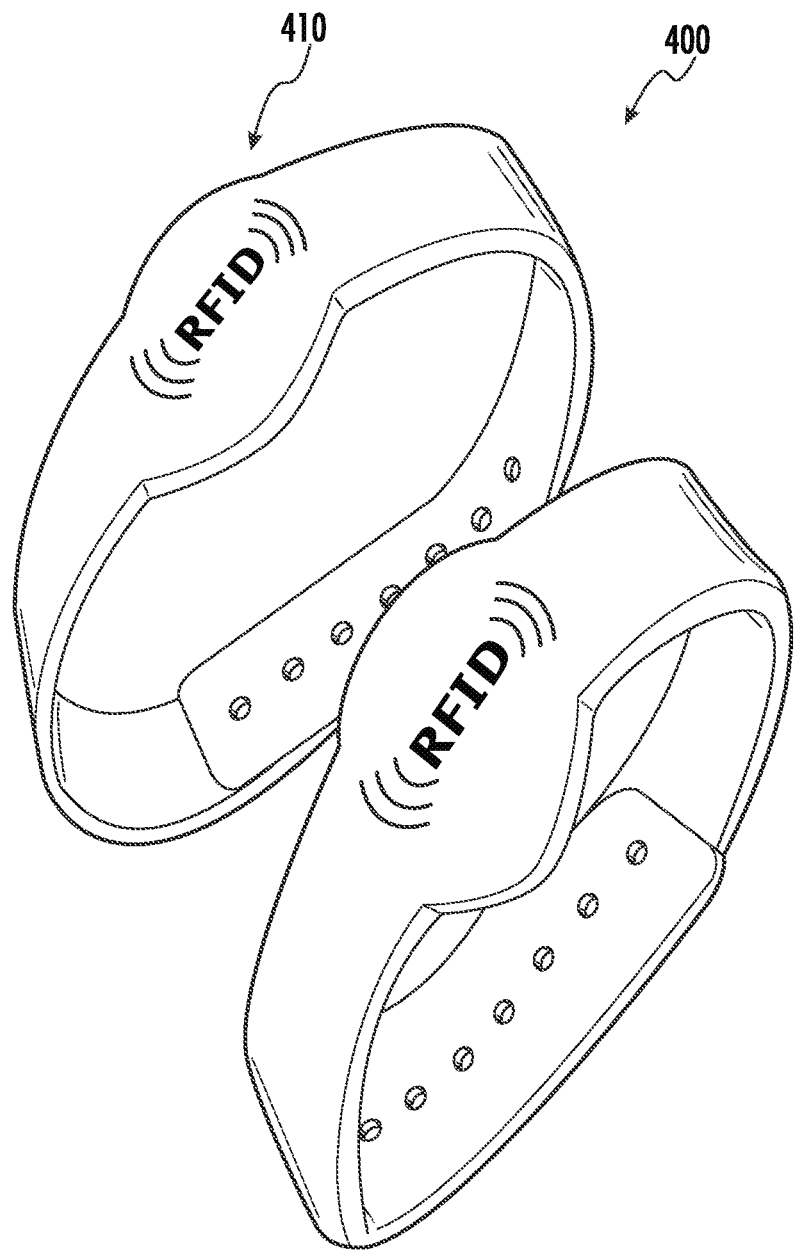
FIG. 33 is a perspective view of a radio frequency identification (RFID) tag for use in the interactive physical environment of FIG. 1, according to an example embodiment.

Referring now to FIG. 33, the interactive physical environment 100 may detect, or otherwise be communicably coupled to one or more radio frequency identification (RFID) tags, shown as RFID tags 400. An RFID tag 400 may be associated with a single patron, where the RFID tag 400 transmits an RFID signal 410. The RFID signal 410 may be unique for each RFID tag 400 such that the patron is identified by the unique RFID signal 410. As shown in FIG. 33, the RFID tag 400 may a bracelet, where the patron wears the bracelet around a portion of the patron body. In other embodiments, the RFID tag 400 may be a badge or scannable device, where the badge is worn or otherwise associated with the patron. The RFID tag 400 may permit the user access to the patron's account. The environment 100 may include an account associated with each unique patron, where the RFID tag 400 may be scanned to permit the patron access to the account. In other embodiments, the patron is associated with a unique identification number (e.g., account number, customer number, patron number, etc.) allowing the patron to access their account via the unique identification number.

In other embodiments, the interactive physical environment 100 may detect a patron using alternative methods from RFID tags 400. In one example, the interactive physical environment 100 may detect the presence of a patron via a cellular device. In such an embodiment, the interactive physical environment 100 may detect the patron by Bluetooth within the cellular device, a cellular application in which the patron interfaces with the cellular application, an online website in which the patron interfaces with the website, or the like. In another example, the interactive physical environment 100 may detect the presence of the patron using biometric identification methods (e.g., facial recognition, retinal recognition, fingerprint, etc.). In still other embodiments, the interactive physical environment 100 may detect the patron via a QR code or bar code. In these embodiments, the codes may be printed on a badge associated with the patron or the codes may be printed directly on a patron's body, such as on their hand.

Figure 34:
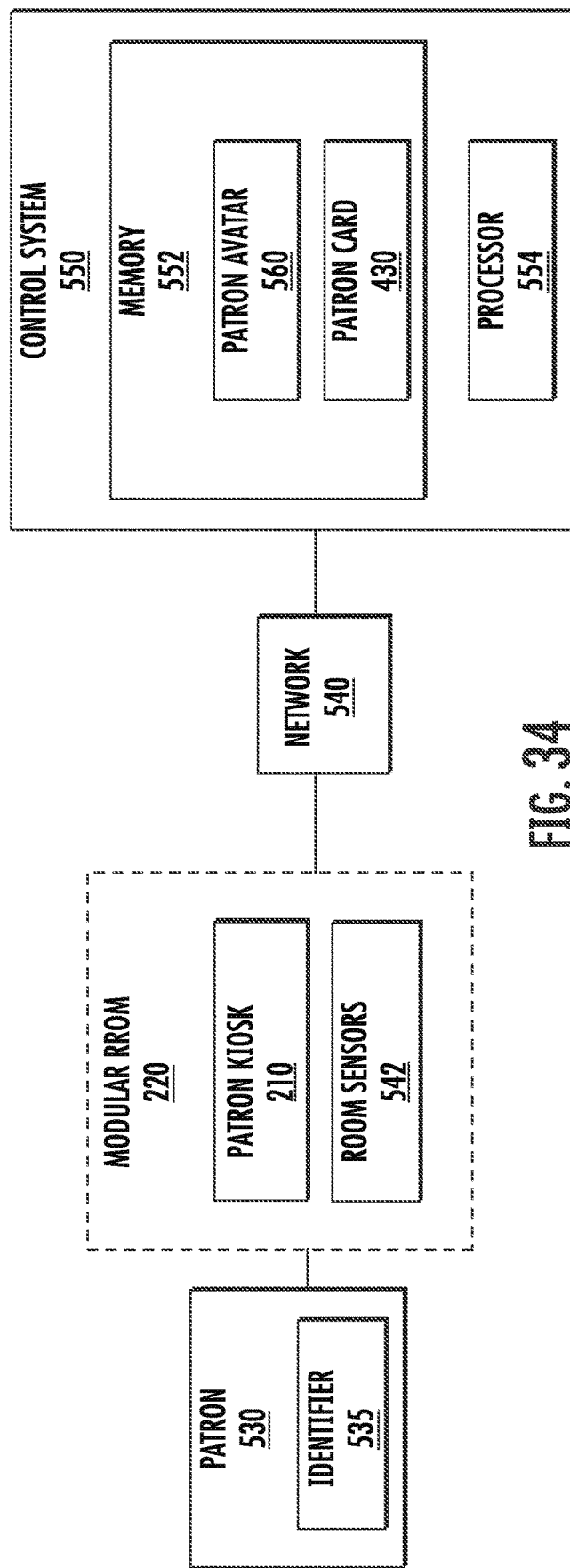
FIG. 34 is a block diagram depicting various aspects of a system for controlling the interactive physical environment of FIG. 1, according to an example embodiment.

Referring now to FIG. 34, the interactive physical environment 100 a patron 530 may be associated with an identifier 535, rooms 220, and a control system 550. The rooms 220 may include the patron kiosk 212 and one or more sensors, shown as room sensors 542. In one embodiment, the patron 530 scans their identifier 535 at a scanner provided in connection with the patron kiosk 212. The patron 530 may scan the identifier 535 to enter the room 220 or play a game within the room 220. The games may include any one of a physical challenge, mental challenge, skill challenge, mystery challenge, communication challenge, or combination thereof. Control system 550 may be provided on site, deployed in the cloud, or deployed as a hybrid system in which certain machines are located on site and other resources are deployed in the cloud.

The rooms 200 may include one or more room sensors 542. The room sensors 542 may be one of proximity sensors, pressure sensors, temperature sensors, optical sensors, or the like. In a specific embodiment, room sensors may be provided as LIDAR sensors. The room sensors 542 may be positioned externally to the rooms 220 or internally to the rooms 220. As will be discussed in greater detail herein, the room sensors 542 may provide data to the control system 550 to determine a status of the game.

In one example game, the game may include a physical challenge, where the patrons 530 may complete the challenge by completing a physical objective. The physical objective may be to throw a ball into an area, to cross the room 220, to climb an object, or otherwise perform any physical action to achieve the objective. As can be appreciated, the room 220 may include various types of sensors (e.g., temperature, proximity, accelerometer, infrared, light, ultrasonic, pressure, LIDAR, etc.) that detect at least one of the patron 530 or a game component.

In one embodiment, a physical challenge may instruct patrons to stand on a small walkway around three sides of the room 220 in order to throw balls through an overhead target without touching the ground. Each ball thrown through the target earns a point. If the patrons fall, a sensor 542 registers the pressure from the patron on the floor and transmits that data to the control system 550 via the network 540. The controls system 550 receives the sensor data and determines that the patron has failed. The control system transmits data back to the room 220 to, in some embodiments, cause a sound to be emitted or, in other embodiments, cause the exit monitor 214 to display a failure status to the patron. The game may permit patrons 75 seconds to complete the challenge. In other embodiments, the game may permit more time than 75 seconds to complete the objective. For embodiments in which there is a time limit to complete the challenge, the control system 550 receives data from the patron kiosk 212 that the patron has started the game. Processor 554 executes a countdown timer program and, if no data is received from the room sensors 542 that the challenge objective has been completed prior to the timer elapsing, control system 550 transmits data back to the room 220 to inform the patron they have failed, as described above.

In another example game, the game may include a skill challenge, where patrons 530 may need to keep a game component moving. In such an example, the room 220 may include a single light emitted from a first device. The first device may include multiple illuminated paths that lead to one or more second devices. The objective may be to press the second device associated with the light to keep the light moving for the entirety of the game.

In one embodiment, an example skill challenge permit patrons access into the room 220. The room 220 may be dim with one LED light strip positioned above. The game may not begin until the patrons press a lighted button. A sensor 542 associated with the lighted button transmits data to the control system, 550 indicating that the button has been pressed and the control system begins a routine to animate lighting elements in the room 220 to make it appear that a "ball of light" is launched up into a tube leading away from the lighted button. Upon launch, the ball of light continues moving an eventually travels downward toward another button box. When the ball of light reaches the button box, the patron presses the button box to again launch the ball of light to reach another button box. As before, a sensor 542 associated the button box senses that the patron has depressed the button and transmits that data to the control system 550, which again executes a routine to animate lighting elements in the room 220 to make it appear that the ball of light has been relaunched. The more button boxes that are pressed during the time period correspond to a higher score earned by the patron. Additionally or alternatively, speed of the ball, i.e., speed of the lighting animation, may increase after each button box is successfully pressed. If the ball drops all the way into a button box, that is, if a button is not depressed in time, the control system 550 determines that the game has completed and it ends immediately.

In another example game, the game may include a mystery challenge, where patrons 530 may stand on blocks including pressure sensors 543. Other patrons 530 not standing on blocks may then swing, via ropes, to sidewalls of the room 220 to press, or otherwise interact with, buttons positioned on the sidewalls. The objective may be to press all the buttons while maintaining contact with the ropes and the blocks.

In one embodiment, an example mystery challenge includes permitting patron's access into the room 220. When the patrons access the room, all button lights will be lighted. When the control system 550 receives data from the patron kiosk 212 that the game is beginning, it sends data back to room 220 to cause some of the buttons to flicker. After a predetermined amount of time, if the control system 550 does not receive data from a sensor 542 indicating the flickering button has been pressed, the control system 550 will send data to room 220 to cause the lighted button to stop flickering, signifying that the button has died, and that button will then remain off for the remainder of the game. The objective of this game is to have the patrons swing or push one another to reach the flickering buttons. Upon interaction with a flickering button, a sensor 542 associated with the button transmits data to the control system 550 indicating that the button has been successfully pressed. The control system 550 transmits data to the room 220 to cause that button to remain lighted for the rest of the game. The game is over after a time period has ended or the patron has fallen off a platform in the room. As more patrons enter the room, the less time the game allots to the group. Additionally or alternatively, the more flickering buttons pressed equals more reward points.

In another example game, the challenge may be a communication challenge, where patrons must communicate between one another to achieve the objective. In such an example, the patrons may include a designated number, where the sidewalls of the modular rooms include illuminated spots. The patrons may achieve the objective by pressing an exact amount of illuminated light spots corresponding to their designated number.

In one embodiment, an example communication challenge permits patrons access into the room 220. The room 220 includes a platform, where patrons stand on the platform and are prohibited from touching the floor. Instead, the patrons must stand on "spots" protruding upwards from the floor. The control system 550 begins the game when it receives data from the room that the door has closed. The control system 550 transmits data to the room 220 to display a number on a screen, such as exit monitor 214, and to illuminate a corresponding number of spots on the floor and the walls of the room 220. The control system 550 may also begin a countdown and may transmit information to the exit monitor 214 to cause it to display the current status of the countdown monitor. Concurrently, the control system 550 transmits information to the room 220 to cause the spots to change color. The objective of this game is to have the patrons interface with (e.g., press, cover, etc.) a number of illuminated spots corresponding to the number displayed on the screen of the exit monitor 214 before time runs out. If too many spots are covered, i.e., if too many sensors 542 report to the control system 550 that they have been pressed, the patrons do not get a point, i.e., the control system 550 determines that the number of spots does not equal the number displayed on the monitor and no point is awarded to the patrons. If too few spots are covered, i.e., if too few sensors 542 report to the control system 550 that they have been pressed, the patrons do not get a point, i.e., the control system 550 determines that the number of spots does not equal the number displayed on the monitor and no point is awarded to the patrons. If any off-limit spots are covered, i.e., sensors 542 associated with spots that should not be pressed report that they are pressed, the patrons fail out of the room, i.e., the control system 550 determines that the game should end immediately. In some embodiments, the patrons repeat this for five total rounds, where patrons can earn a maximum of five points.

In one specific embodiment, a game room 200 may provide a self-resetting game, that is, the ending state in which a game room is left by a first patron serves as the starting state for the game when played by a second patron. These types of games allow a room to set to initial conditions without requiring venue staff to attend to the room 200. In this embodiment, the game provides a first challenge to a first group of patrons. The first group of patrons leaves the game room in a physical state that presents a second challenge to a second group of patrons. Although described in terms of a first challenge and a second challenge, any number of challenges may be enabled by such a room as will be described below. The game may be selectively adjustable between a first game configuration and a second game configuration. The first game configuration may include a first game components and a first challenge, and the second game configuration may include a second game components and a second challenge. The first challenge may be different than the second challenge. The first game configuration may present the first game components in a first presentation.

Additionally or alternatively, the first game configuration may present the first game components in a third presentation. The second game configuration may present the second game components in a second presentation. Additionally or alternatively, the second game configuration may present the second game components in a fourth presentation. The objective of the first game configuration may be to move the first game components into a first solution configuration. The objective of the second game configuration may be to move the second game components into a second solution configuration. The first game configuration may define a different game component position than the first solution configuration, and the second game configuration may define a different game component than the second solution configuration. By way of example, the first challenge may present the first game components in a first presentation and the second challenge may present the second game components in a second presentation. The first presentation may be the second solution configuration, and the second presentation may be the first solution configuration.

The control system 550 may further include the room sensors 542 that detect the first and second game components. The room sensors 542 may determine a position of the first and second game components in relation to one of the first solution configuration and the second solution configuration. For example, in a first status, the patron 530 may play the game when the game is in the first configuration. If the patron 530 does not complete the first challenge, the sensors may detect the position of the game components in relation to the first challenge. If the game components are proximate or partially received in relation to the first challenge, the control system 550 may automatically adjust the game. More specifically, the processor 554 may receive the sensor data and communicate the sensor feedback to the memory 552. The memory 552 may compare the game components position to the first challenge or the second challenge to determine an appropriate game configuration. In response to the game components being proximate the second solution configuration, the memory 552 may provide a status back to the processor 554 to adjust the entertainment game to the second game configuration. Accordingly, if the game components are proximate the first solution configuration, the memory 552 may provide a status back to the processor 554 to adjust the entertainment game to the first game configuration. In another example, if the game components are not proximate either of the first or second solution configurations, the memory 552 may select between one of the first and second game configurations. In such an example, the memory 552 may automatically reset into the first game configuration. The control system 550 may determine that the game has ended. In one example, the control system 550 may determine that the game is over by successful completion of the objective, via the room sensors 542. In another example, the control system 550 may determine that the game is over by completion of the game time. In such an example, the control system 550 may determine successful completion or unsuccessful incompletion of the objective. The control system 550 readjusts the game configuration after each game is played. The control system 550, via the room sensors 542, may determine successful or unsuccessful completion of the objective. In one example, the room sensors 542 may be proximity sensors that determine a location of either the first and second game components. In such an example, if the game components are correctly positioned, the control system 550 may determine, via the memory 552, an amount of stars to reward the patron 530. As can be appreciated, the control system 550 automatically resets between the game configurations, where the control system 550 requires minimal, if any, external support (e.g., employee support, etc.) to adjust the entertainment game 850 between games. If a game challenge is completed successfully, the control system 550 may select a different challenge for the next patron or patron group to enter the room 220.

In brief overview, a method for providing the self-resetting game in the room 220 includes providing game components, determining a presentation of the game components, allowing the patron 530 into the room 220, detecting a completion of the game, and determining a status of the game.

Providing the game components includes at least one of the first game components and the second game components. The first and second game components are repositionable within the room 220 of the interactive physical environment 100. In some embodiments, the game components include more than two game components (e.g., third game components, fourth game components, etc.).

Determining a presentation of the game components includes utilizing the control system 550 to receive a position data from the room sensors 542, the position data representing a position of either the first game components or the second game components. The room sensors 542 may be at least one of proximity sensors, pressure sensors, or the like. The control system 550 may receive position data from the room sensors 542 and determining if the first game components are within a first presentation or if the second game components are within the second presentation. By way of example, if the first game components are within the first presentation, the first game components may present the first challenge, and if the second game components are within the second presentation, the second game components may present the second challenge. In other embodiments, the first game components may be within a third presentation. In such an embodiment, the third presentation may define any position of the game components where the game components are not within the first presentation or the second presentation. The third presentation may present the first challenge.

Allowing the patron 530 into the room 220 includes utilizing the control system 550 to determine if the patron 530 has scanned into the room 220. The patron 530 may scan the identifier 535, via the scanner at the patron kiosk 212, to check-in to the room 220. The identifier 535 may be one of the RFID tag, QR code, bar code, biometric characteristics, etc. By way of example, multiple patrons 530 may check-in to the patron kiosk 212 to check-in to the room 220 (e.g., two patrons 530, four patrons 530, six patrons 530, etc.). If the room 220 is currently providing a game to patrons 530 positioned within the room 220, the control system 550 may not permit the patrons 530 access into the room 220. If the room 220 is not currently providing a game to patrons 530, the control system 550 may permit the patrons 530 access to the room 220.

Detecting the completion of the game includes the control system 550 receiving a status, via the room sensors 542, of the game. The room sensors 542 may detect a position of either the first and second game components, and provide the position data to the control system 550. The control system 550 may compare the position data to an objective position data, via objective position data stored within the memory 552, to determine successful or unsuccessful completion of the objective.

Determining the status of the game includes the control system 550 determining the status. The control system 550 may compare the position data to a first solution configuration or a second solution configuration. The first solution configuration may present a solution to the first game configuration and the second solution configuration may present a solution to the second game configuration. The first solution configuration may be substantially different than the first solution configuration. Additionally, the first solution configuration may define the second presentation and the second solution configuration may define the first presentation.

In one embodiment, a self-resetting game is provided as a dinner party-themed logic puzzle. The goal of the game is to move entrees, beverages, and name cards around the table to set the table for a dinner party. The control system 550 selects a set of RSVPs from a plurality of sets of RSVPs stored in memory 552, a menu from a plurality of menus stored in memory 552 and a guest letter from a plurality of guest letters stored in memory 552. The selected items are transmitted to the room 220 for display on the exit monitor 214. Patrons must set the table in accord with the displayed information within a predetermined time period.

When starting the game for a patron, the control system 550 receives data from one or more sensors 542 identifying the location of the game components, such as dishes, utensils and name cards, as those game components were left by the prior patron. The control system 550 uses the received game component data to select one of a plurality of challenges for the incoming patron. In one embodiment, the control system 550 chooses a challenge that requires moving the largest number of game components from their starting positions reported to the control system 550. In some embodiments, if the patron sets the entire table properly in under 4 minutes, they earn three stars, in under 4:30 minutes, 2 stars, and in under 5 minutes, 1 star. In these embodiments, if the control system 550 determines that 5 minutes have elapsed, it transmits data to the room 220 to cause the lighting elements, audio elements and exit monitor 214 to indicate failure.

In one embodiment, the control system 550 selectively adjusts the difficulty level by awarding fewer reward points to larger groups requiring the same amount of time to complete the game as smaller groups. For example, following completion of the game, the control system 550 can cause processor 554 to access the following table structure from memory 552:

| Group Size | 1 Star | 2 Star | 3 Star |
| --- | --- | --- | --- |
| 2 Players | 5 min. | 4:30 min | 4 min |
| 3 Players | 5 min. | 4 min. | 3:30 min. |
| 4 Players | 5 min. | 3:30 min. | 3 min. |
| 5 Players | 5 min. | 3 min. | 2:30 min. |
| 6 Players | 5 min. | 2 min. | 1 min. |

The control system 550 can cause the processor 554 to lookup, using the number a players reported by the patron kiosk 212 and the elapsed time of the countdown timer to determine how many stars to award the patrons for completion of the game. For example, if 4 patron completed the game in 3 minutes and 15 seconds, the processor 554 would access the "4 Players" row in the table data structure. Since the elapsed time, in this example, is less than 3:30 minutes but more than 3 minutes, the processor add 2 stars to the patron card 430 associated with the patron. In some embodiment, each of the patrons would receive two stars and in other embodiments, the awarded stars would be distributed among the patrons.

In some embodiments, the control system 550 can modify the difficulty of the game responsive to the size of the patron group playing. In these embodiments, the control system may apply a scaling factor to the time period in the table data structure to increase difficulty. For example, the control system may divide the time periods stored in the table by 2 if the patron group is six players. In this example, to achieve a three star performance, the patron group would need to complete the challenge in 30 seconds.

Other games may be combinations of the various examples just described above. For example, a game may require both skill from, and communication between, the patrons playing the game.

When the patron 530 scans the identifier 535, the patron kiosk 212 sends a command, via a network 540, to request information from the control system 550. The control system 550 includes a memory 552 and a processor 554. The member 550 stores information associated with the patron 530, such as a patron avatar data structure 560 and a patron card data structure 430.

The memory 552 may store machine instructions that, when executed by the processor 554, cause the processor 554 to perform one or more of computer operations. The processor 554 may include one or more microprocessors, application specific integrated circuits (ASICs), field programmable gate arrays (FPGAs), other forms of processing circuits, or combinations thereof. The memory 552 may include, but is not limited to, electronic, optical, magnetic, or any other storage or transmission device capable of providing the processor 554 with program instructions. The memory 552 may include storage devices such as a floppy disk, CD-ROM, DVD, magnetic disk, memory chip, ROM, RAM, EEPROM, EPROM, flash memory, optical media, or any other suitable memory from which the processor 554 can read instructions and/or data. The processor 554 and the memory 552 may form a processing module.

The control system 550 may track and/or log the position of a patron 530 via the identifier 535 associated with the patron 530. The rooms 220 may include one or more room sensors 542. The room sensors 542 may be at least one or more sensors positioned within the rooms 220 or on an outside of the rooms 220. The room sensors 542 positioned within the rooms 220 may be motion sensors that detect the presence of the patron or the sensors may directly detect the identifier associated with the patron. Additionally or alternatively, the room sensors 542 positioned on the outside of the rooms 220 may detect the presence of the patron or the sensors may directly detect the identifier associate with the patron.

In response to determining patron position, the room sensors 542 may send position data to a control system 550 identifying the patron position. More specifically, the processor 554 may receive the position data from the room sensors 542 and store the position data within the memory 552. The memory 552 may create a log of patron position data for each patron 530.

Figure 35:
FIGS. 35-39 are various views of displays from a patron kiosk of the interactive physical environment of FIG. 1, according to an example embodiment.

Referring now to FIGS. 35-47, the patron 530 may access the patron kiosk 212 to view one or more kiosk screens. The patron 530 may access the patron kiosk 212 for each room 220. Upon scanning the identifier 535, the patron 530 may access a first screen 600 at the patron kiosk 212, as shown in FIG. 35. The first screen 600 may identify a number of stars that the patron 530 has earned for a given day. In other embodiments, the first screen 600 may identify a total number of stars earned in a career. In further embodiments, the first screen 600 may always be displayed and the information provided may relate to the room itself, e.g., 3% of all patrons have earned three stars playing this game.

Figure 36:
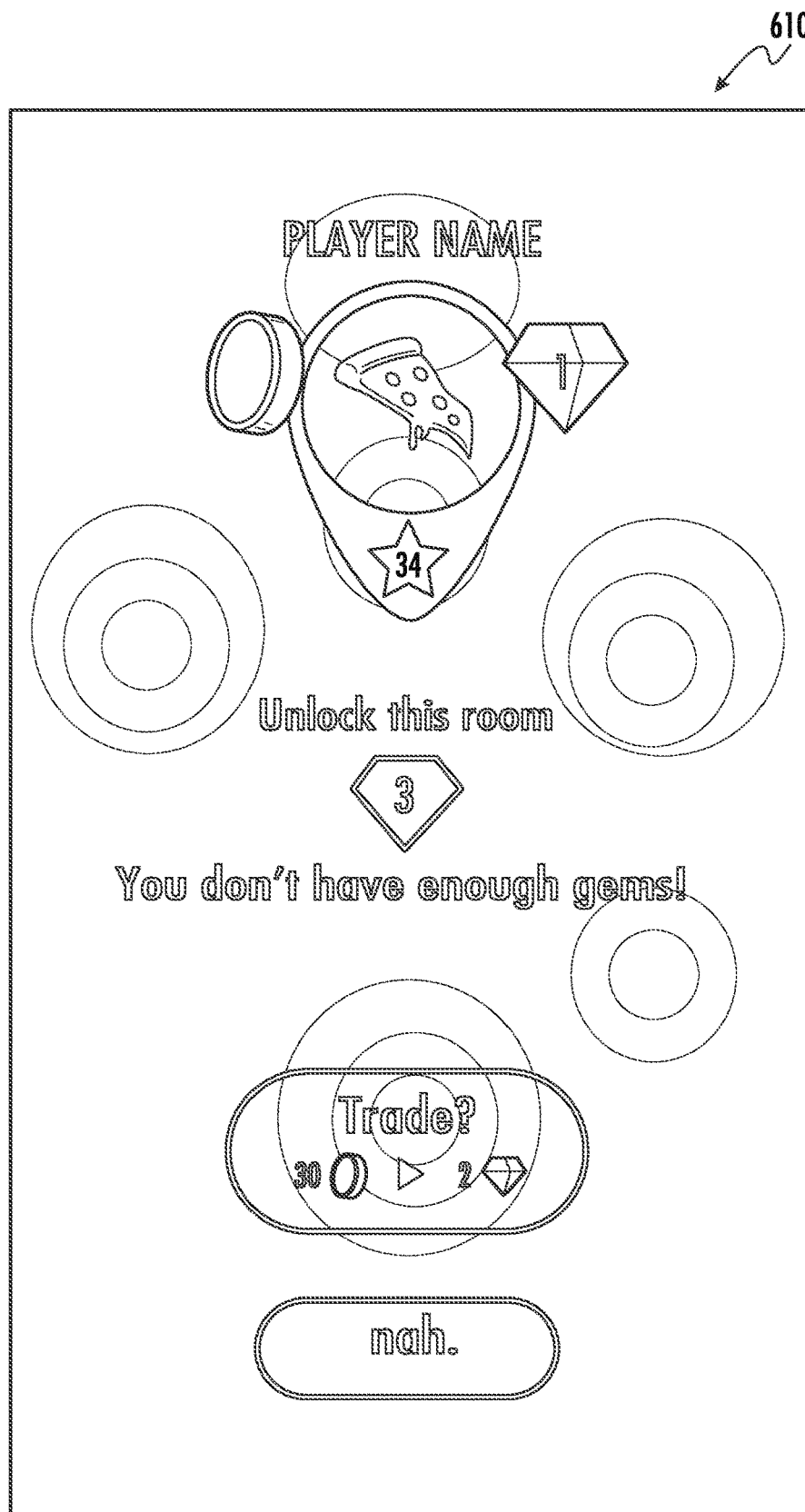
Figure 37:
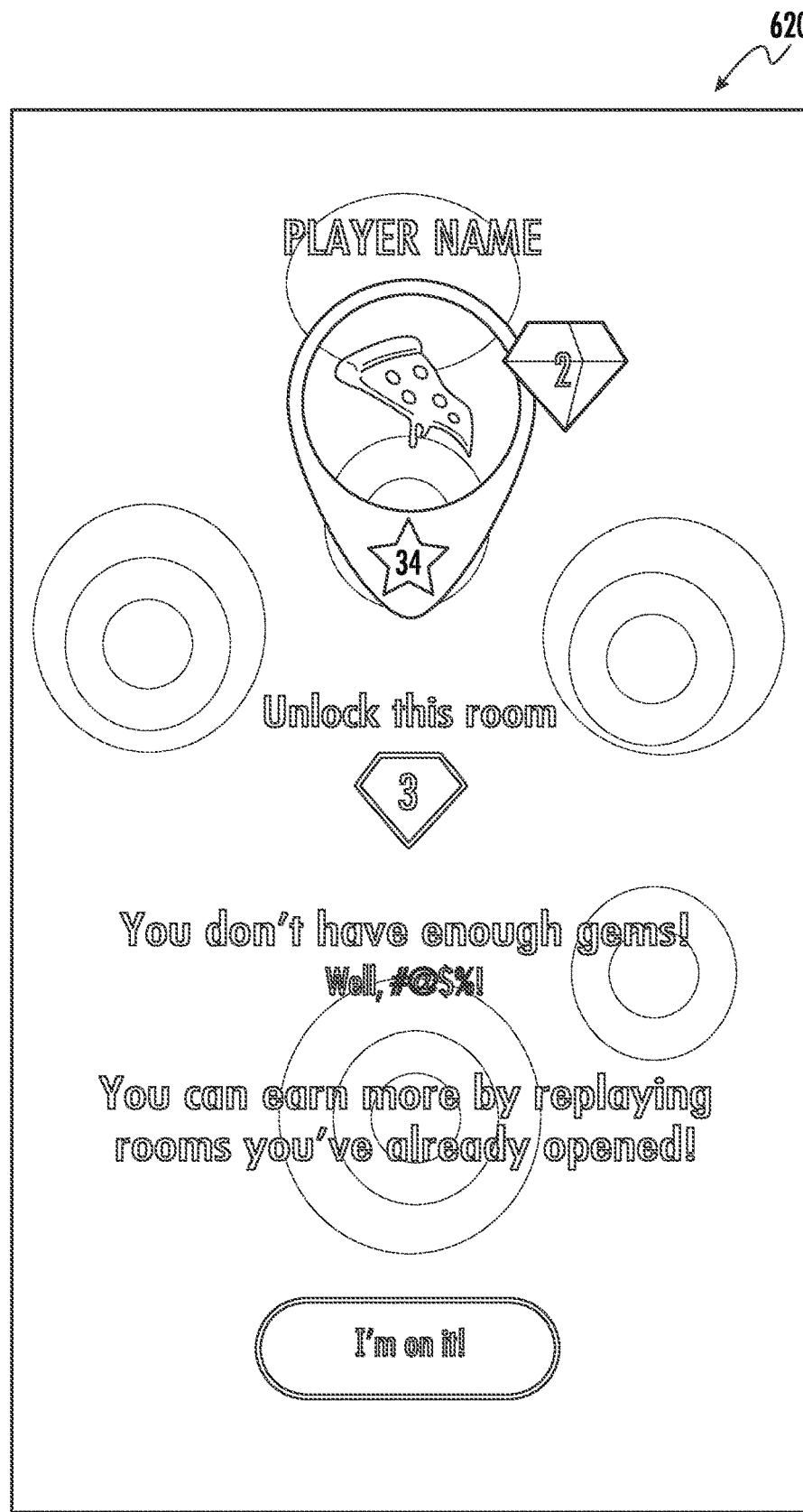

In some embodiments, upon scanning the identifier 535, the patron kiosk 212 may display a second screen 610, as shown in FIG. 36. In such an embodiment, the second screen 610 may identify a locked room 220. The second screen 610 identifies an amount of gems, or other in-game or digital currency, needed to unlock the room 220. Additionally or alternatively, the second screen 610 permits the patron 530 to trade coins for gems if the patron does not have enough gems to access the room 220. In another embodiment, upon scanning the identifier 535, the patron kiosk 212 may display a third screen 620, as shown in FIG. 37. The third screen 620 may be substantially similar to the second screen 610, although the patron 530 does not have any coins to trade for gems. In such a screen, the third screen 620 directs the patron to play more rooms 220 to earn the gems.

Figure 38:
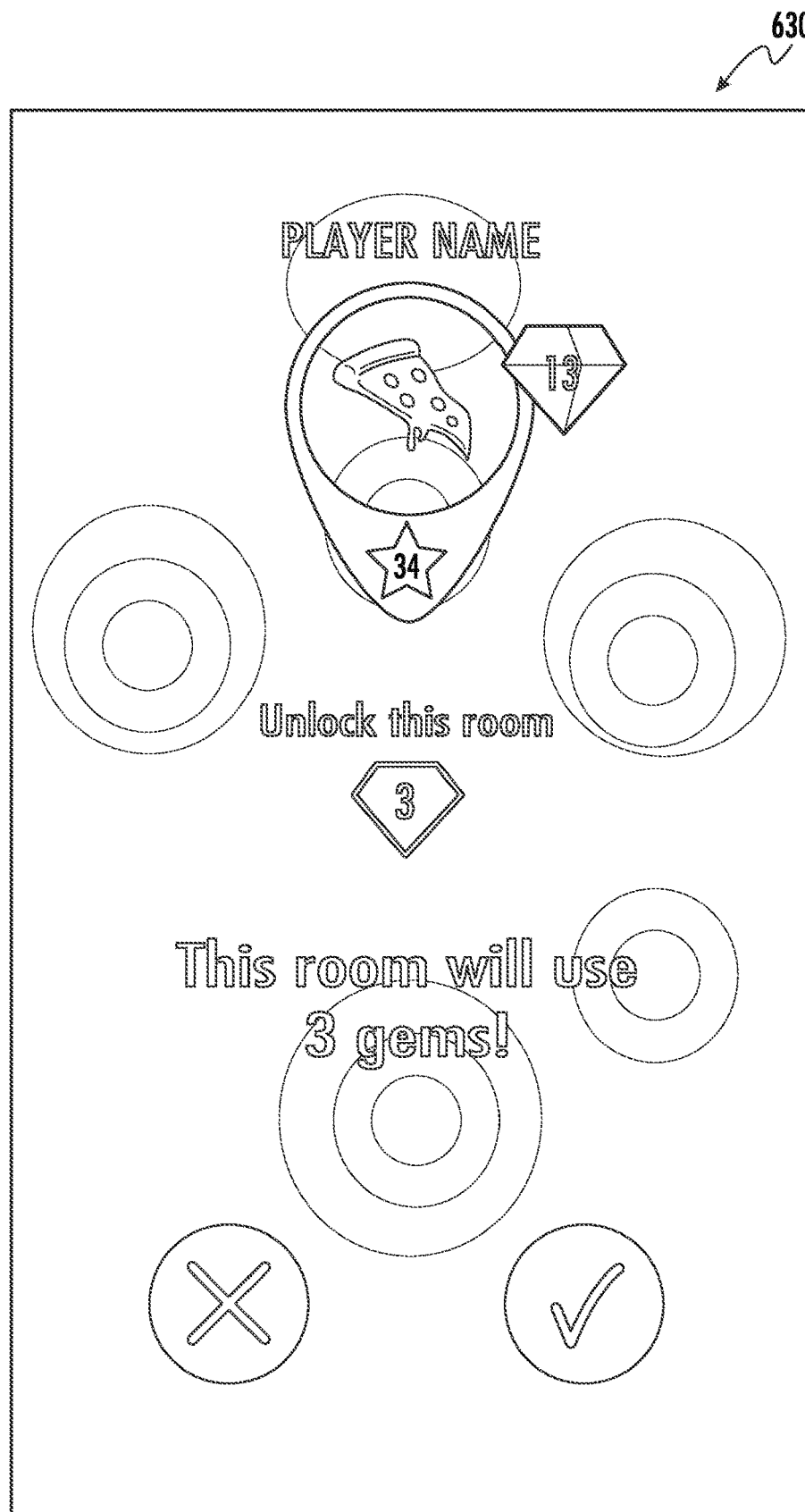

In some embodiments, upon scanning the identifier 535, the patron kiosk 212 may display a fourth screen 630, as shown in FIG. 38, allowing the patron 530 to purchase access to the locked room 220 in examples where the patron 530 currently has a sufficient amount of currency. The patron may select between an agree button (e.g., check-mark, etc.) or a cancel button (e.g., x-button, etc.). The screens 610-630 may be optional for embodiments in which the rooms 220 are not locked.

Figure 39:
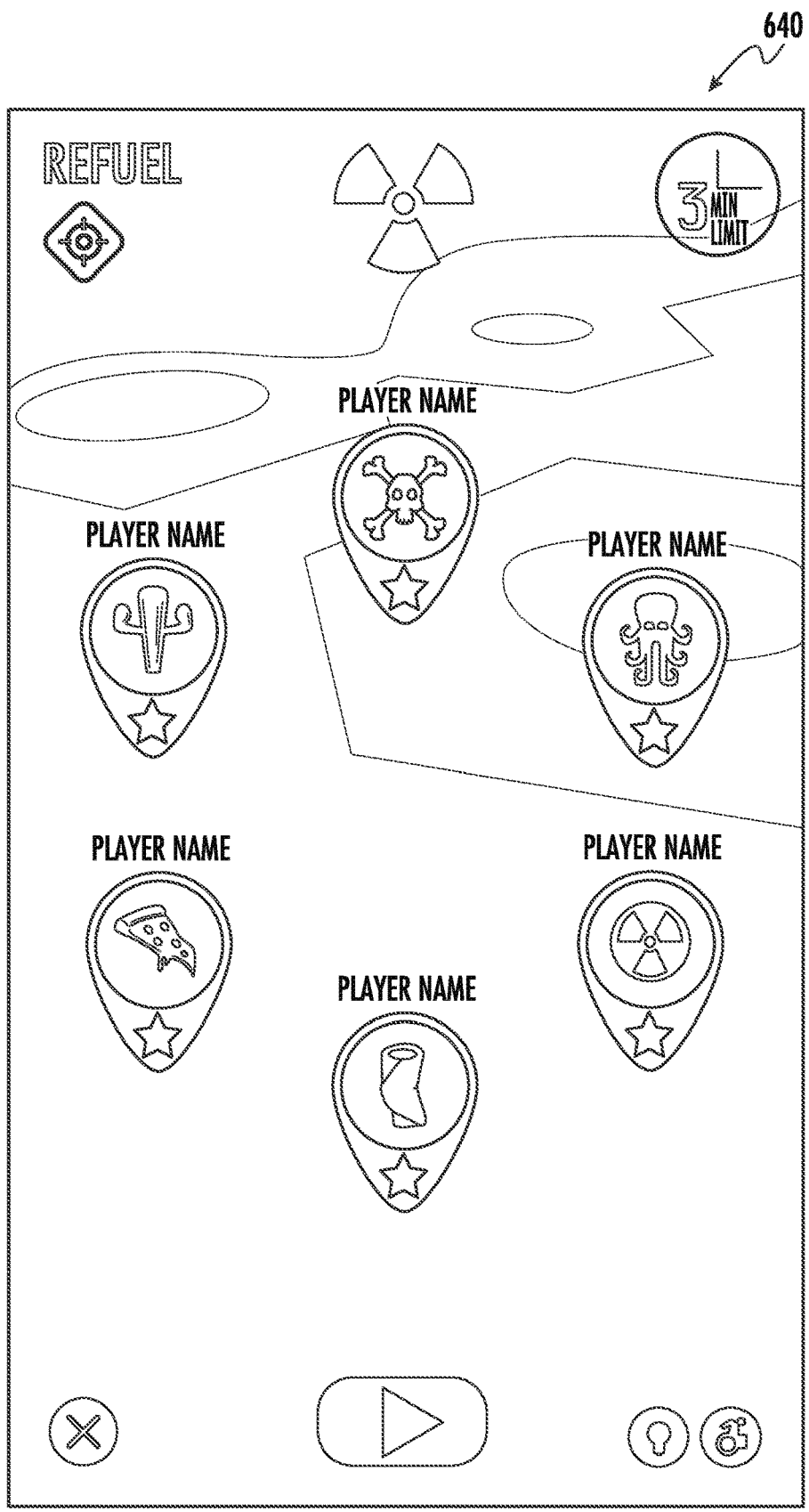

As shown in FIG. 39, the patron kiosk 212 may display a fifth screen 640 in response to the patron 530 scanning the identifier 535. The fifth screen 640 indicate a group of patrons registered to enter the room 220. The fifth screen 640 may display a patron name and the patron avatar 560 associated with each registered patron 530. By way of example, the fifth screen 640 may only display the number of patrons that are able to access the room 220 (e.g., between 2 and 6 patrons). The fifth screen 640 may further indicate a time limit for the room 220 (e.g., as shown in the top right corner of the fifth screen 640, etc.). Although the fifth screen 640 identifies a time limit of 3 minutes, the room 220 may include any time limit needed to complete the existing challenge and grant access to patrons 530 waiting outside of the room 220. In other embodiments, the fifth screen 640 may identify estimated time remaining until the patron will be provided access to the room 200. The fifth screen 640 may further include a hint for the room 220 (e.g., as shown in the bottom right corner of the fifth screen 640, etc.). As will be discussed in greater detail herein, the hint may be a selection from the patron 530 to access one or more hints associated with the room 220.

Figure 40:
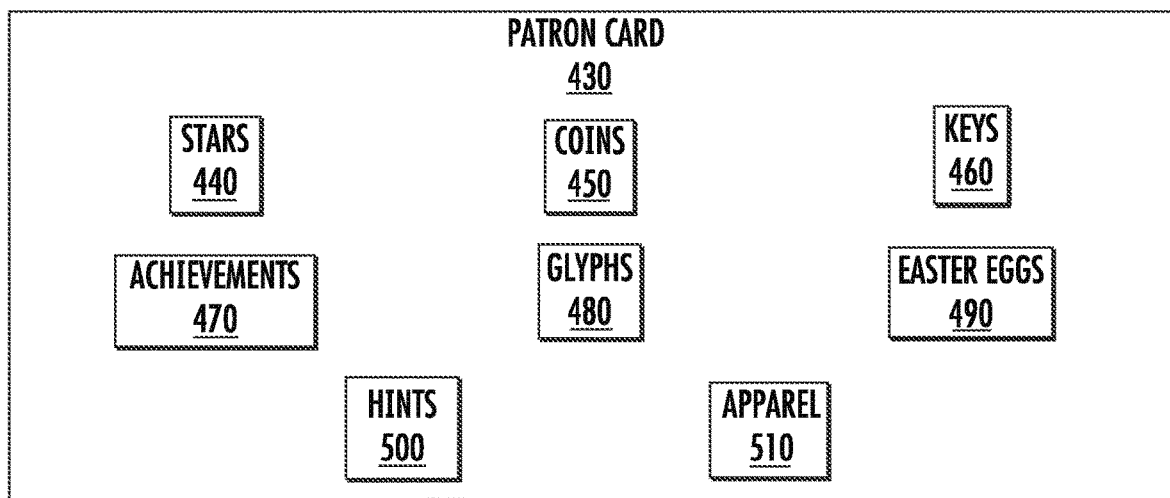
FIG. 40 is a diagram of a patron card data element for use in the interactive physical environment of FIG. 1, according to an example embodiment.

When at the fifth screen 640, the patron 530 may select the specific patron avatar 560 to view a patron card 430. The patron card 430 may be a unique account card associated with the unique patron 530. The patron 530 may access the patron card 430 to view statistics associated with the patron 530. In other embodiments, the patron 530 may access the patron card 430 to view account settings. As shown in FIG. 40, the patron 530 may access the patron card 430 to access a number of stars 440, a number of coins 450, a number of keys 460, a status of achievements 470, one or more glyphs 480, a number of Easter Eggs 490 (e.g., hidden challenges, etc.), a selection of hints 500, apparel 510, etc. Stars 440 may designate a progress rank or level of the patron 530. The coins 450 and keys 460 may be used as digital currency to purchase products within the interactive physical environment 100 (e.g., food, drinks, apparel 510, play time, etc.).

Figure 41:
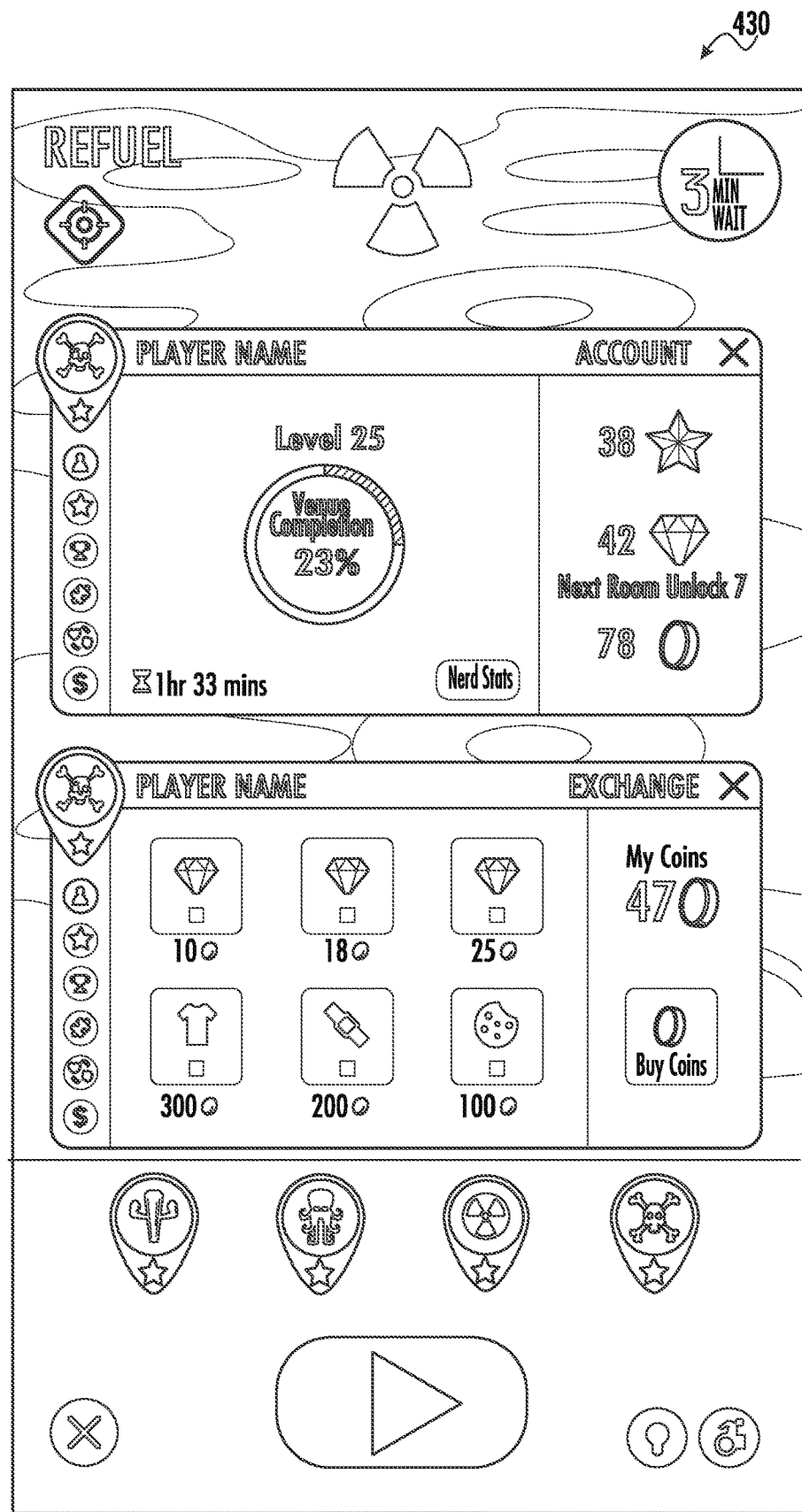
FIGS. 41 and 42 are various views of patron cards from a patron kiosk of the interactive physical environment of FIG. 1, according to an example embodiment.
Figure 42:
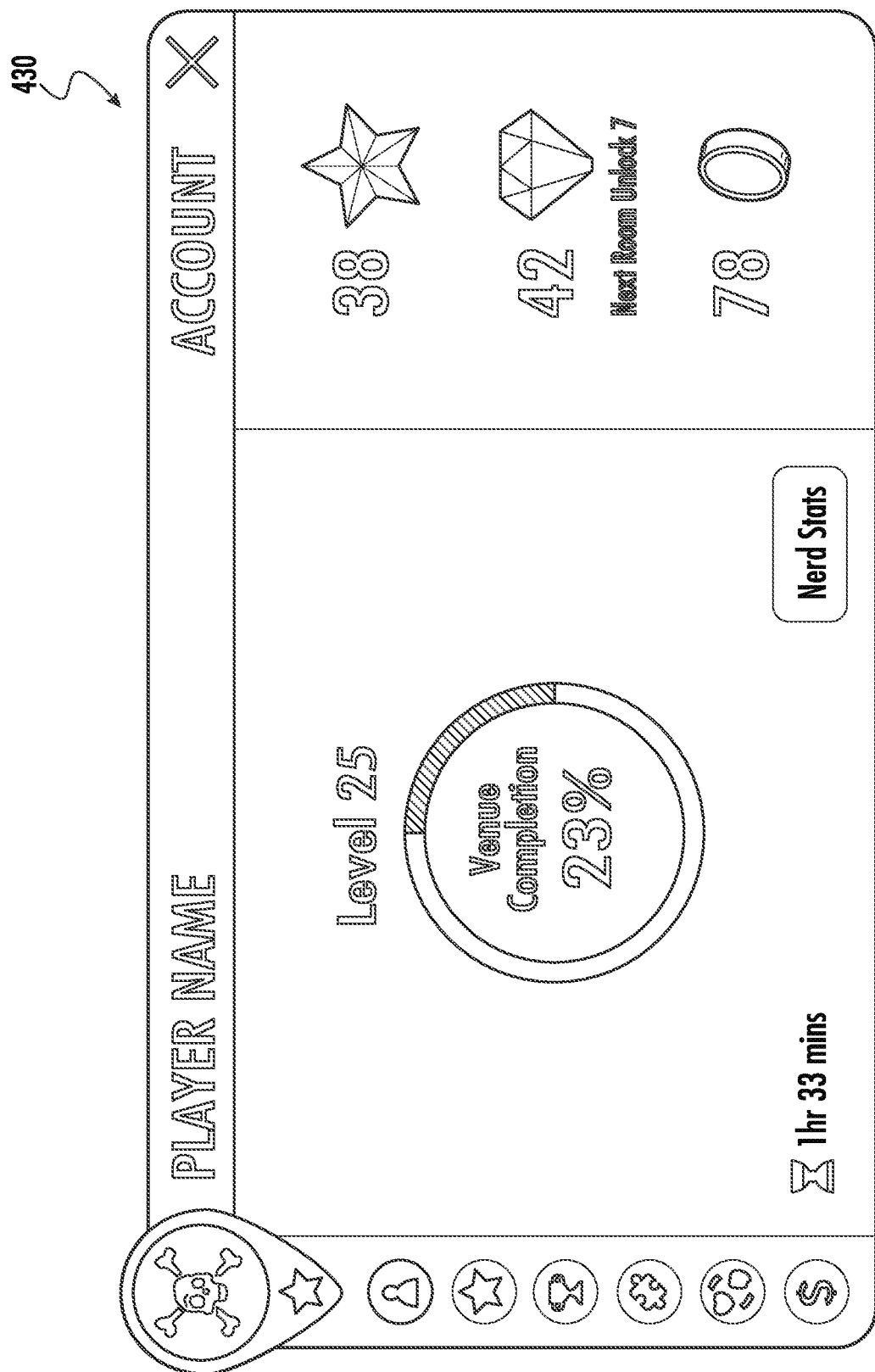

Referring now to FIGS. 41 and 42, various examples of patron cards 430 are depicted. FIG. 41 depicts multiple patron cards 430a on the patron kiosk 212. The patron cards 430*a* are displayed vertically from one another. In other embodiments, the patron cards 430*a* may be displayed horizontally, vertically or angularly to one another. The patrons 530 may view multiple patron cards 430*a* to compare statistics between individual patrons 530. As shown in FIG. 42, the patron kiosk 212 may display a single patron card 430*b*. The patron card 430*b* depicted displays the patron name, the stars 440, the number of coins 450, the status of achievements 470, the patron level, and a number of gems. As shown on a left side of the patron card 430*b*, the patron card 430*b* may further include one or more tabs, where the patron 530 may interface with the one or more tabs to access different features within the patron card 430*b*. For example, the patron 530 may access the one or more tabs to access the number of Easter Eggs 490.

Figure 43:
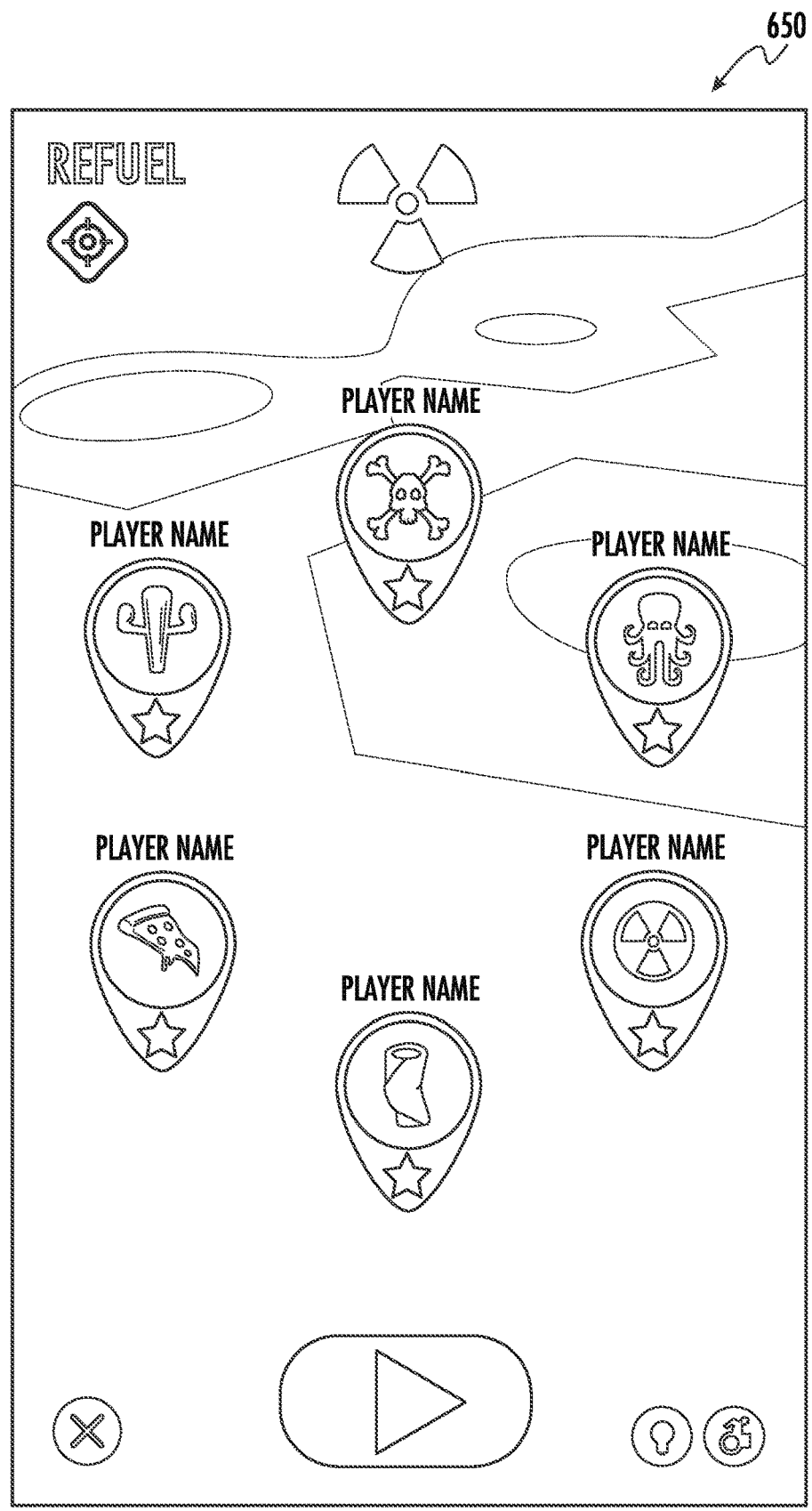
FIGS. 43-47 are various views of displays from a patron kiosk of the interactive physical environment of FIG. 1, according to an example embodiment.

If no patron 530 selects the patron avatar 560, the patron kiosk 212 may display a sixth screen 650, as shown in FIG. 43. The sixth screen 650 may be substantially similar to the fifth screen 640, except for now the patron may select a play button (e.g., arrow, etc.) to enter the room 220.

The control system 550 may determine whether to provide a hint or to not provide a hint. The patron 530 may interface with the patron kiosk 212 for a hint selection. The hint selection may be to select one of a hint. Alternatively, the patron 530 may interface with the patron kiosk to not have a hint. By way of example, the patron 530 may select a lightbulb symbol (e.g., lower right corner, etc.) on the patron kiosk 212. In other embodiments, the patron 530 may select another symbol representing the hint selection.)

Figure 44:
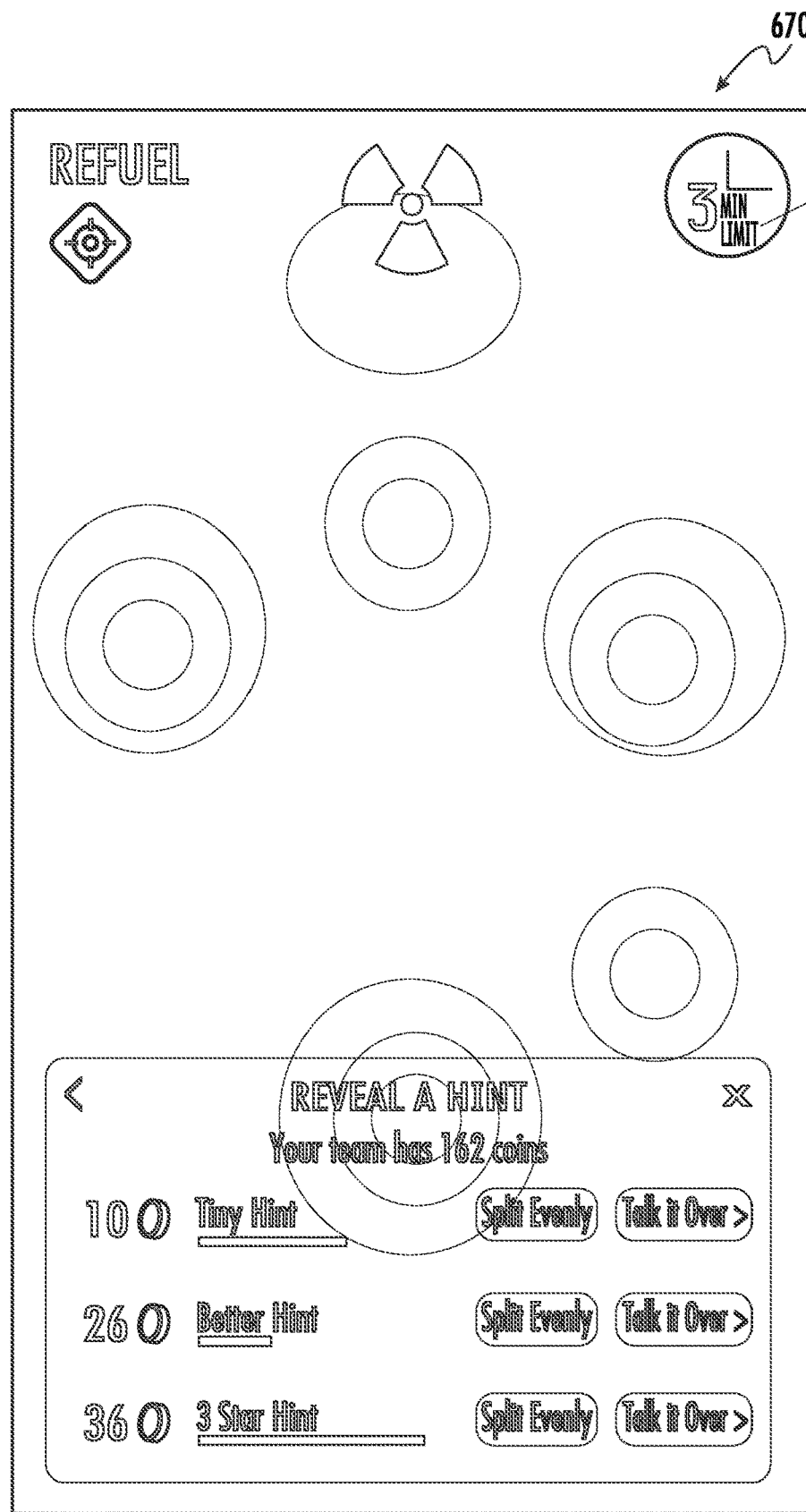
Figure 45:
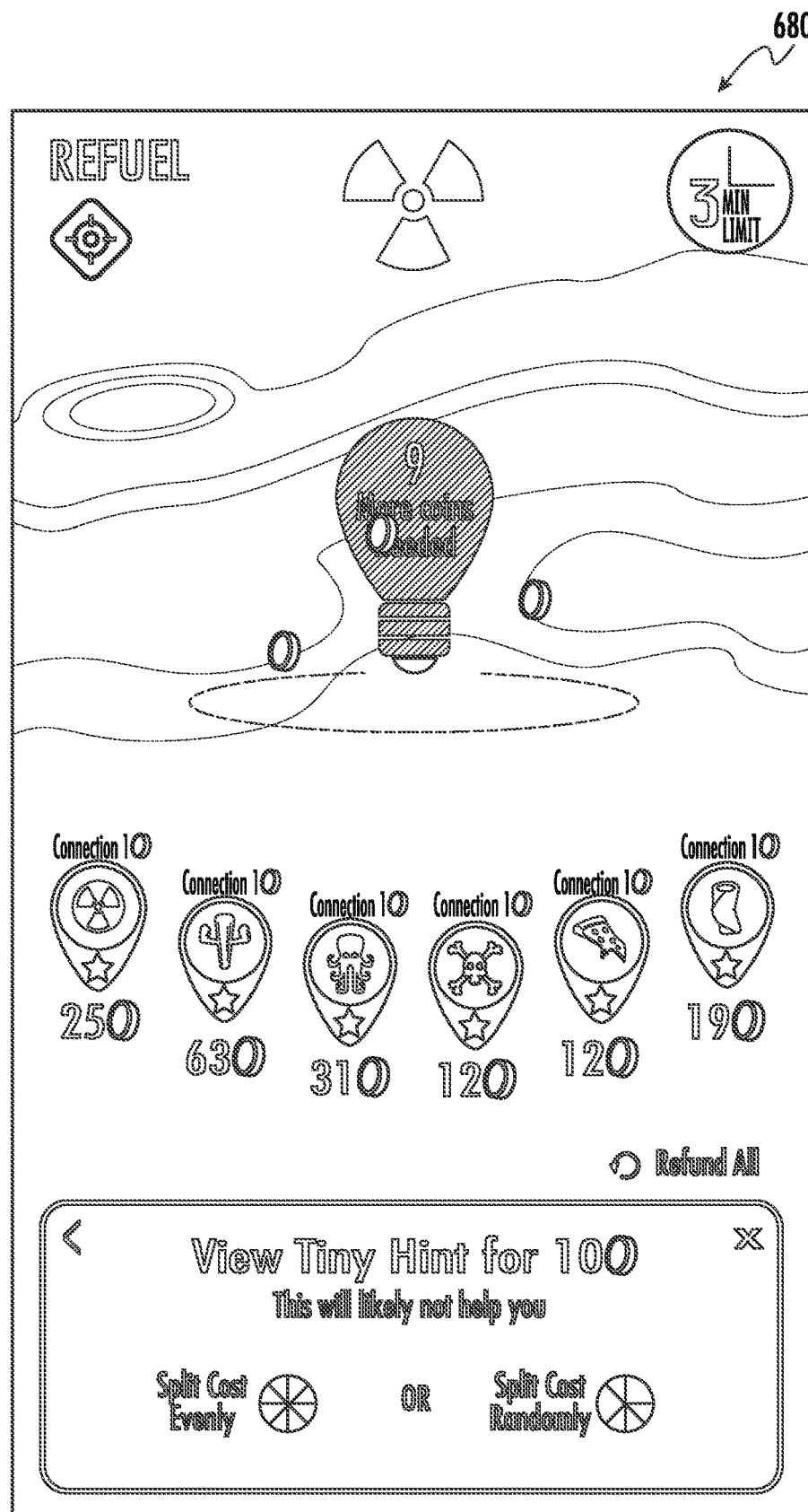
Figure 46:
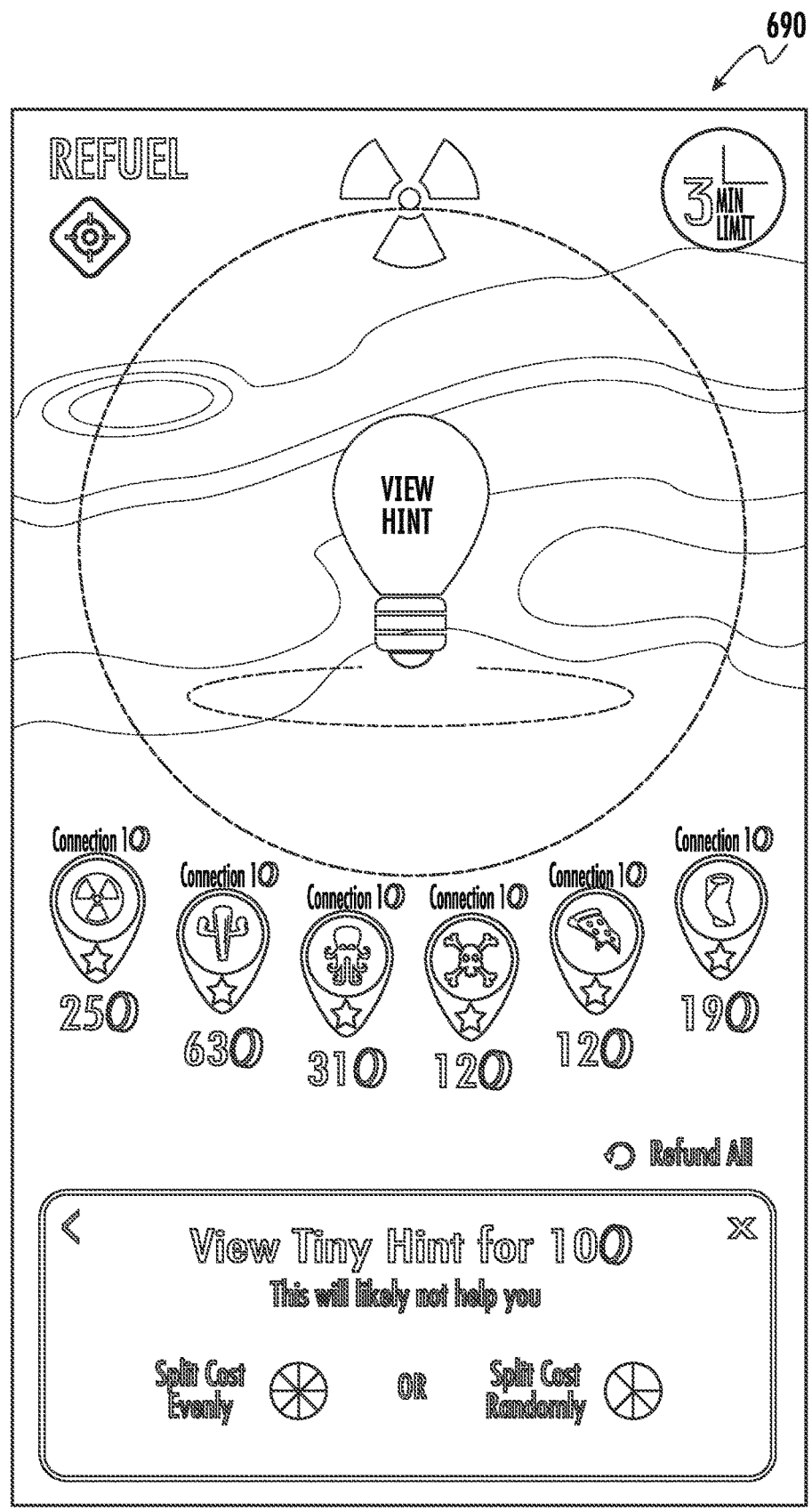

When the patron 530 wishes to access one or more hints, the patron 530 may interface with a hint button to display, via the patron kiosk 212, an eighth screen 670, as shown in FIG. 44. The eight screen 670 may represent a screen indicating that the patron has selected for the hint. As shown, the hint may include various levels of hints (e.g., tiny hint, better hint, 3-star hint, etc.). The patron 530 may select the desired hint in order to enhance the patron experience. In one example, the patron 530 may not choose a hint. In another example, the patron 530 may choose one or more of the sizes of hints. As can be appreciated, the more hints that are chosen may make the game challenge easier to complete. As shown in FIGS. 45 and 46, the patron kiosk 212 may display a ninth screen 680 and a tenth screen 690. The screens 680, 690 may indicate that the patron has selected the desired hint. By way of example, the hints may be freely given to the patrons 530 to enhance patron experience. In some embodiments, as shown in FIG. 45, the ninth screen 690 indicates that the hint may be purchased for an amount of coins, and may further identify an amount of coins that each patron has that are playing the challenge. As shown in FIG. 46, the tenth screen 690 displays the hint to the patrons.

More specifically, the control system 550 may receive the hint selection command, where the processor 554 communicates with the memory 552. The memory 552 may include a lookup table corresponding to the hint selection. The lookup table may be a generic lookup table including hints for all the games. The lookup table may include various hint types (e.g., tiny hint, better hint, 3-star hint, etc.) associated with each game challenge. The memory 552 may provide a hint feedback to the processor 554. In response to receiving the hint feedback, the processor 554 may send a command to provide the hint, or to not provide the hint. According to one example, the hint selection may display onto the patron kiosk 212 for the patron 530 to view. As can be appreciated, the process for the hint selection may be repeated consecutively to provide the patron 530 with more than one hint.

Figure 47:
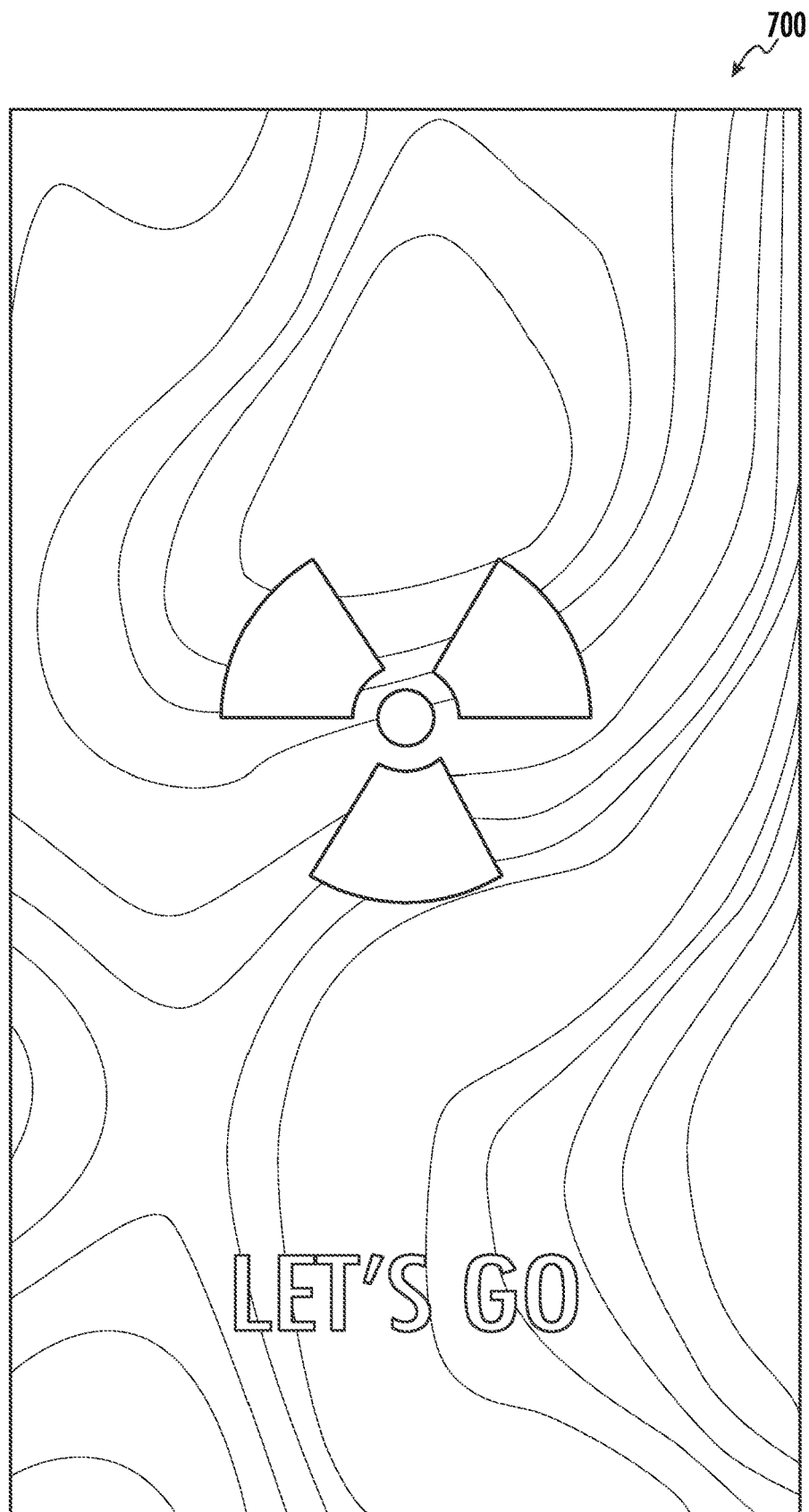

As shown in FIG. 47, the patron kiosk 212 may display an eleventh screen 700. The eleventh screen 700 may indicate that the room 220 is ready for the patrons 530 to play. In other embodiments, the eleventh screen 700 may automatically display onto the patron kiosk 512 indicating that the room 220 is empty and ready for play.

Figure 48:
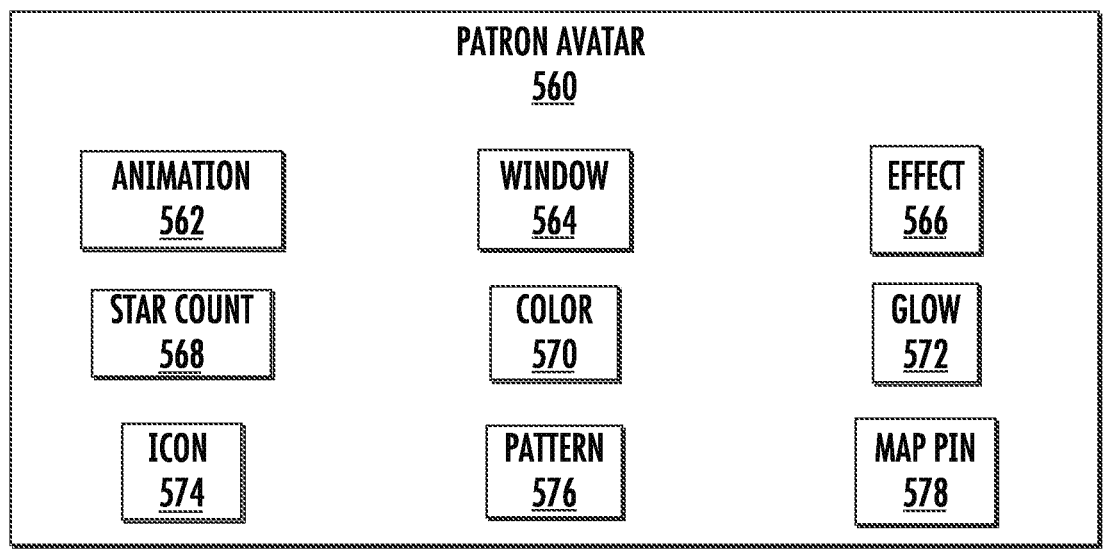
FIG. 48 is a diagram of a patron avatar data element for use in the patron card of FIG. 40, according to an example embodiment.
Figure 49:
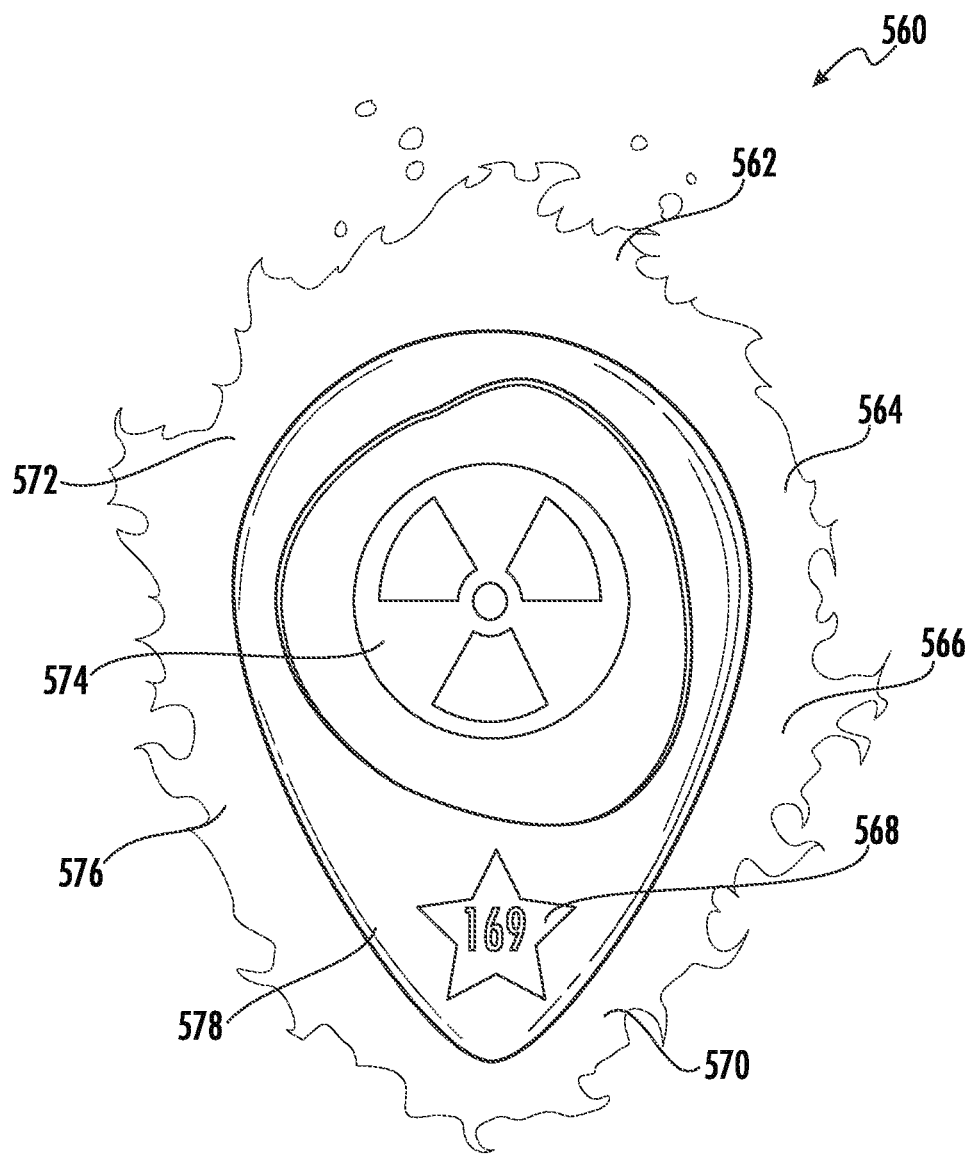
FIG. 49 is a front view of a patron avatar for association with a unique patron within the interactive physical environment of FIG. 1, according to an example embodiment.

Referring now to FIGS. 48 and 49, each patron 530 may be associated with a patron avatar 560. The patron avatar 560 may be displayed on the patron's unique patron card. As shown in FIG. 46, the patron avatar 560 may include at least one of an animation 562, a window 564, an effect 566, a star count 568, a color 570, a glow 572, an icon 574, a pattern 576, and a map pin 578. As discussed in greater detail herein, the patron avatar 560 may evolve to include more emblem features (e.g., animation 562, effect 564, window 564, effect 566, star count 568, color 570, glow 572, icon 574, pattern 576, and map pin 578) as the patron's level increases. According to one example, the patron may unlock access to the different emblem features by advancing levels. For example, the patron may include access to a set of one of the emblem features, and, as the patron levels up, the patron gains access to sets of the additional emblem features. As can be appreciated, the patron avatar 560 can advance in customization and complexity as the patron advances in levels (e.g., as shown in FIG. 38).

Referring specifically to FIG. 48, the patron avatar 560 may be modified and customized by the control system 550. The control system 550 may receive a command from the patron 530 to select or change one or more features of the patron avatar 560. The features may include the animation 562, the window 564, the effect 566, the star count 568, the color 570, the glow 572, the icon 574, the pattern 576, and the map pin 578. More specifically, the processor 554 may receive the command from the patron 530 to select or change elements of the patron avatar 560. In response to receiving such a command, the processor 554 retrieves from memory 552 the data structure representing the patron avatar 560. In some embodiments, the data structure may be an array of values, a linked list of values, or a lookup table. In still other embodiments, avatar data structures may be stored in a database. The requested changes may be made to the avatar data structure by the processor 554 and the updated data structure can be stored to memory 552.

In brief overview, a method for providing the patron avatar 560 includes identifying a patron 530, transmitting patron 530 identification information, determining patron 530 performance, transmitting game performance data, receiving patron 530 identification information, receiving game performance data, and modifying the patron avatar 560 associated with the patron 530.

Identifying a patron 530 includes utilizing the control system 550 to determine if the patron 530 has scanned into the room 220. The patron 530 may scan the identifier 535, via the scanner at the patron kiosk 212, to check-in to the room 220. The identifier 535 may be one of the RFID tag, QR code, bar code, biometric characteristics, etc. By way of example, multiple patrons 530 may check-in to the patron kiosk 212 to check-in to the room 220 (e.g., two patrons 530, four patrons 530, six patrons 530, etc.).

Transmitting patron 530 identification information includes transmitting, from the scanner, associated patron identification information via the network 540. The network 540 may be a wireless network (e.g., Wi-Fi, cloud based, Bluetooth, etc.) or could be a wired network. The patron identification information may be specific to the patron 530, where the identifier 535 links the specific patron 530 to their associated identification information.

Determining patron 530 performance includes utilizing the control system 550 to determine a status of the game. The control system 550 may receive status data from the room sensors 542, where the room sensors 542 determine a status of objectives within the room 220. The status may define a status of the patron 530 performance by comparing the status data to an objective data. The objective data may be a time data associated with an amount of time in which it takes the patron 530 to complete the objective. Additionally or alternatively, the objective data may be a count data associated with a number of objectives reached during the game. Additionally or alternatively, the objective data may be a complete or incomplete objective data (e.g., objective achieved, objective not achieved, etc.).

Transmitting game performance data includes transmitting, from the control system 550, the game performance data via the network 540. As discussed above, the network 540 may be a wireless network (e.g., Wi-Fi, cloud based, Bluetooth, etc.) or could be a wired network.

Receiving patron 530 identification information includes the patron kiosk 212 receiving the patron 530 identification information from the control system 550. The control system 550 may communicate through the network 540 to display the patron 530 identification information. The identification information could be the patron card 430, patron avatar 560, or the like.

Receiving game performance data includes the patron kiosk 212 receiving the game performance data from the control system 550. The control system 550 may communicate through the network 540 to display the game performance data. The game performance data may be a reward associated with the game. For example, the game performance data may display the reward earned from playing the game. In another example, the game performance data may display that the patron 530 has not earned the reward.

Modifying the patron avatar 560 associated with the patron 530 includes receiving the patron avatar 560 or patron card 430 associated with the patron 530 from the control system 550. The patron avatar 560 and/or patron card 430 may be displayed onto the patron kiosk 212. The patron 530 may select the patron card 430 to access the patron avatar 560. When viewing the patron avatar 560, the patron 530 may select to change or add in the avatar features. In one embodiment, the patron avatar 560 and the patron card 430 are stored within a data storage element within the memory 552. More specifically, the data storage element may store a patron identifying information, including the patron avatar 560 and the patron card 430. Upon selection of new or changing avatar features, the memory 552 updates and stores the new patron avatar information within the patron identifying information. In some embodiments, the patron card data structure stored in memory 552 may be updated to permit the patron 530 access to and the ability to modify new sets of avatar features.

Figure 50:
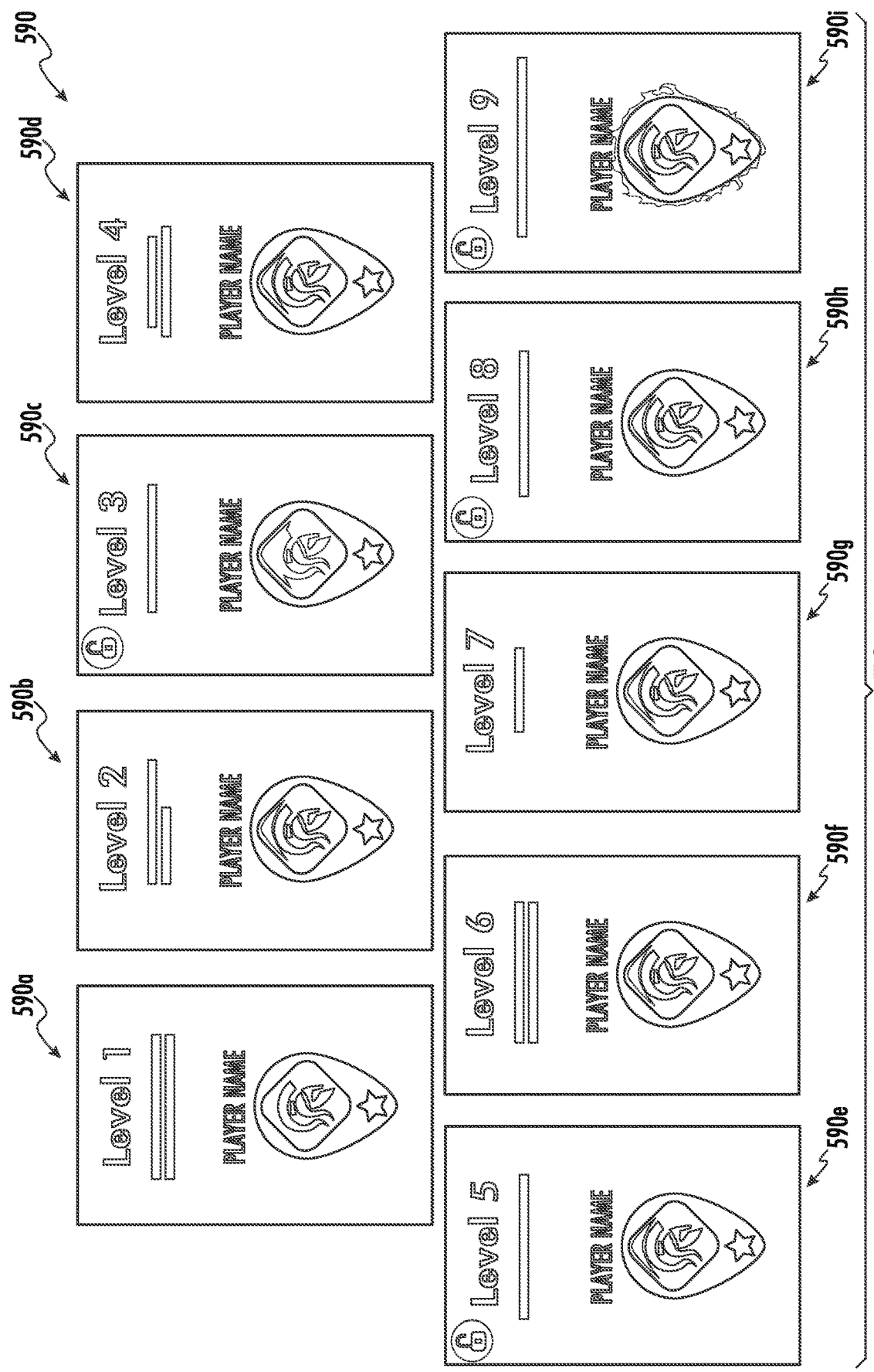
FIG. 50 shows various views of patron avatars corresponding to various patron levels for use in the patron card of FIG. 40, according to an example embodiment.

Referring now to FIG. 50, various examples of patron avatars 590 are shown. As shown, the patron avatars advance based upon level progression. For example, FIG. 50 shows a first level patron avatar 590a, a second level patron avatar 590b, a third level patron avatar 590c, a fourth level patron avatar 590d, a fifth level patron avatar 590e, a sixth level patron avatar 590f, a seventh level patron avatar 590g, an eighth level patron avatar 590h, and a ninth level patron avatar 590i. The patron avatars 590a-590i are shown to advance and/or evolve into more sophisticated patron avatars as the patron achieves a greater level. The patron avatar advancements and/or effects are described above with respect to FIGS. 48 and 49.

The control system 550 may determine an amount of digital currency needed to purchase real world items. Additionally or alternatively, the control system 550 may be a control system that determine the amount of digital currency to access new rooms. The patron 530 may purchase the real world items or access new spaces by using digital currency. The digital currency may be gems, coins, keys, tokens, or the like. The patron 530 may purchase the real world items or access new spaces via the patron kiosk 212. Alternatively, an additional kiosk may be used to purchase real world items or access new spaces. The processor 554 may receive a command from the patron 530, the command being at least one of to purchase the real world items 770 or access the new spaces 780. The processor 554 may communicate the command to the memory 554, where the memory 554 may include a lookup table. The lookup table may be a table defining all of the products available for purchasing and an associated digital currency amount for each. The memory 552 may pull the digital currency data associated with each item. When the patron 530 makes a purchase, the processor 554 determines the associated digital currency amount from the memory 552 and charges the associated digital currency amount from the patron 530. After the processor 554 charges the associated digital currency amount, the processor 554 determines a new digital currency for the unique patron 530.

The control system 550 may automatically change a difficulty of a game challenge based on a number of patrons 530. The number of patrons 530 may be substantially equivalent or equal to a number of identifiers 535. Upon entrance into the room 220 the identifier 535 for each patron 530 is scanned. The game challenge may change in difficulty or change a reward based on the number of patrons 530. The control system 550 may detect the number of patrons 530 within the room 220 via scanning of the identifiers 535 and/or proximity sensors positioned within the room 220. In other embodiments, a QR code may be scanned, a physical feature of the patron 815 may be scanned (e.g., retinal, facial recognition, fingerprint, etc.), or an account number associated with the patron 815 may be inputted. In response to detecting the number of patrons 530, the control system 550 provides the information to the processor 554, where the processor 554 may communicate the number of patrons 530 to the memory 552. The memory 552 may include a lookup table. The lookup table may include information for the number of patrons 530 and the game challenge. An example lookup table is shown below in Table 1.

| Group Size | 1 Star | 2 Star | 3 Star |
| --- | --- | --- | --- |
| 2 Players | 1 | 2 | 3 |
| 3 Players | 2 | 4 | 7 |
| 4 Players | 3 | 5 | 8 |
| 5 Players | 4 | 6 | 9 |
| 6 Players | 5 | 7 | 10 |

Table 1 is an example lookup table for the game challenges.

As shown in Table 1 above, the game challenges vary depending on the number of patrons 530. More specifically, a reward for completing the game challenges varies depending on the number of patrons 530. For example, if there are two patrons 530, the patrons 530 can earn a maximum of 3 stars for completing the game challenges by reaching an objective of 3. In another example, if there are six patrons 530, the patrons 530 can earn a maximum of 3 stars for completing the challenges by reaching an objective of 10. The status of the game challenge can be any status corresponding to the game challenges. The control system 550 may further be communicably coupled to the rooms 220. The control system 550 may receive a signal from the rooms 220 on a status of the game challenges while the patrons 530 are playing the entertainment game. Based on the feedback from the number of patrons 530 and the feedback from rooms 220, the processor 554 may determine an amount of stars to reward the patron 530 upon completion of the game challenges. Although a particular group size and reward are shown in Table 1, it can be appreciated that the lookup table can include any number of patrons and associated rewards for completing game challenges.

Upon completion of the game challenge (e.g., objective, etc.), the control system 550 may reward the patron 530. More specifically, the processor 554 may determine a level of the challenge received based on the feedback from the room 220. The processor 554 may communicate the feedback to the memory 552, where the memory 552 determines, via the lookup table, an amount of stars to reward the patron 530. In association, the memory 552 communicates the reward back to the processor 554, where the processor 554 presents the reward back to the patron 530. Additionally or alternatively, the memory 552 increases an amount of stars stored within a data storage element (e.g., patron card 430) for each patron 530. As can be appreciated, the memory 552 may access the data storage element for each patron 530, where the memory 552 adjusts an amount of digital currency (e.g., stars, coins, keys, tokens, points, etc.) based on a feedback from the processor 554.

The control system 550 may provide a status for each patron 530 to enable play or disable play based on an in-game selection. When playing a game within the room 220, the patron 530 may make the in-game selection to advance or reach the objective. The in-game selection may permit or prevent the patron 530 from advancing through the room 220 based on the selection. For example, the patron 530 may make either one of a correct selection or an incorrect selection. Based on the selection, the patron 530 may be granted access to keep playing or advance within the room 220. The incorrect selection may further include one or more feedbacks, referred to herein as a number of incorrect selections, successive incorrect selections, and difficulty of selection. In other embodiments, the one or more feedbacks may include more feedbacks than described above (e.g., number of patrons, level of patrons, etc.).

The control system 550 may receive the in-game selection via the room sensors 542. In one example, the room sensors 542 may be pressure sensors that detect the patron 530. In another example, the room sensors 542 may be proximity sensors that detect movement of the patron 530. The processor 554 may compare data from room sensors 542 with a lookup table or other data stored in memory 552 to determine whether to enable or continue play. In such an example, the patron 530 advances through the room 220 or onto the next challenge. In response to the incorrect in-game selection, the processor 554 disables play for the patron 530. In such an example, the room 220 may provide a feedback to the patron 530 signifying that the objective has not been completed and the game is over. In one example, the lights may changes brightness or color. In another example, the exit monitor 214 may provide a display. In another example, the room 220 may include audio to signify to the patron 530. In some embodiments, the error selection may be scaled based on the number of incorrect selections, the number of incorrect successive selections, and the difficulty of the selection. When play for the patron 530 is disabled, it may be for a particular time limit, game duration, selection limit, etc. In some embodiments, if the patron 530 has made a first incorrect selection at an easy difficulty, the control system 550 may disable play for a short amount of time. In another example, if the patron 530 has made successive incorrect selections at a hard difficulty, the control system 550 may disable play for a greater amount of time.

In brief overview, a method of entertaining the patron 530 includes coupling walls 210 to form the room 220, presenting the game to the patron 530 including the identifier 535, receiving patron identification information, and modifying the game presented in the room 220.

Coupling walls 210 to form the room 220 includes one or more wall configurations 212a-212e are coupled together to form the room 220. The wall configuration may form a structure corresponding to the room entrance 230. The walls 210 may include the linkage assemblies 240a-240b, 260a-260b, the linkage assemblies extending outward from the wall configurations 212a-212e to present an enclosed structure for the patrons 530.

Presenting the game to the patron 530 includes permitting the patron 530 access into the room 220. The patron 530 may be permitted access into the room 220 via the room entrance 230. The patron 530 may include the identifier 535, where the identifier 535 is scanned at the patron kiosk 212 to check-in the patron 530 for the room 220. Upon scanning into the patron kiosk 212, the patron card 430 is displayed onto the screen. The screen may include all patron cards 430 associated with all the patrons 530 checked-in to the room 220.

In some embodiments, the game includes a plurality of game components positionable in a first game configuration and a second game configuration. The first game configuration may present a first challenge and the second game configuration may present a second challenge. The second game configuration may further present a solution to the first challenge. Accordingly, the first game configuration may present a solution to the second challenge.

In some embodiments, the game includes a hint selection. The patron 530 may select for one or more hints associated with the game, via the patron kiosk 212. The patron 530 may choose between varying levels of hints (e.g., tiny hint, better hint, 3-star hint, etc.). The patron kiosk 212 may send a command to the control system 550, via the network 540, to pull the desired hint from the memory 552. The control system 550 may provide the hint information back to the patron kiosk 212, where the patron kiosk 212 displays the hint onto the screen of the patron kiosk 212.

Receiving patron 530 identification information includes the patron kiosk 212 receiving the patron 530 identification information from the control system 550. The control system 550 may communicate through the network 540 to display the patron 530 identification information. The identification information could be the patron card 430, patron avatar 560, or the like.

Modifying the game presented in the room 220 includes changing, via the control system 550, the objectives of the room 220. In one example, the control system 550 may change the room objectives based on group size. In such an example, the control system 550 may receive a status from the scanner, the status signifying an amount of patrons 530 checked-in to the room. In response to receiving the scanner status, the control system 550 may pull, from the lookup table within the memory 552, objective information for the room 220 (e.g., as shown in Table 1). The control system 550 may automatically adjust the objective to scale to the group size. Accordingly, the room may require more objectives to be achieved in order to receive maximum reward, for large group sizes.

In some embodiments, the control system 550 may receive status data from the room sensors 542, where the room sensors 542 determine a status of objectives within the room 220. The status may define a status of the patron 530 performance by comparing the status data to an objective data. The objective data may be a time data associated with an amount of time in which it takes the patron 530 to complete the objective. Additionally or alternatively, the objective data may be a count data associated with a number of objectives reached during the game. Additionally or alternatively, the objective data may be a complete or incomplete objective data (e.g., objective achieved, objective not achieved, etc.).

In such an embodiment, the patron kiosk 212 receives the game performance data from the control system 550. The control system 550 may communicate through the network 540 to display the game performance data. The game performance data may be a reward associated with the game. For example, the game performance data may display the reward earned from playing the game. In another example, the game performance data may display that the patron 530 has not earned the reward.

In such an embodiment, the patron kiosk 212 receives the patron avatar 560 or patron card 430 associated with the patron 530 from the control system 550. The patron avatar 560 and/or patron card 430 may be displayed onto the patron kiosk 212. The patron 530 may select the patron card 430 to access the patron avatar 560. When viewing the patron avatar 560, the patron 530 may select to change or add in the avatar features. In one embodiment, the patron avatar 560 and the patron card 430 are stored within a data storage element within the memory 552. More specifically, the data storage element may store a patron identifying information, including the patron avatar 560 and the patron card 430. Upon selection of new or changing avatar features, the memory 552 updates and stores the new patron avatar information within the patron identifying information. In some embodiment, the memory 552 may be updated to permit the patron 530 access to new sets of avatar features.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An interactive physical environment providing entertainment to a patron, comprising:
   a first patron kiosk disposed on the outside of a wall of a first room provided by the interactive physical environment, the first patron kiosk including a first scanner identifying a patron of the interactive physical environment, transmitting patron identification information, and providing a first kiosk screen displaying information relevant to an avatar associated with the patron;
   a sensor within the first room determining patron game performance data and transmitting the patron game performance data; and
   a control system receiving patron identification information from the scanner and patron game performance data from the sensor, the control system responsive to the received patron identification information and patron game performance data modifying the avatar associated with the patron;
   a second patron kiosk disposed on the outside of a wall of a second room provided by the interactive physical environment, the second patron kiosk including a second scanner identifying the patron of the interactive physical environment, transmitting the patron identification information, receiving the modified avatar associated with the patron in response, and providing on a second kiosk screen the modified avatar associated with the patron.

2. The environment of claim 1, wherein the first scanner comprises a radio-frequency identification (RFID) tag scanner.

3. The environment of claim 1, wherein the first scanner comprises a QR code scanner.

4. The environment of claim 1, wherein the first scanner comprises a bar code scanner.

5. The environment of claim 1, wherein the first scanner comprises a biometric characteristic scanner.

6. The environment of claim 1, further comprising a wireless network connecting the first scanner, sensor and control system.

7. The environment of claim 1, wherein the control system determines responsive to the sensor information, that a predetermined length of time to complete a game has been exceeded.

8. The environment of claim 1, wherein the control system determines responsive to the sensor information, whether an objective of a game has been achieved by the patron.

9. The environment of claim 1, wherein the control system modifies an avatar associated with the patron by: retrieving, from a data storage element, a data structure representing an avatar associated with the patron via the patron identification information; updating the data structure responsive to the received sensor data; and storing the updated data structure in the data storage element.

10. The environment of claim 1, wherein the first patron kiosk is configured to provide access to the first room to the patron upon scanning an identifier associated with the patron.

11. The environment of claim 1, wherein the sensor is an LIDAR sensor.

12. A method for providing entertainment to a patron via an interactive physical environment, comprising:
   identifying, by a first scanner of a first patron kiosk disposed on the outside of a wall of a first room provided by the interactive physical environment, a patron of the interactive physical environment;
   transmitting, by the scanner, the patron identification information;
   determining, by a sensor within the first room, patron game performance data;
   transmitting, by the sensor, patron game performance data; and
   receiving, by a control system, the patron identification information;
   receiving, by the control system, the patron game performance data;
   modifying, by the control system responsive to the received patron identification information and sensor game performance data, an avatar associated with the patron;
   identifying, by a second scanner of a second patron kiosk disposed on the outside of a wall of a second room provided by the interactive physical environment, the patron of the interactive physical environment; and
   receiving, by the second patron kiosk from the control system, the modified avatar associated with the patron.

13. The method of claim 12, wherein identifying comprises scanning, by a radio-frequency identification (RFID) tag scanner, an RFID tag associated with the patron.

14. The method of claim 12, wherein identifying comprises scanning, by a QR code scanner, a QR code associated with the patron.

15. The method of claim 12, wherein identifying comprises scanning, by a bar code scanner, a bar code associated with the patron.

16. The method of claim 12, wherein identifying comprises scanning, by a biometric characteristic scanner, a biometric characteristic associated with the patron.

17. The method of claim 12, wherein transmitting patron identification information comprises transmitting, by the scanner, patron identification information via a wireless network.

18. The method of claim 12, wherein transmitting patron game performance data comprises transmitting, by the sensor, patron game performance data via a wireless network.

19. The method of claim 12, wherein determining comprises determining, by the control system, a predetermined length of time to complete a game has been exceeded.

20. The method of claim 12, wherein determining comprises determining, by the control system, whether an objective of a game has been achieved by the patron.

21. The method of claim 12, wherein configuring further comprises:

retrieving, from a data storage element, a data structure representing an avatar associated with the patron via the patron identification information;

updating the data structure responsive to the received game performance data; and storing the updated data structure in the data storage element.

22. The method of claim 21, wherein updating comprises updating the data structure to include a reward amount based on the game performance data.

23. The method of claim 12, further comprising:

receiving, by the control system, data from the first patron kiosk that the patron has started a game.

* * * * *